United States Patent
Gao et al.

(10) Patent No.: US 10,382,113 B2
(45) Date of Patent: Aug. 13, 2019

(54) DOWNLINK DATA REPEAT TRANSMISSION METHOD AND DEVICE

(71) Applicant: China Academy of Telecommunications Technology, Beijing (CN)

(72) Inventors: Xuejuan Gao, Beijing (CN); Yanan Lin, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 15/572,445

(22) PCT Filed: Apr. 1, 2016

(86) PCT No.: PCT/CN2016/078321
§ 371 (c)(1),
(2) Date: Nov. 7, 2017

(87) PCT Pub. No.: WO2016/180097
PCT Pub. Date: Nov. 17, 2016

(65) Prior Publication Data
US 2018/0131430 A1 May 10, 2018

(30) Foreign Application Priority Data

May 8, 2015 (CN) .......................... 2015 1 0233136

(51) Int. Cl.
*H04B 7/06* (2006.01)
*H04L 1/00* (2006.01)
(Continued)

(52) U.S. Cl.
CPC ......... *H04B 7/0626* (2013.01); *H04L 1/0006* (2013.01); *H04L 5/00* (2013.01);
(Continued)

(58) Field of Classification Search
CPC ....... H04B 7/0626; H04L 1/0006; H04L 5/00; H04L 5/0007; H04L 5/003; H04L 5/0044;
(Continued)

(56) References Cited

U.S. PATENT DOCUMENTS

2011/0044259 A1* 2/2011 Nimbalker ............. H04L 5/001
370/329
2013/0034028 A1* 2/2013 Chen ..................... H04L 1/1854
370/280
(Continued)

FOREIGN PATENT DOCUMENTS

CN 103002581 A 3/2013
CN 103107857 A 5/2013
(Continued)

OTHER PUBLICATIONS

3GPP TSG RAN WG1 Meeting #73, R1-132110 "Diminishing returns and coverage improvement summary for TR36.888" Fukuoka, Japan, dated May 20-24, 2013, (pp. 14).
(Continued)

*Primary Examiner* — Janice N Tieu
(74) *Attorney, Agent, or Firm* — Foley & Lardner LLP

(57) ABSTRACT

Disclosed in the present invention are a downlink data repeat transmission method and device for addressing a problem in which, when resource mapping is performed in different subframes in a repeat transmission, the numbers of available REs are different, and as a result data cannot be combined when performing repeat transmission of multiple subframes. The method comprises: determining a subframe set of a repeat transmission physical downlink channel; in each subframe of the determined subframe set, and when performing a resource mapping on the physical downlink channel, starting mapping from a specific start character position in a first time slot of the current subframe and mapping to all resources except for a resource corresponding
(Continued)

to a reference signal used for demodulation; and transmitting the physical downlink channel according to the resource mapping manner.

34 Claims, 16 Drawing Sheets

(51) Int. Cl.
  *H04L 5/00* (2006.01)
  *H04W 72/04* (2009.01)
  *H04W 72/00* (2009.01)

(52) U.S. Cl.
  CPC ............ *H04L 5/003* (2013.01); *H04L 5/0007* (2013.01); *H04L 5/0044* (2013.01); *H04W 72/042* (2013.01); *H04L 5/0092* (2013.01); *H04W 72/005* (2013.01)

(58) Field of Classification Search
  CPC .. H04L 5/0092; H04W 72/042; H04W 72/005
  See application file for complete search history.

(56) References Cited

U.S. PATENT DOCUMENTS

| | | |
|---|---|---|
| 2014/0204807 A1 | 7/2014 | Li et al. |
| 2015/0049685 A1 | 2/2015 | Chen et al. |

FOREIGN PATENT DOCUMENTS

| | | |
|---|---|---|
| CN | 103874207 A | 6/2014 |
| CN | 104081872 A | 10/2014 |
| CN | 104348573 A | 2/2015 |
| EP | 3026 857 A1 | 6/2016 |
| WO | WO 2014073865 A1 | 5/2014 |
| WO | WO 2014/166447 A1 | 10/2014 |

OTHER PUBLICATIONS

3GPP TSG RAN WG1 Meeting #80, R1-150351 "Considerations of sub-band scheduling for 1.4 MHz MTG UE" Athens, Greece, dated Feb. 9-13, 2015, (pp. 3).

* cited by examiner

DOWNLINK DATA REPEAT TRANSMISSION METHOD AND DEVICE

This application is a US National Stage of International Application No. PCT/CN2016/078321, filed on Apr. 1, 2016, designating the United States and claiming priority to Chinese Patent Application No. 201510233136.1, filed with the Chinese Patent Office on May 8, 2015 and entitled "Method and device for repeated transmission of downlink data", which is hereby incorporated by reference in its entirety.

FIELD

The present disclosure relates to the field of communications, and particularly to a method and device for repeated transmission of downlink data.

BACKGROUND

1) MTC

With development of the internet of things, more and more attention has been paid to Machine Type Communication (MTC) to be supported in a Long Term Evolution (LTE) system.

A project has been launched in the 3GPP Release 13 for enhancement of the physical layer in MTC. An MTC device (or an MTC terminal) may be provided with a part of a plurality of Machine to Machine (M2M) communication characteristics, e.g., low mobility, a small amount of data to be transmitted, insensitivity to a communication delay, and a requirement of extremely low power consumption, where in order to lower the cost of the MTC UE, a new type of UE may be defined with only a 1.4 MHz radio frequency bandwidth supportable in the uplink and the downlink, respectively.

In an existing network, for a terminal operating in a scenario such as in a basement, in a shopping mall, or at a corner of a building, a wireless signal may be seriously blocked, and thus greatly attenuated, so that the terminal fails to communicate with the network, and if a coverage area of the network is extended in such a scenario, the cost of deploying the network will be greatly increased. As some tests have shown, the existing coverage area needs to be extended to some extent for communication over the network. A feasible practice to extend the coverage area is to transmit an existing channel repeatedly or to use some other similar technologies, and in theory, the coverage area can be extended to some extent by transmission of an existing physical channel repeated for tens or hundreds of times.

2) CSI-RS

In an LTE system, a Channel State Information-Reference Signal (CSI-RS) is transmitted via 1, 2, 4, or 8 antenna ports, i.e., antenna ports p=15, p=15, 16, p=15, . . . , 18, and p=15, . . . , 22 respectively. The CSI-RS is only defined in a configuration with a sub-carrier spacing $\Delta f=15$ kHz.

A plurality of CSI-RSes can be configured in a given cell, particularly as follows: a terminal is supposed to be configured with zero or one Non-Zero Power (NZP) CSI-RS; and the terminal is supposed to be configured with zero or a plurality of Zero Power (ZP) CSI-RSes; when some bits among 16 bits of a ZP CSI-RS configured via higher-layer signaling are 1, the terminal may posit zero power at CSI-RS positions of corresponding 4 ports unless these resource elements overlap with NZP CSI-RSes configured via higher-layer signaling, where the bits correspond to CSI-RS configuration numbers of the 4 ports in a one-to-one manner, and the first bit corresponds to the lowest CSI-RS index.

A CSI-RS only appears in a downlink slot, where a normal Cyclic Prefix (CP) satisfies the conditions depicted in Table 1, an extended CP satisfies the conditions depicted in Table 2, and the CSI-RS is transmitted in a downlink sub-frame determined according to a sub-frame configuration period $T_{CSI-RS}$ and a sub-frame offset $\Delta_{CSI-RS}$ of the CSI-RS, as listed in Table 3, that is, the sub-frame including the CSI-RS satisfies $(10n_f+\lfloor n_s/2 \rfloor - \Delta_{CSI-RS}) \bmod T_{CSI-RS}=0$, where "mod" represents a modular operation, $n_f$ represents a radio frame number, and $n_s$ represents a slot number. Both an NZP CSI-RS and a ZP CSI-RS can be configured respectively as a configuration index parameter $I_{CSI-RS}$ in Table 3.

The terminal posits no CSI-RS to be transmitted in the following cases: a special sub-frame in a frame structure type 2; a sub-frame in which a CSI-RS conflicts with a synchronization signal, a Physical Broadcast Channel (PBCH), and a System Information Block Type-1 (SIB-1); and a sub-frame in which paging information is configured.

TABLE 1

| | | Configured CSI-RS resources | | | | | |
|---|---|---|---|---|---|---|---|
| | CSI-RS | 1 or 2 | | 4 | | 8 | |
| | configuration | (k', l') | $n_s$ mod 2 | (k', l') | $n_s$ mod 2 | (k', l') | $n_s$ mod 2 |
| Frame structure types 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |

TABLE 1-continued

| | | Configured CSI-RS resources | | | | | |
|---|---|---|---|---|---|---|---|
| | CSI-RS | 1 or 2 | | 4 | | 8 | |
| | configuration | (k', l') | $n_s$ mod 2 | (k', l') | $n_s$ mod 2 | (k', l') | $n_s$ mod 2 |
| | 18 | (3, 5) | 1 | | | | |
| | 19 | (2, 5) | 1 | | | | |
| Only frame | 20 | (11, 1) | 1 | (11, 1) | 1 | (11, 1) | 1 |
| structure type 2 | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | | Configured CSI-RS resources | | | | | |
|---|---|---|---|---|---|---|---|
| | CSI-RS | 1 or 2 | | 4 | | 8 | |
| | configuration | (k', l') | $n_s$ mod 2 | (k', l') | $n_s$ mod 2 | (k', l') | $n_s$ mod 2 |
| Frame structure | 0 | (11, 4) | 0 | (11, 4) | 0 | (11, 4) | 0 |
| types 1 and 2 | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Only frame | 16 | (11, 1) | 1 | (11, 1) | 1 | (11, 1) | 1 |
| structure | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

TABLE 3

| CSI-RS sub-frame Configuration $I_{CSI-RS}$ | CSI-RS sub-frame configuration period $T_{CSI-RS}$ | CSI-RS sub-frame offset $\Delta_{CSI-RS}$ |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

3) MBSFN Sub-Frame

A Multicast-Broadcast Single-Frequency Network (MB-SFN) is defined in the LTE system. In a radio frame, all the sub-frames other than a sub-frame 0 and a sub-frame 5 can be configured as MBSFN sub-frames in principle. An MBSFN sub-frame includes two areas, i.e., an MBSFN area and a non-MBSFN area. In the MBSFN area, there is no Cell-specific Reference Signal (CRS), which is also called Common Reference Signal, and there are CRSes in the non-MBSFN area. A Physical Multicast Channel (PMCH) is only transmitted using an extended CP in the MBSFN area of the MBSFN sub-frame, where the length (size) of the non-MBSFN area of the MBSFN sub-frame is preconfigured via high-layer signaling. A Physical Downlink Control Channel (PDCCH) can be transmitted in the non-MBSFN area of the MBSFN sub-frame, i.e., a control area, using a same type of CP as the sub-frame 0 to schedule a Physical Uplink Shared Channel (PUSCH) or a Physical Downlink Shared Channel (PDSCH). The length of the non-MBSFN area in the MBSFN sub-frame can be configured as 0, 1, or 2, where it can be configured as 0 for an MBSFN sub-frame in which only a PMCH is transmitted, and it can be configured as 1 or 2 for an MBSFN sub-frame in which transmission of a PDSCH is supported, dependent upon the number of CRS ports in the system, where if a CRS is configured for four antenna ports, it may be configured as 2, that is, two OFDM symbols are reserved for transmission of a PDCCH. A size of a control area in a non-MBSFN sub-frame can be 1, 2, or 3 as depicted in Table 4. A size of a Downlink Control Information (DCI) area indicated by a Control Format Indicator (CFI) transmitted in the non-MBSFN area of the MBSFN sub-frame is a same as the size of the non-MBSFN area preconfigured via high-layer signaling.

TABLE 4

| Sub-frame | The number of OFDM symbols for a PDCCH with $N_{RB}^{DL} > 10$ | The number of OFDM symbols for a PDCCH with $N_{RB}^{DL} \leq 10$ |
| --- | --- | --- |
| Sub-frames 1 and 6 in a frame structure type 2 | 1, 2 | 2 |
| An MBSFN sub-frame supporting a PDSCH and configured with one or two cell-specific antenna ports | 1, 2 | 2 |
| An MBSFN sub-frame supporting a PDSCH and configured with four cell-specific antenna ports | 2 | 2 |
| A sub-frame supporting no PDSCH | 0 | 0 |
| A non-MBSFN sub-frame (except sub-frame 6 in a frame structure type 2) configured with a positioning reference signal | 1, 2, 3 | 2, 3 |
| Others | 1, 2, 3 | 2, 3, 4 |

Where $N_{RB}^{DL}$ in the table is the number of RBs in a downlink system bandwidth.

A PDSCH can be transmitted in an MBSFN sub-frame other than the following MBSFN sub-frames: 1) an MBSFN sub-frame in which a PMCH needs to be received as instructed via higher-layer signaling; and 2) an MBSFN sub-frame configured to transmit a Positioning Reference Signal (PRS), where the PRS is only configured to be transmitted in an MBSFN sub-frame, and the sub-frame 0 is used with a normal CP. Currently, a PDSCH is transmitted in an MBSFN sub-frame only in the DMRS-based transmission modes 9 and 10 as shown in Table 5.

TABLE 5

| Mode 9 | DCI format 1A | Use a Cell-Radio Network Temporary Identifier (C-RNTI) and perform transmission in common and UE-specific search space | A non-MBSFN sub-frame: if the number of PBCH antenna ports is one, Single-antenna port, port 0 is used (see TS36.213 Section 7.1.1), otherwise Transmit diversity (see TS36.213 Section 7.1.2). An MBSFN sub-frame: Single-antenna port, port 7 (see TS36.213 Section 7.1.1) |
| --- | --- | --- | --- |
| | DCI format 2C | Use a C-RNTI and perform transmission in UE-specific search space | up to 8 layer transmission, ports 7-14 see TS36.213 Section 7.1.5B) or single-antenna port, port 7 or 8 (see TS36.213 Section 7.1.1) |
| Mode 10 | DCI format 1A | Use a C-RNTI and perform transmission in common and UE-specific search space | A non-MBSFN sub-frame: If the number of PBCH antenna ports is one, Simile-antenna port, port 0 is used (see TS36.213 Section 7.1.1), otherwise Transmit diversity (see TS36.21.3 Section 7.1.2) A MBSEN sub-frame: Single-antenna port, port 7 (see TS36.213 Section 7.1.1) |
| | DCI format 2D | Use a C-RNTI and perform transmission in UE-specific search space | up to 8 layer transmission, ports 7-14 (see TS36.213 Section 7.1.5B) or single-antenna port, port 7 or 8 (see TS36.213 Section 7.1.1) |

In order to reduce repeated times as many as possible, some studies have shown that channel estimation across sub-frames (joint channel estimation) is a working approach. The so-called channel estimation across sub-frames refers to joint channel estimation using reference signals in a plurality of sub-frames, and a typical practice is to average results of channel estimation of the plurality of sub-frames with a corresponding weight. Correspondingly, data parts in the plurality of sub-frames also need to be combined (at a symbol level or a bit level). They are combined on the precondition of a same length of transmission signals in the plurality of sub-frames to be combined.

However in the prior art, CSI-RSes are transmitted over specific Resource Elements (REs) in a configured period, and there are different CSI-RS conditions in different downlink sub-frames, so that there are different numbers of available REs when mapping resources for data transmission; and an MBSFN sub-frame and a non-MBSFN sub-frame differ from each other in terms of a reference signal, a size of a control area, and etc., so that there are different numbers of available REs when mapping resources for data transmission. Thus there are different target numbers of coded bits resulted from the channel encoding and rate matching of the data, that is, the data transmitted repeatedly in the plurality of sub-frames cannot be combined across the sub-frames.

In summary, it is desirable to provide a method for repeated transmission of downlink data so as to enable the data to be combined across a plurality of sub-frames for channel estimation.

SUMMARY

Embodiments of the disclosure provide a method and device for repeated transmission of downlink data so as to address the problem that since transmission data are mapped to resources in different sub-frames with different numbers of available REs, the data transmitted repeatedly in the sub-frames cannot be combined across the sub-frames.

Particular technical solutions according to the embodiments of the disclosure are as follows.

In a first aspect, there is provided a method for repeated transmission of downlink data, the method including: determining a set of sub-frames for repeated transmission of a physical downlink channel; mapping the physical downlink channel to resources in each sub-frame in the determined set of sub-frames by starting at a specific start symbol position in a first slot of a current sub-frame and mapping onto all resources other than resources corresponding to a reference signal for demodulation; and transmitting the physical downlink channel according to the resource mapping mode.

In an implementation, the specific start symbol position is preconfigured via higher-layer signaling; or the specific start symbol position is obtained according to a size of a DCI area, and the size of the DCI area is obtained according to a CFI.

In an implementation, if the set of sub-frames includes a plurality of groups of sub-frames, the physical downlink channel is mapped to each group of sub-frames, and each group of sub-frames consists of a preset number of sub-frames to be involved in multi-sub-frame channel estimation, and if each group of sub-frames includes an MBSFN sub-frame and a non-MBSFN sub-frame, mapping the physical downlink channel to the resources by starting at the specific start symbol position in the first slot of the current sub-frame includes: determining a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame, determining a specific start symbol position of each sub-frame in each group of sub-frames according to the third number of symbols; and mapping the physical downlink channel to the resources by starting at the start symbol position, determined according to the third number of symbols, in the first slot of the current sub-frame.

Or if the physical downlink channel is mapped to the set of sub-frames, and the set of sub-frames includes an MBSFN sub-frame and a non-MBSFN sub-frame, mapping the physical downlink channel to the resources by starting at the specific start symbol position in the first slot of the current sub-frame includes: determining a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determining a specific start symbol position of each sub-frame in the set of sub-frames according to the third number of symbols; and mapping the physical downlink channel to the resources by starting at the start symbol position, determined according to the third number of symbols, in the first slot of the current sub-frame.

Particularly the third number of symbols is determined as the smaller or larger one of the first number of symbols and the second number of symbols.

Particularly mapping the physical downlink channel to the resources by starting at the start symbol position, determined according to the third number of symbols, in the first slot of the current sub-frame includes: if the third number of symbols is the smaller one of the first number of symbols and the second number of symbols, mapping the physical downlink channel to resources in a sub-frame in which the real number of symbols in a DCI area is more than the third number of symbols, by discarding, or setting to zero, information, carried over the physical downlink channel, mapped onto first A symbols starting at the start symbol position, determined according to the third number of symbols, in the first slot of the current sub-frame, or overwriting the information with DCI transmitted in the A symbols, where the number A of symbols is the difference between the real number of symbols in the DCI area in the current sub-frame and the third number of symbols; or if the third number of symbols is the larger one of the first number of symbols and the second number of symbols, mapping the physical downlink channel to resources in a sub-frame in which the real number of symbols in a DCI area is less than the third number of symbols by starting at the start symbol position, determined according to the third number of symbols, in the first slot of the current sub-frame, and mapping a part of information carried over the physical downlink channel repeatedly onto a number B of symbols before the start symbol position, determined according to the third number of symbols, in the first slot of the current sub-frame, where the number B of symbols is the difference between the third number of symbols and the real number of symbols in the DCI area in the current sub-frame.

In an implementation, if a group of sub-frames consisting of a preset number of sub-frames to be involved in multi-sub-frame channel estimation, in the set of sub-frames, includes an MBSFN sub-frame and a non-MBSFN sub-frame, mapping the physical downlink channel to the resources by starting at the specific start symbol position in the first slot of the current sub-frame and mapping onto all the resources other than the resources corresponding to the reference signal for demodulation includes: mapping the physical downlink channel to resources in each sub-frame in each group of sub-frames by starting at the specific start symbol position in the first slot of the current sub-frame and mapping onto all the resources other than resources corresponding to a dedicated DMRS; and mapping the physical downlink channel to the resources in the non-MBSFN sub-frame in each group of sub-frames by discarding, or setting to zero, information, carried over the physical downlink channel, mapped onto Common Reference Signal (CRS) resources, or overwriting the information with a CRS transmitted over the CRS resources.

Or if the set of sub-frames includes an MBSFN sub-frame and a non-MBSFN sub-frame, mapping the physical downlink channel to the resources by starting at the specific start symbol position in the first slot of the current sub-frame and mapping onto all the resources other than the resources corresponding to the reference signal for demodulation includes: mapping the physical downlink channel to resources in each sub-frame in the set of sub-frames by starting at the specific start symbol position in the first slot of the current sub-frame and mapping onto all the resources other than resources corresponding to a dedicated DMRS; and mapping the physical downlink channel to the resources in the non-MBSFN sub-frame in the set of sub-frames by discarding, or setting to zero, information, carried over the physical downlink channel, mapped onto CRS resources, or overwriting the information with a CRS transmitted over the CRS resources.

In an implementation, if a group of sub-frames consisting of a preset number of sub-frames to be involved in multi-sub-frame channel estimation, in the set of sub-frames, includes an MBSFN sub-frame and a non-MBSFN sub-frame, the method further includes: transmitting the physical downlink channel in the MBSFN sub-frame and the non-MBSFN sub-frame belonging to the same group of sub-frames using a same transmission scheme, where the transmission scheme at least includes one or any combining of reference signals for demodulation, transmission ports and the number of ports, and a pre-coding scheme.

Or if the set of sub-frames includes an MBSFN sub-frame and a non-MBSFN sub-frame, the method further includes: transmitting the physical downlink channel in the MBSFN sub-frame and the non-MBSFN sub-frame in the set of sub-frames using a same transmission scheme, where the transmission scheme at least includes one or any combining of reference signals for demodulation, transmission ports and the number of ports, and a pre-coding scheme.

Particularly transmitting using a same transmission scheme includes: transmitting the physical downlink channel using a transmission scheme corresponding to a specific sub-frame in the set of sub-frames or in the group of sub-frames; or transmitting the physical downlink channel using a preset transmission scheme.

Particularly transmitting the physical downlink channel using the transmission scheme corresponding to the specific sub-frame in the set of sub-frames or in the group of sub-frames includes: transmitting the physical downlink channel using a transmission scheme corresponding to a first sub-frame in the set of sub-frames or in the group of sub-frames; or transmitting the physical downlink channel using a transmission scheme corresponding to the MBSFN sub-frame in the set of sub-frames or in the group of sub-frames.

In an implementation, if a group of sub-frames consisting of a preset number of sub-frames to be involved in multi-sub-frame channel estimation, in the set of sub-frames, includes only non-MBSFN sub-frames, mapping the physical downlink channel to the resources by starting at the specific start symbol position in the first slot of the current sub-frame and mapping onto all the resources other than resources corresponding to the reference signal for demodulation includes: mapping the physical downlink channel to resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

Or if the set of sub-frames includes only non-MBSFN sub-frames, mapping the physical downlink channel to the resources by starting at the specific start symbol position in the first slot of the current sub-frame and mapping all the resources other than the resources corresponding to the reference signal for demodulation includes: mapping the physical downlink channel to resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

In an implementation, if a group of sub-frames consisting of a preset number of sub-frames to be involved in multi-sub-frame channel estimation, in the set of sub-frames, includes only MBSFN sub-frames, mapping the physical downlink channel to the resources by starting at the specific start symbol position in the first slot of the current sub-frame and mapping onto all the resources other than the resources corresponding to the reference signal for demodulation includes: mapping the physical downlink channel to resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS.

Or if the set of sub-frames includes only MBSFN sub-frames, mapping the physical downlink channel to the resources by starting at the specific start symbol position in the first slot of the current sub-frame and mapping onto all the resources other than the resources corresponding to the reference signal for demodulation includes: mapping the physical downlink channel to resources in each sub-frame in the set of sub-frames by starting at the start symbol position, determined according to a size of a DCI area in an MBSFN sub-frame, in the first slot of the current sub-frame, and mapping onto all the resources other than resources corresponding to a dedicated DMRS.

In an implementation, mapping the physical downlink channel to resources in a sub-frame configured with CSI-RS resources in the set of sub-frames, includes: discarding, or setting to zero, information, carried over the physical downlink channel, mapped onto NZP CSI-RS resources, or overwriting the information with a CSI-RS transmitted over the NZP CSI-RS resources, and discarding, or setting to zero, information, carried over the physical downlink channel, mapped onto ZP CSI-RS resources.

In a second aspect, there is provided a method for repeated transmission of downlink data, the method including: determining a set of sub-frames for repeated transmission of a physical downlink channel; determining that the physical downlink channel is mapped to resources in each sub-frame in the determined set of sub-frames by starting at a specific start symbol position in a first slot of a current sub-frame and mapping onto all resources other than resources corresponding to a reference signal for demodulation; and receiving the physical downlink channel according to the resource mapping mode.

In an implementation, the specific start symbol position is preconfigured via higher-layer signaling; or the specific start symbol position is obtained according to a size of a DCI area, and the size of the DCI area is obtained according to a CFI.

In an implementation, if the set of sub-frames includes a plurality of groups of sub-frames, the physical downlink channel is mapped to each group of sub-frames, and each group of sub-frames consists of a preset number of sub-frames to be involved in multi-sub-frame channel estimation, and includes an MBSFN sub-frame and a non-MBSFN sub-frame, determining that the physical downlink channel is mapped to the resources by starting at the specific start symbol position in the first slot of the current sub-frame includes: determining a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame; determining a specific start symbol position of each sub-frame in each group of sub-frames according to the third number of symbols; and determining that the physical downlink channel is mapped to the resources by starting at the start symbol position, determined according to the third number of symbols, in the first slot of the current sub-frame.

Or if the physical downlink channel is mapped to the set of sub-frames, and the set of sub-frames includes an MBSFN sub-frame and a non-MBSFN sub-frame, determining that the physical downlink channel is mapped to the resources by starting at the specific start symbol position in the first slot of the current sub-frame includes: determining a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determining a specific start symbol position of each sub-frame in the set of sub-frames according to the third number of symbols; and determining that the physical downlink channel is mapped to the resources by starting at the start symbol position, determined according to the third number of symbols, in the first slot of the current sub-frame.

Particularly the third number of symbols is determined as the smaller or larger one of the first number of symbols and the second number of symbols.

Particularly determining that the physical downlink channel is mapped to the resources by starting at the start symbol position, determined according to the third number of symbols, in the first slot of the current sub-frame includes: if the third number of symbols is the smaller one of the first number of symbols and the second number of symbols, determining that the physical downlink channel is mapped to resources in a sub-frame in which the real number of symbols in a DCI area is more than the third number of symbols by discarding, or setting to zero, information, carried over the physical downlink channel, mapped onto first A symbols by starting at the start symbol position, determined according to the third number of symbols, in the first slot of the current sub-frame, or overwriting the information with DCI transmitted in the A symbols, where the number A of symbols is the difference between the real number of symbols in the DCI area in the current sub-frame and the third number of symbols; or if the third number of symbols is the larger one of the first number of symbols and the second number of symbols, determining that the physical downlink channel is mapped to resources in a sub-frame in which the real number of symbols in a DCI area is less than the third number of symbols by starting at the start symbol position, determined according to the third number of symbols, in the first slot of the current sub-frame, and determining that the physical downlink channel is mapped to the resources by mapping a part of information carried over the physical downlink channel repeatedly onto a number B of symbols before the start symbol position, determined according to the third number of symbols, in the first slot of the current sub-frame, where the number B of symbols is the difference between the third number of symbols and the real number of symbols in the DCI area in the current sub-frame.

In an implementation, if a group of sub-frames consisting of a preset number of sub-frames to be involved in multi-sub-frame channel estimation, in the set of sub-frames, includes an MBSFN sub-frame and a non-MBSFN sub-frame, determining that the physical downlink channel is mapped to the resources by starting at the specific start symbol position in the first slot of the current sub-frame and mapping onto all the resources other than the resources corresponding to the reference signal for demodulation includes: determining that the physical downlink channel is mapped to the resources in each sub-frame in each group of sub-frames by starting at the specific start symbol position in the first slot of the current sub-frame and mapping onto all the resources other than resources corresponding to a dedicated DMRS; and determining that the physical downlink channel is mapped to the resources in the non-MBSFN sub-frame in each group of sub-frames by discarding, or setting to zero, information, carried over the physical downlink channel, mapped onto CRS resources, or overwriting the information with a CRS transmitted over the CRS resources.

Or if the set of sub-frames includes an MBSFN sub-frame and a non-MBSFN sub-frame, determining that the physical downlink channel is mapped to the resources by starting at the specific start symbol position in the first slot of the current sub-frame and mapping onto all the resources other than the resources corresponding to the reference signal for demodulation includes: determining that the physical downlink channel is mapped to the resources in each sub-frame in the set of sub-frames by starting at the specific start symbol position in the first slot of the current sub-frame and mapping onto all the resources other than resources corresponding to a dedicated DMRS; and determining that the physical downlink channel is mapped to the resources in the non-MBSFN sub-frame in the set of sub-frames by discarding, or setting to zero, information, carried over the physical downlink channel, mapped onto CRS resources, or overwriting the information with a CRS transmitted over the CRS resources.

In an implementation, if a group of sub-frames consisting of a preset number of sub-frames to be involved in multi-sub-frame channel estimation, in the set of sub-frames, includes an MBSFN sub-frame and a non-MBSFN sub-frame, the method further includes: receiving the physical downlink channel in the MBSFN sub-frame and the non-MBSFN sub-frame belonging to the same group of sub-frames using a same transmission scheme, where the transmission scheme at least includes one or any combining of reference signals for demodulation, transmission ports and the number of ports, and a pre-coding scheme.

Or if the set of sub-frames includes an MBSFN sub-frame and a non-MBSFN sub-frame, the method further includes:

receiving the physical downlink channel in the MBSFN sub-frame and the non-MBSFN sub-frame in the set of sub-frames using a same transmission scheme, where the transmission scheme at least includes one or any combining of reference signals for demodulation, transmission ports and the number of ports, and a pre-coding scheme.

Particularly receiving using a same transmission scheme includes: receiving the physical downlink channel using a transmission scheme corresponding to a specific sub-frame in the set of sub-frames or in the group of sub-frames; or receiving the physical downlink channel using a preset transmission scheme.

Particularly receiving the physical downlink channel using the transmission scheme corresponding to the specific sub-frame in the set of sub-frames or in the group of sub-frames includes: receiving the physical downlink channel using a transmission scheme corresponding to a first sub-frame in the set of sub-frames or in the group of sub-frames; or receiving the physical downlink channel using a transmission scheme corresponding to the MBSFN sub-frame in the set of sub-frames or in the group of sub-frames.

In an implementation, if a group of sub-frames consisting of a preset number of sub-frames to be involved in multi-sub-frame channel estimation, in the set of sub-frames, includes only non-MBSFN sub-frames, determining that the physical downlink channel is mapped to the resources by starting at the specific start symbol position in the first slot of the current sub-frame and mapping onto all the resources other than the resources corresponding to the reference signal for demodulation includes: determining that the physical downlink channel is mapped to the resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

Or if the set of sub-frames includes only non-MBSFN sub-frames, determining that the physical downlink channel is mapped to the resources by starting at the specific start symbol position in the first slot of the current sub-frame and mapping onto all the resources other than the resources corresponding to the reference signal for demodulation includes: determining that the physical downlink channel is mapped to the resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

In an implementation, if a group of sub-frames consisting of a preset number of sub-frames to be involved in multi-sub-frame channel estimation, in the set of sub-frames, includes only MBSFN sub-frames, determining that the physical downlink channel is mapped to the resources by starting at the specific start symbol position in the first slot of the current sub-frame and mapping onto all the resources other than the resources corresponding to the reference signal for demodulation includes: determining that the physical downlink channel is mapped to the resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS.

Or if the set of sub-frames includes only MBSFN sub-frames, determining that the physical downlink channel is mapped to the resources by starting at the specific start symbol position in the first slot of the current sub-frame and mapping onto all the resources other than the resources corresponding to the reference signal for demodulation includes: determining that the physical downlink channel is mapped to the resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

In an implementation, in a sub-frame configured with CSI-RS resources in the set of sub-frames, the method further includes: determining that the physical downlink channel is mapped to the resources by discarding, or setting to zero, information, carried over the physical downlink channel, mapped onto NZP CSI-RS resources, or overwriting the information with a CSI-RS transmitted over the NZP CSI-RS resources, and discarding, or setting to zero, information, carried over the physical downlink channel, mapped onto ZP CSI-RS resources.

In an implementation, receiving the physical downlink channel according to the resource mapping mode includes: receiving information, carried over resources to which the physical downlink channel is mapped by discarding, or setting to zero, or overwriting with other signals the information carried over the resources, in such a way that the information is set to zero or a specific value.

Particularly information received in each sub-frame in a group of sub-frames consisting of a preset number of sub-frames to be involved in multi-sub-frame channel estimation, in the set of sub-frames is combined by determining that information on resource positions set to 0 or a specific value is precluded from combination; or information received in each sub-frame in the set of sub-frames is combined by determining that information on resource positions set to 0 or a specific value is precluded from combination.

In a third aspect, there is provided a transmitting device including: a determining module configured to determine a set of sub-frames for repeated transmission of a physical downlink channel; a resource mapping module configured to map the physical downlink channel to resources in each sub-frame in the determined set of sub-frames by starting at a specific start symbol position in a first slot of a current sub-frame and mapping onto all resources other than resources corresponding to a reference signal for demodulation; and a transmitting module configured to transmit the physical downlink channel according to the resource mapping mode.

In an implementation, the specific start symbol position is preconfigured via higher-layer signaling; or the specific start symbol position is obtained according to a size of a DCI area, and the size of the DCI area is obtained according to a CFI.

In an implementation, the resource mapping module is configured to: if the set of sub-frames includes a plurality of groups of sub-frames, the physical downlink channel is mapped to each group of sub-frames, and each group of sub-frames consists of a preset number of sub-frames to be involved in multi-sub-frame channel estimation, and includes an MBSFN sub-frame and a non-MBSFN sub-frame, determine a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame; determine a specific start symbol position of each sub-frame in each group of sub-frames according to the third number of symbols; and map the physical downlink channel to the resources by starting at the start symbol position, determined according to the third number of symbols, in the first slot of the current sub-frame.

Or the resource mapping module is configured to: if the physical downlink channel is mapped to the set of sub-frames, and the set of sub-frames includes an MBSFN sub-frame and a non-MBSFN sub-frame, determine a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determine a specific start symbol position of each sub-frame in the set of sub-frames according to the third number of symbols; and map the physical downlink channel to the resources by starting at the start symbol position, determined according to the third number of symbols, in the first slot of the current sub-frame.

Particularly the resource mapping module is configured to determine the third number of symbols as the smaller or larger one of the first number of symbols and the second number of symbols.

Particularly the resource mapping module is configured to: if the third number of symbols is the smaller one of the first number of symbols and the second number of symbols, map the physical downlink channel to resources in a sub-frame in which the real number of symbols in a DCI area is more than the third number of symbols, by discarding, or setting to zero, information, carried over the physical downlink channel, mapped onto first A symbols, starting at the start symbol position, determined according to the third number of symbols, in the first slot of the current sub-frame, or overwriting the information with DCI transmitted in the A symbols, where the number A of symbols is the difference between the real number of symbols in the DCI area in the current sub-frame and the third number of symbols.

Or the resource mapping module is configured to: if the third number of symbols is the larger one of the first number of symbols and the second number of symbols, the resource mapping module is configured to: map the physical downlink channel to resources in a sub-frame in which the real number of symbols in a DCI area is less than the third number of symbols by starting at the start symbol position, determined according to the third number of symbols, in the first slot of the current sub-frame, and mapping a part of information carried over the physical downlink channel repeatedly onto a number B of symbols before the start symbol position, determined according to the third number of symbols, in the first slot of the current sub-frame, where the number B of symbols is the difference between the third number of symbols and the real number of symbols in the DCI area in the current sub-frame.

In an implementation, the resource mapping module is configured to: if a group of sub-frames consisting of a preset number of sub-frames to be involved in multi-sub-frame channel estimation, in the set of sub-frames, includes an MBSFN sub-frame and a non-MBSFN sub-frame, map the physical downlink channel to resources in each sub-frame in each group of sub-frames by starting at the specific start symbol position in the first slot of the current sub-frame and mapping onto all the resources other than resources corresponding to a dedicated DMRS; and map the physical downlink channel to the resources in the non-MBSFN sub-frame in each group of sub-frames by discarding, or setting to zero, information, carried over the physical downlink channel, mapped onto CRS resources, or overwriting the information with a CRS transmitted over the CRS resources.

Or the resource mapping module is configured to: if the set of sub-frames includes an MBSFN sub-frame and a non-MBSFN sub-frame, map the physical downlink channel to resources in each sub-frame in the set of sub-frames by starting at the specific start symbol position in the first slot of the current sub-frame and mapping onto all the resources other than resources corresponding to a dedicated DMRS; and map the physical downlink channel to the resources in the non-MBSFN sub-frame in the set of sub-frames by discarding, or setting to zero, information, carried over the physical downlink channel, mapped onto CRS resources, or overwriting the information with a CRS transmitted over the CRS resources.

In an implementation, the transmitting module is configured to: if a group of sub-frames consisting of a preset number of sub-frames to be involved in multi-sub-frame channel estimation, in the set of sub-frames, includes an MBSFN sub-frame and a non-MBSFN sub-frame, transmit the physical downlink channel in the MBSFN sub-frame and the non-MBSFN sub-frame belonging to the same group of sub-frames using a same transmission scheme, where the transmission scheme at least includes one or any combining of reference signals for demodulation, transmission ports and the number of ports, and a pre-coding scheme.

Or the transmitting module is configured to: if the set of sub-frames includes an MBSFN sub-frame and a non-MBSFN sub-frame, transmit the physical downlink channel in the MBSFN sub-frame and the non-MBSFN sub-frame in the set of sub-frames using a same transmission scheme, where the transmission scheme at least includes one or any combining of reference signals for demodulation, transmission ports and the number of ports, and a pre-coding scheme.

Particularly the transmitting module is configured to: transmit the physical downlink channel using a transmission scheme corresponding to a specific sub-frame in the set of sub-frames or in the group of sub-frames; or transmit the physical downlink channel using a preset transmission scheme.

Particularly the transmitting module is configured to: transmit the physical downlink channel using a transmission scheme corresponding to a first sub-frame in the set of sub-frames or in the group of sub-frames; or transmit the physical downlink channel using a transmission scheme corresponding to the MBSFN sub-frame in the set of sub-frames or in the group of sub-frames.

In an implementation, the resource mapping module is configured to: if a group of sub-frames consisting of a preset number of sub-frames to be involved in multi-sub-frame channel estimation, in the set of sub-frames, includes only non-MBSFN sub-frames, map the physical downlink channel to resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

Or the resource mapping module is configured to: if the set of sub-frames includes only non-MBSFN sub-frames, map the physical downlink channel to resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

In an implementation, the resource mapping module is configured to: if a group of sub-frames consisting of a preset number of sub-frames to be involved in multi-sub-frame channel estimation, in the set of sub-frames, includes only MBSFN sub-frames, map the physical downlink channel to resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS.

Or the resource mapping module is configured to: if the set of sub-frames includes only MBSFN sub-frames, map the physical downlink channel to resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

In an implementation, the resource mapping module is further configured to: map the physical downlink channel to resources in a sub-frame configured with CSI-RS resources in the set of sub-frames by discarding, or setting to zero, information, carried over the physical downlink channel, mapped onto NZP CSI-RS resources, or overwriting the information with a CSI-RS transmitted over the NZP CSI-RS resources, and discarding, or setting to zero, information, carried over the physical downlink channel, mapped onto ZP CSI-RS resources.

In a fourth aspect, there is provided a receiving device including: a first determining module configured to determine a set of sub-frames for repeated transmission of a physical downlink channel; a second determining module configured to determine that the physical downlink channel is mapped to resources in each sub-frame in the determined set of sub-frames by starting at a specific start symbol position in a first slot of a current sub-frame and mapping onto all resources other than resources corresponding to a reference signal for demodulation; and a receiving module configured to receive the physical downlink channel according to the resource mapping mode.

In an implementation, the specific start symbol position is preconfigured via higher-layer signaling; or the specific start symbol position is obtained according to a size of a DCI area, and the size of the DCI area is obtained according to a CFI.

In an implementation, the second determining module is configured to: if the set of sub-frames includes a plurality of groups of sub-frames, the physical downlink channel is mapped to each group of sub-frames, and each group of sub-frames consists of a preset number of sub-frames to be involved in multi-sub-frame channel estimation, and includes an MBSFN sub-frame and a non-MBSFN sub-frame, determine a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame; determine a specific start symbol position of each sub-frame in each group of sub-frames according to the third number of symbols; and determine that the physical downlink channel is mapped to the resources by starting at the start symbol position, determined according to the third number of symbols, in the first slot of the current sub-frame.

Or the second determining module is configured to: if the physical downlink channel is mapped to the set of sub-frames, and the set of sub-frames includes an MBSFN sub-frame and a non-MBSFN sub-frame, determine a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determine a specific start symbol position of each sub-frame in the set of sub-frames according to the third number of symbols; and determine that the physical downlink channel is mapped to the resources by starting at the start symbol position, determined according to the third number of symbols, in the first slot of the current sub-frame.

Particularly the second determining module is configured to determine the third number of symbols as the smaller or larger one of the first number of symbols and the second number of symbols.

Particularly the second determining module is configured to: if the third number of symbols is the smaller one of the first number of symbols and the second number of symbols, determine that the physical downlink channel is mapped to resources in a sub-frame in which the real number of symbols in a DCI area is more than the third number of symbols by discarding, or setting to zero, information, carried over the physical downlink channel, mapped onto first A symbols, starting at the start symbol position, determined according to the third number of symbols, in the first slot of the current sub-frame, or overwriting the information with DCI transmitted in the A symbols, where the number A of symbols is the difference between the real number of symbols in the DCI area in the current sub-frame and the third number of symbols.

Or the second determining module is configured to: if the third number of symbols is the larger one of the first number of symbols and the second number of symbols, determine that the physical downlink channel is mapped to resources in a sub-frame in which the real number of symbols in a DCI area is less than the third number of symbols by starting at the start symbol position, determined according to the third number of symbols, in the first slot of the current sub-frame, and determine that the physical downlink channel is mapped to the resources by mapping a part of information carried over the physical downlink channel repeatedly onto a number B of symbols before the start symbol position, determined according to the third number of symbols, in the first slot of the current sub-frame, where the number B of symbols is the difference between the third number of symbols and the real number of symbols in the DCI area in the current sub-frame.

In an implementation, the second determining module is configured to: if a group of sub-frames consisting of a preset number of sub-frames to be involved in multi-sub-frame channel estimation, in the set of sub-frames, includes an MBSFN sub-frame and a non-MBSFN sub-frame, determine that the physical downlink channel is mapped to the resources in each sub-frame in each group of sub-frames by starting at the specific start symbol position in the first slot of the current sub-frame and mapping onto all the resources other than resources corresponding to a dedicated DMRS, and determine that the physical downlink channel is mapped to the resources in the non-MBSFN sub-frame in each group of sub-frames by discarding, or setting to zero, information, carried over the physical downlink channel, mapped onto CRS resources, or overwriting the information with a CRS transmitted over the CRS resources.

Or the second determining module is configured to: if the set of sub-frames includes an MBSFN sub-frame and a non-MBSFN sub-frame, determine that the physical downlink channel is mapped to the resources in each sub-frame in the set of sub-frames by starting at the specific start symbol position in the first slot of the current sub-frame and mapping onto all the resources other than resources corresponding to a dedicated DMRS; and determine that the physical downlink channel is mapped to the resources in the non-MBSFN sub-frame in the set of sub-frames by discarding, or setting to zero, information, carried over the physical downlink channel, mapped onto CRS resources, or overwriting the information with a CRS transmitted over the CRS resources.

In an implementation, the receiving module is configured to: if a group of sub-frames consisting of a preset number of sub-frames to be involved in multi-sub-frame channel estimation, in the set of sub-frames, includes an MBSFN sub-frame and a non-MBSFN sub-frame, receive the physical downlink channel in the MBSFN sub-frame and the non-MBSFN sub-frame belonging to the same group of sub-frames using a same transmission scheme, where the transmission scheme at least includes one or any combining of reference signals for demodulation, transmission ports and the number of ports, and a pre-coding scheme.

Or the receiving module is configured to: if the set of sub-frames includes an MBSFN sub-frame and a non-MBSFN sub-frame, receive the physical downlink channel in the MBSFN sub-frame and the non-MBSFN sub-frame in the set of sub-frames using a same transmission scheme, where the transmission scheme at least includes one or any combining of reference signals for demodulation, transmission ports and the number of ports, and a pre-coding scheme.

Particularly the receiving module is configured to: receive the physical downlink channel using a transmission scheme corresponding to a specific sub-frame in the set of sub-frames or in the group of sub-frames; or receive the physical downlink channel using a preset transmission scheme.

Particularly the receiving module is configured to: receive the physical downlink channel using a transmission scheme corresponding to a first sub-frame in the set of sub-frames or in the group of sub-frames; or receive the physical downlink channel using a transmission scheme corresponding to the MBSFN sub-frame in the set of sub-frames or in the group of sub-frames.

In an implementation, the second determining module is configured to: if a group of sub-frames consisting of a preset number of sub-frames to be involved in multi-sub-frame channel estimation, in the set of sub-frames, includes only non-MBSFN sub-frames, determine that the physical downlink channel is mapped to the resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

Or the second determining module is configured to: if the set of sub-frames includes only non-MBSFN sub-frames, determine that the physical downlink channel is mapped to the resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

In an implementation, the second determining module is configured to: if a group of sub-frames consisting of a preset number of sub-frames to be involved in multi-sub-frame channel estimation, in the set of sub-frames, includes only MBSFN sub-frames, determine that the physical downlink channel is mapped to the resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS.

Or the second determining module is configured to: if the set of sub-frames includes only MBSFN sub-frames, determine that the physical downlink channel is mapped to the resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

In an implementation, the second determining module is further configured to: determine that the physical downlink channel is mapped to resources in a sub-frame configured with CSI-RS resources in the set of sub-frames by discarding, or setting to zero, information, carried over the physical downlink channel, mapped onto NZP CSI-RS resources, or overwriting the information with a CSI-RS transmitted over the NZP CSI-RS resources, and discarding, or setting to zero, information, carried over the physical downlink channel, mapped onto ZP CSI-RS resources.

In an implementation, the receiving module is configured to: when receiving the physical downlink channel according to the resource mapping mode, receive information, carried over resources to which the physical downlink channel is mapped by discarding, or setting to zero, or overwriting with other signals the information carried over the resources, in such a way that the information is set to zero or a specific value.

Particularly the receiving module is further configured to: combine information received in each sub-frame in a group of sub-frames consisting of a preset number of sub-frames to be involved in multi-sub-frame channel estimation, in the set of sub-frames by determining that information on resource positions set to 0 or a specific value is precluded from combination; or combine information received in each sub-frame in the set of sub-frames by determining that information on resource positions set to 0 or a specific value is precluded from combination.

With the technical solutions above, in the embodiments of the disclosure, when transmitting downlink data repeatedly, a set of sub-frames for repeated transmission of a physical downlink channel is determined, the physical downlink channel is mapped to resources in each sub-frame in the set of sub-frames by starting at a specific start symbol position in a first slot of a current sub-frame and mapping onto all resources other than resources corresponding to a reference signal for demodulation, and the physical downlink channel is transmitted according to the resource mapping mode, so that there will be a same number of available REs for mapping the transmission data to resources in different sub-frames to enable the data transmitted repeatedly in the sub-frames to be combined across the sub-frames.

DETAILED DESCRIPTION OF THE EMBODIMENTS

In order to make the objects, technical solutions, and advantages of the disclosure more apparent, the disclosure will be described below in further details with reference to the drawings, and apparently the embodiments to be described below are only a part but not all of the embodiments of the disclosure. Based upon the embodiments here of the disclosure, all the other embodiments which can occur to those ordinarily skilled in the art without any inventive effort shall fall into the scope of the disclosure.

Figure 1:
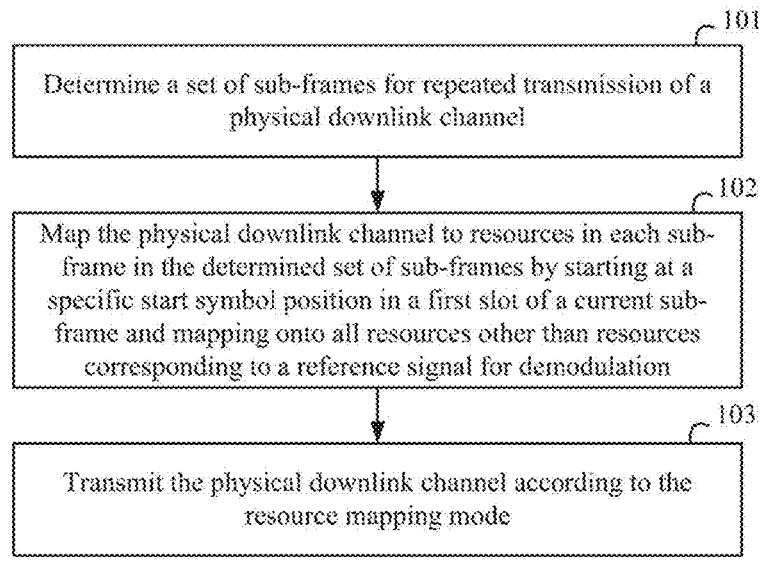
FIG. 1 is a schematic flow chart of a method for repeated transmission of downlink data by a transmitter according to an embodiment of the disclosure.

As illustrated in FIG. 1, a detailed flow of a method for repeated transmission of downlink data by a transmitter according to an embodiment of the disclosure is as follows.

The operation 101 is to determine a set of sub-frames for repeated transmission of a physical downlink channel.

The operation 102 is to map the physical downlink channel to resources in each sub-frame in the determined set of sub-frames by starting at a specific start symbol position in a first slot of a current sub-frame and mapping onto all resources other than resources corresponding to a reference signal for demodulation.

Particularly in each sub-frame in the set of sub-frames, channel encoding and rate matching is performed on Transport Blocks (TBs) carried over the physical channel by reserving only resources corresponding to the reference signal for demodulation and to a control area, that is, those resources in the sub-frame available to transmission of the physical downlink channel are determined according to the resource mapping mode assumed above, the number of encoded bits for the physical downlink channel is obtained according to the number of the determined resources and a modulation scheme, channel encoding and rate matching is performed on the transport blocks carried over the physical downlink channel according to the number of encoded bits, a sequence of encoded bits is modulated, and processed otherwise (e.g., scrambled, pre-coded, etc.), and a resulting sequence of complex symbols is mapped onto the corresponding resources in the sub-frame according to the resource mapping mode described above.

In the embodiment of the disclosure, the physical downlink channel is mapped starting at the specific start symbol position in the first slot of the current sub-frame so that the physical downlink channel is mapped to the resources by reserving only the resources corresponding to the reference signal for demodulation and the control area, that is, the reserved resources will not be used to transmit data of the physical downlink channel, but all the other resources are supposed to be able to transmit data of the physical downlink channel.

Particularly the specific start symbol position can be determined in the following schemes without any limitation thereto.

In a first scheme, the specific start symbol position is preconfigured via higher-layer signaling; and In a second scheme, the specific start symbol position is obtained according to a size of a Downlink Control Information (DCI) area, and the size of the DCI area is obtained according to a Control Format Indicator (CFI).

In the embodiment of the disclosure, the size of the DCI area is the size of the control area; and in an MBSFN frame, the size of the control area is a size of a non-MBSFN area.

In the first scheme to determine the specific start symbol position, no matter whether a cross-carrier scheduling scheme is applied to a sub-frame in the set of sub-frames, the physical downlink channel is mapped to resources using a start symbol position configured via higher-layer signaling, and the start symbol position configured via higher-layer signaling will be applicable to both an MBSFN sub-frame and a non-MBSFN sub-frame. Optionally if a group of sub-frames consisting of a preset number of sub-frames to be involved in multi-sub-frame channel estimation, in the set of sub-frames, includes an MBSFN sub-frame and a non-MBSFN sub-frame, or the set of sub-frames includes an MBSFN sub-frame and a non-MBSFN sub-frame, the network side configures the start symbol position unifiedly while taking into account demands of the MBSFN sub-frame and the non-MBSFN sub-frame for the control area, for example, the size of the control area for the MBSFN sub-frame is two symbols, and the size of the control area for the non-MBSFN sub-frame is three symbols, and if the larger one of the sizes of the control areas for the MBSFN sub-frame and the non-MBSFN sub-frame is taken, a UE may be instructed by the higher-layer signaling to transmit data information from the fourth symbol; and if the smaller one of the sizes of the control areas for the MBSFN sub-frame and the non-MBSFN sub-frame is taken, a UE may be instructed by the higher-layer signaling to transmit data information from the third symbol.

In the embodiment of the disclosure, the physical downlink channel is mapped onto all the resources other than the resources corresponding to the reference signal for demodulation by starting at the specific start symbol position in the first slot of the current sub-frame, that is, only the resources corresponding to the reference signal for demodulation and to the control area are reserved, and the reserved resources are not used to transmit data of the physical downlink channel, but all the other resources are supposed to be able to transmit data of the physical downlink channel, particularly in the following several different implementations without any limitation thereto.

In a mapping scheme A of a first implementation, the set of sub-frames is divided into a plurality of groups of sub-frames, and the physical downlink channel is mapped to the respective groups of sub-frames, that is, if a group of sub-frames including a preset number of sub-frames to be involved in multi-sub-frame channel estimation, in the set of sub-frames, includes an MBSFN sub-frame and a non-MBSFN sub-frame, a third number of symbols occupied by a DCI area in each sub-frame in the group of sub-frames may be determined according to a first number of symbols occupied by a DCI area in the MBSFN sub-frame, and a second number of symbols occupied by a DCI area in the non-MBSFN sub-frame, and a specific start symbol position of each sub-frame in the group of sub-frames may be determined according to the third number of symbols; and the physical downlink channel is mapped to the resources by starting at the start symbol position, determined according to the third number of symbols, in the first slot of the current sub-frame.

In a mapping scheme B of the first implementation, the physical downlink channel is mapped directly to the set of sub-frames, that is, if the set of sub-frames includes an MBSFN sub-frame and a non-MBSFN sub-frame, a third number of symbols occupied by a DCI area in each sub-frame in the set of sub-frames may be determined according to a first number of symbols occupied by a DCI area in the MBSFN sub-frame, and a second number of symbols occupied by a DCI area in the non-MBSFN sub-frame, and a specific start symbol position of each sub-frame in the set of sub-frames may be determined according to the third number of symbols; and the physical downlink channel is mapped to the resources by starting at the start symbol position, determined according to the third number of symbols, in the first slot of the current sub-frame.

Particularly in the mapping scheme A and the mapping scheme B of the first implementation, the first number of symbols is the system-configured number of symbols in the control area of the MBSFN sub-frame (i.e., a size of a non-MBSFN area), the second number of symbols is the system-configured number of symbols in the control area of a non-MBSFN sub-frame, and the third number of symbols is determined as the smaller or larger one of the first number of symbols and the second number of symbols.

In an implementation, if the third number of symbols is the smaller one of the first number of symbols and the second number of symbols, and the real number of symbols in the control area of the current sub-frame is more than the third number of symbols, the physical downlink channel is mapped to the resources in the sub-frame by puncturing data information corresponding to RE positions of a number A of symbols in the control area. That is, when channel encoding and rate matching is performed on TBs carried over the physical downlink channel, suppose the number of REs available to data is determined according to the size of the control area corresponding to the third number of symbols to calculate a target number of rate-matched bits, even if the real sizes of control areas for different sub-frames are different, the numbers of available REs are calculated according to the unified size of the control area to obtain a same target number of rate-matched bits. When the physical downlink channel is actually mapped to the resources, if the number of symbols in the real control area of the sub-frame is more than the third number of symbols, when the rate-matched data is assumed to be mapped to the resources according to the size of the control area corresponding to the third number of symbols, the real data information is mapped onto the number A of symbols in the control area, but DCI is transmitted on the number A of symbols, so in order to prevent the DCI from being affected, the data in the number A of symbols need to be punctured, particularly as follows: the physical downlink channel is mapped to resources in the sub-frame in which the real number of symbols in the DCI area is more than the third number of symbols, by discarding, or setting to zero, or overwriting with the DCI transmitted in the A symbols, the information, carried over the physical downlink channel, mapped onto first A symbols in the first slot of the current sub-frame starting at the start symbol position determined according to the third number of symbols because the number A of symbols are originally resource positions on which the DCI is transmitted, and in order to prevent transmission of the original DCI from being affected, the data information mapped onto the number A of symbols is overwritten with the DCI information transmitted on the number A of symbols, that is, the data information on the number A of symbols is punctured, where the number A of symbols is the difference between the real number of symbols in the DCI area in the current sub-frame and the third number of symbols.

In an implementation, if the third number of symbols is the larger one of the first number of symbols and the second number of symbols, if the real number of symbols in the control area of the current sub-frame is less than the third number of symbols, the physical downlink channel is mapped to the resources by starting at a symbol numbered #P in the current sub-frame, and furthermore mapping a part of the result of rate matching repeatedly onto a symbol numbered #P−1 in the sub-frame, where suppose symbols in a sub-frame are numbered starting at 0, P is the third number of symbols, that is, when channel encoding and rate matching is performed on the TBs carried over the physical downlink channel, the number of REs available to data is supposed to be determined according to the size of the control area corresponding to the third number of symbols to calculate a target number of rate-matched bits, and even if the real sizes of control areas for different sub-frames are different, the numbers of available REs are calculated according to the unified size of the control area to obtain a same target number of rate-matched bits; when the physical downlink channel is really mapped to the resources, where if the number of symbols in the real control area of the sub-frame is less than the third number of symbols, the physical downlink channel is mapped starting at the position corresponding to the third number of symbols, so that actually there are a number B of symbols spared instead of being used for data transmission, and the number B of symbols do not belong to the real control area of the sub-frame; and in order to improve the utilization ratio of the resources, a part of the rate-matched data can be mapped repeatedly onto the number B of symbols to achieve a diversity gain, particularly as follows: the physical downlink channel is mapped to resources in the sub-frame in which the real number of symbols in the DCI area is less than the third number of symbols by starting at the start symbol position, determined according to the third number of symbols, in the first slot of the current sub-frame, and mapping a part of the information carried over the physical downlink channel repeatedly onto a number B of symbols before the start symbol position, determined according to the third number of symbols, in the first slot of the current sub-frame, where the number B of symbols is the difference between the third number of symbols and the real number of symbols in the DCI area in the current sub-frame.

In a second implementation, if the group of sub-frames including the preset number of sub-frames to be involved in multi-sub-frame channel estimation, in the set of sub-frames, includes an MBSFN sub-frame and a non-MBSFN sub-frame, or the set of sub-frames includes an MBSFN sub-frame and a non-MBSFN sub-frame, the reference signal for demodulation may be a dedicated Demodulation Reference signal (DMRS), that is, only RE resources corresponding to the control area and corresponding to each antenna port via which a DMRS is transmitted may be reserved, and all the other resources are supposed to be used to transmit data of the physical downlink channel. That is, the physical downlink channel is mapped to the resources by starting at the specific start symbol position in the first slot of the current sub-frame and mapping onto all the resources other than the resources corresponding to the DMRS.

For the non-MBSFN sub-frame in the group of sub-frames including the preset number of sub-frames to be involved in multi-sub-frame channel estimation, in the set of sub-frames, or for the non-MBSFN sub-frame in the set of sub-frames, suppose channel encoding and rate matching is performed on the transport blocks carried over the physical downlink channel without any CRS RE. When the physical downlink channel is mapped onto the resources in the sub-frame, data information mapped onto the CRS REs is punctured, i.e., when channel encoding and rate matching is performed on the TBs carried over the physical downlink channel, suppose only the resources corresponding to the control area and the DMRS are reserved to determine the number of REs available to the data, that is, all the resources other than the control area and the DMRS resources can be used to transmit the physical downlink channel, and the number of available REs for transmitting the physical downlink channel can be obtained to calculate a target number of rate-matched bits. Even if there is no CRS beyond the control area in the MBSFN sub-frame, there is a CRS beyond the control area in the non-MBSFN sub-frame, but suppose there is no CRS in the non-MBSFN sub-frame, that is, the number of available REs for transmitting the physical downlink channel is calculated while also taking into account the CRS resources in the non-MBSFN sub-frame, thus resulting using a same target number of rate-matched bits for the MBSFN sub-frame and the non-MBSFN sub-frame. When the physical downlink channel is actually mapped to the resources, a CRS is transmitted over a part of the resources for data transmission in the non-MBSFN sub-frame, and in order to prevent transmission of a CRS from being affected, the data mapped onto the CRS REs needs to be punctured, particularly in the following two mapping schemes.

In a mapping scheme A, the set of sub-frames is divided into a plurality of groups of sub-frames, and the physical downlink channel is mapped to the respective groups of sub-frames, that is, if the group of sub-frames including the preset number of sub-frames to be involved in multi-sub-frame channel estimation, in the set of sub-frames, includes an MBSFN sub-frame and a non-MBSFN sub-frame, the physical downlink channel is mapped to the resources in each sub-frame in each group of sub-frames by starting at the specific start symbol position in the first slot of the current sub-frame and mapping onto all the resources other than the resources corresponding to the DMRS, where the current sub-frame may be an MBSFN sub-frame or a non-MBSFN sub-frame; and when the physical downlink channel is mapped to the resources in the non-MBSFN sub-frame in the group of sub-frames, suppose there is no CRS resource, the physical downlink channel is mapped to all the resources other than the resources corresponding to the DMRS by starting at the specific start symbol position in the first slot of the current sub-frame, and the information, carried over the physical downlink channel and mapped onto the CRS resources, is discarded instead of being mapped, or set to zero, or overwritten with the CRS transmitted over the CRS resources because the CRS resources are originally resources on which the CRS is transmitted, and in order to prevent transmission of the original CRS from being affected, the data information mapped onto the resources is overwritten with the CRS transmitted over the resources, that is, the data information on the resource positions is punctured.

In a mapping scheme B, the physical downlink channel is mapped directly to the set of sub-frames, that is, if the set of sub-frames includes an MBSFN sub-frame and a non-MBSFN sub-frame, the physical downlink channel is mapped to the resources in each sub-frame in the set of sub-frames by starting at the specific start symbol position in the first slot of the current sub-frame and mapping to all the resources other than the resources corresponding to the DMRS; and when the physical downlink channel is mapped to the resources in the non-MBSFN sub-frame in the set of sub-frames, suppose there is no CRS resource, the physical downlink channel is mapped to all the resources other than the resources corresponding to the DMRS by starting at the specific start symbol position in the first slot of the current sub-frame, and the information, carried over the physical downlink channel and mapped onto the CRS resources, is discarded instead of being mapped, or set to zero, or overwritten with the CRS transmitted over the CRS resources because the CRS resources are originally resources on which the CRS is transmitted, and in order to prevent transmission of the original CRS from being affected, the data information mapped onto the resources is overwritten with the CRS transmitted over the resources, that is, the data information on the resource positions is punctured.

In a third implementation, if the group of sub-frames including the preset number of sub-frames to be involved in multi-sub-frame channel estimation, in the set of sub-frames, or the set of sub-frames includes only non-MBSFN sub-frames, the number of symbols in a control area in each sub-frame in the group of sub-frames, or the set of sub-frames is the number of symbols in a control area configured for a non-MBSFN sub-frame, that is, channel encoding and rate matching is performed on transport blocks carried over the physical downlink channel by reserving REs corresponding to the control area configured for the non-MBSFN sub-frame. A reference signal for demodulation in each sub-frame is a CRS, or if a DMRS-based transmission scheme is applied to the physical downlink channel, reference signals for demodulation in each sub-frame include both a CRS and a DMRS, that is, channel encoding and rate matching is performed on the transport blocks carried over the physical downlink channel by reserving REs corresponding to each antenna port via which the CRS is transmitted, and if there is a DMRS (e.g., in the transmission mode 9 and the transmission mode 10), channel encoding and rate matching is performed on the transport blocks carried over the physical downlink channel by further reserving REs corresponding to each antenna port via which the DMRS is transmitted. At this time, since all the sub-frames are non-MBSFN sub-frames, there is a CRS transmitted in each sub-frame, and the size of the control area of each sub-frame is the size of the control area configured for a non-MBSFN sub-frame, so the number of available REs, for transmitting the physical downlink channel, obtained according to the resource mapping mode assumed above is the same in each sub-frame; and since the physical downlink channel is mapped to the resources by reserving CRS resources, and the reserved size of the control area is the real size of the control area of the sub-frame, the data carried over the physical downlink channel does not need to be punctured.

Particularly there are the following two mapping schemes.

In a mapping scheme A, the set of sub-frames is divided into a plurality of groups of sub-frames, and the physical downlink channel is mapped to the respective groups of sub-frames, that is, if the group of sub-frames including the preset number of sub-frames to be involved in multi-sub-frame channel estimation, in the set of sub-frames, includes only non-MBSFN sub-frames, the physical downlink channel is mapped to the resources in each sub-frame in each group of sub-frames by starting at the start symbol position in the first slot of the current sub-frame, determined according to a size of a DCI area in a non-MBSFN sub-frame and mapping onto all the resources other than the resources corresponding to a CRS, or corresponding to a CRS and a dedicated DMRS.

In a mapping scheme B, the physical downlink channel is mapped directly to the set of sub-frames, that is, if the set of sub-frames includes only non-MBSFN sub-frames, the physical downlink channel is mapped to the resources in each sub-frame in the set of sub-frames by starting at the start symbol position in the first slot of the current sub-frame, determined according to a size of a DCI area in a non-MBSFN sub-frame and mapping onto all the resources other than the resources corresponding to a CRS, or corresponding to a CRS and a dedicated DMRS.

In a fourth implementation, if the group of sub-frames including the preset number of sub-frames to be involved in multi-sub-frame channel estimation, in the set of sub-frames, or the set of sub-frames includes only MBSFN sub-frames, the number of symbols in a control area in each sub-frame in the group of sub-frames, or the set of sub-frames is the number of symbols in a control area configured for an MBSFN sub-frame, that is, channel encoding and rate matching is performed on transport blocks carried over the physical downlink channel by reserving REs corresponding to the control area configured for the MBSFN sub-frame. A reference signal for demodulation in each sub-frame is a DMRS, and the channel encoding and rate matching is performed on the transport blocks carried over the physical downlink channel by reserving REs corresponding to each antenna port via which the DMRS is transmitted. At this time, since all the sub-frames are MBSFN sub-frames, there is no CRS transmitted in each sub-frame, the size of the control area of each sub-frame is the size of the control area configured for an MBSFN sub-frame, and the demodulation is based on DMRS, so the number of available REs, for transmitting the physical downlink channel, obtained according to the resource mapping mode assumed above is the same in each sub-frame; and since the physical downlink channel is mapped to the resources by reserving DMRS resources, and the reserved size of the control area is the real size of the control area of the sub-frame, the data carried over the physical downlink channel does not need to be punctured.

Particularly there are the following two mapping schemes.

In a mapping scheme A, the set of sub-frames is divided into a plurality of groups of sub-frames, and the physical downlink channel is mapped to the respective groups of sub-frames, that is, if the group of sub-frames including the preset number of sub-frames to be involved in multi-sub-frame channel estimation, in the set of sub-frames, includes only MBSFN sub-frames, the physical downlink channel is mapped to the resources in each sub-frame in each group of sub-frames by starting at the start symbol position in the first slot of the current sub-frame, determined according to a size of a DCI area in the MBSFN sub-frame and mapping onto all the resources other than the resources corresponding to a dedicated DMRS.

In a mapping scheme B, the physical downlink channel is mapped directly to the set of sub-frames, that is, if the set of sub-frames includes only MBSFN sub-frames, the physical downlink channel is mapped to the resources in each sub-frame in the set of sub-frames by starting at the start symbol position in the first slot of the current sub-frame, determined according to a size of a DCI area in the MBSFN sub-frame and mapping onto all the resources other than the resources corresponding to a dedicated DMRS.

The first to fourth implementations above can be applied in combination, for example, the first and second implementations can be applied together.

In any one or a combination of the first to fourth implementations, for a sub-frame configured with CSI-RS resources, when channel encoding and rate matching is performed on the transport blocks carried over the physical downlink channel, suppose there is no CSI-RS RE, and when the physical downlink channel is mapped to the resources in the sub-frame, the data information corresponding to CSI-RS RE positions is punctured, that is, when channel encoding and rate matching is performed on the TBs carried over the physical downlink channel, suppose the physical downlink channel is mapped to the resources by reserving only the resources corresponding to the control area and the reference signal for demodulation (either or both of a CRS and a DMRS) to determine the number of REs available to data, that is, the physical downlink channel can be transmitted in all the resources other than the resources of the control area and a reference signal for demodulation, that is, the number of available REs for transmitting the physical downlink channel is calculated by also taking into account the CSI-RS resources to obtain the number of available REs for transmitting the physical downlink channel to calculate a target number of rate-matched bits, thus resulting using a same target number of rate-matched bits for a sub-frame including a CSI-RS and a sub-frame including no CSI-RS; and when the physical downlink channel is really mapped to the resources, a CSI-RS is transmitted over part of the resources for data transmission in the sub-frame including a CSI-RS, and in order to prevent transmission of a CSI-RS from being affected, the data mapped onto the REs corresponding to the CSI-RS needs to be punctured, particularly as follows: in a sub-frame configured with CSI-RS resources, where the CSI-RS resources include ZP CSI-RS resources and/or NZP CSI-RS resources, when the physical downlink channel is mapped to the resources, suppose there is no CSI-RS resource, the physical downlink channel is mapped onto all the resources other than the resources corresponding to the reference signal for demodulation by starting at the specific start symbol position in the first slot of the current sub-frame, and the information, carried over the physical downlink channel, mapped onto a NZP CSI-RS resource is discarded instead of being mapped, or set to zero, or overwritten with a CSI-RS transmitted over the NZP CSI-RS resource because the resource is originally a resource on which the CSI-RS is transmitted, and in order to prevent transmission of the original CSI-RS from being affected, the data information mapped onto the resource is overwritten with the CRS information transmitted over the resource, that is, the data information on the resource positions is punctured, and the information, carried over the physical downlink channel, mapped onto the ZP CSI-RS resources is discarded instead of being mapped, or set to zero, that is, the resources are originally idle resources over which the current UE does not transmit any information, and reserved for another UE to transmit a CSI-RS over the resources, thus preventing mutual interference between the UEs; and in order to prevent interference to a CSI-RS of the other UE, the information on the positions is discarded instead of being mapped, or set to zero, that is, the data information on the resource positions is punctured.

The operation 103 is to transmit the physical downlink channel according to the resource mapping mode.

In an implementation, the physical downlink channel is transmitted in an MBSFN sub-frame and a non-MBSFN sub-frame using a same transmission scheme, for example, using a same reference signal for demodulation, e.g., a DMRS, same transmission ports and same number of ports, a same pre-coding scheme, etc., and particularly, for example, the physical downlink channel is transmitted via a single port which is a same antenna port, or using a transmit diversity on same C antenna ports, or Random Beam-Forming (RBF) transmission of same C antenna ports, or spatial multiplexing of same ports and number of ports (layers).

In a first implementation, the set of sub-frames is divided into a plurality of groups of sub-frames, and the physical downlink channel is mapped to respective groups of sub-frames, that is, if the group of sub-frames including the preset number of sub-frames to be involved in multi-sub-frame channel estimation, in the set of sub-frames, includes an MBSFN sub-frame and a non-MBSFN sub-frame, the physical downlink channel is transmitted in the MBSFN sub-frames and the non-MBSFN sub-frames belonging to the same group of sub-frames using a same transmission scheme, where the transmission scheme at least includes one or any combining of reference signals for demodulation, transmission ports and the number of ports, and a pre-coding scheme.

In a second implementation, the physical downlink channel is mapped directly to the set of sub-frames, that is, if the set of sub-frames includes an MBSFN sub-frame and a non-MBSFN sub-frame, the physical downlink channel is transmitted in the MBSFN sub-frames and the non-MBSFN sub-frames in the set of sub-frames using a same transmission scheme, where the transmission scheme at least includes one or any combining of reference signals for demodulation, transmission ports and the number of ports, and a pre-coding scheme.

In the first and second implementations, the transmission scheme for the MBSFN sub-frame and the non-MBSFN sub-frame can be determined in the following two approaches without any limitation thereto.

In a first approach, the physical downlink channel is transmitted using a transmission scheme corresponding to a specific sub-frame in the set of sub-frames or in the group of sub-frames.

Particularly the physical downlink channel is transmitted using a transmission scheme corresponding to the first sub-frame in the set of sub-frames or in the group of sub-frames.

For example, if the first sub-frame in the set of sub-frames is scheduled to transmit the physical downlink channel using the transmission mode 9, the DCI format 1A is applied to scheduling signaling, and the sub-frame is a non-MBSFN sub-frame, the physical downlink channel is transmitted in all the sub-frames in the set of sub-frames using a transmission scheme scheduled in a non-MBSFN sub-frame, using the DCI format 1A and the transmission mode 9, that is, based upon a CRS, if the number of antenna ports for a PBCH is 1, the physical downlink channel is transmitted via a single antenna port; otherwise, the physical downlink channel is transmitted using a transmit diversity.

In another example, if the first sub-frame in the set of sub-frames is scheduled to transmit the physical downlink channel using the transmission mode 9, the DCI format 1A is applied to scheduling signaling, and the sub-frame is an MBSFN sub-frame, the physical downlink channel is transmitted in all the sub-frames in the set of sub-frames using a transmission scheme scheduled in an MBSFN sub-frame, using the DCI format 1A and the transmission mode 9, that is, based upon a DMRS, the physical downlink channel is transmitted via a single antenna port, which is the antenna port 7.

In still another example, if the first sub-frame in the set of sub-frames is scheduled to transmit the physical downlink channel using the transmission mode 9, and the DCI format 2C is applied to scheduling signaling, the physical downlink channel is transmitted in all the sub-frames in the set of sub-frames using the transmission mode 9 and the number of antenna ports notified of by scheduling signaling in the DCI format 2C, that is, the physical downlink channel is transmitted through spatial multiplexing of at most 8 layers via a part or all of the antenna ports 7 to 14 based upon a DMRS.

Particularly the physical downlink channel is transmitted using a transmission scheme corresponding to the MBSFN sub-frame in the set of sub-frames or in the group of sub-frames.

For example, the physical downlink channel is transmitted via the single antenna port 7 or 8 based upon a DMRS, or transmitted through spatial multiplexing of at most 8 layers via a part or all of the antenna ports 7 to 14 based upon a DMRS.

In a second approach, the sub-frame is transmitted using a preset transmission scheme.

For example, in the preset transmission scheme, the physical downlink channel is transmitted via the single antenna port 7 or 8 based upon a DMRS, and optionally transmitted by scheduling one transport block using the DCI format 1A; or transmitted through random beam-forming of a number D of antenna ports based upon a DMRS, and optionally transmitted by scheduling one transport block using the DCI format 1A; or transmitted through spatial multiplexing of at most 8 layers via a part or all of the antenna ports 7 to 14 according to the number of DMRS antenna ports indicated in scheduling signaling, and optionally transmitted by scheduling one or two transport blocks using the DCI format 2C or 2D.

Figure 2:
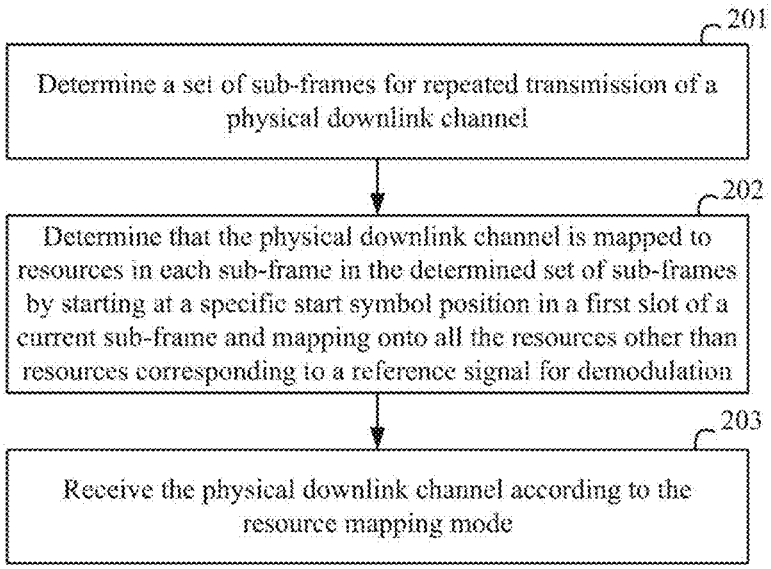
FIG. 2 is a schematic flow chart of a method for repeated transmission of downlink data by a receiver according to an embodiment of the disclosure.

Based upon a same inventive conception, as illustrated in FIG. 2, a detailed flow of a method for repeated transmission of downlink data by a receiver according to an embodiment of the disclosure is as follows.

The operation 201 is to determine a set of sub-frames for repeated transmission of a physical downlink channel.

The operation 202 is to determine that the physical downlink channel is mapped to resources in each sub-frame in the determined set of sub-frames by starting at a specific start symbol position in a first slot of a current sub-frame and mapping onto all the resources other than resources corresponding to a reference signal for demodulation.

Particularly in each sub-frame in the set of sub-frames, it is determined that channel encoding and rate matching is performed by a transmitter on Transport Blocks (TBs) carried over the physical channel by reserving only resources corresponding to the reference signal for demodulation and to a control area, that is, those resources in the sub-frame available to transmission of the physical downlink channel are determined according to the resource mapping mode assumed above, data information is obtained on these resource positions, and is demodulated, and processed accordingly (e.g., de-scrambled, de-pre-coded, etc.), the number of encoded bits for the physical downlink channel is obtained according to the determined number of resources and modulation scheme, and de-rate-matching and channel decoding is performed on the transport blocks carried over the physical downlink channel according to the number of encoded bits to obtain the original transport blocks.

Particularly the specific start symbol position is preconfigured via higher-layer signaling; or the specific start symbol position is obtained according to a size of a DCI area, and the size of the DCI area is obtained according to a CFI. Reference can be made to the related description of the transmitter for details thereof, so a repeated description thereof is omitted here.

In the embodiment of the disclosure, it is determined that the physical downlink channel is mapped onto the resources by starting at a specific start symbol position in a first slot of a current sub-frame, that is, only the resources corresponding to the reference signal for demodulation and to the control area are reserved, and the reserved resources cannot be used to transmit data of the physical downlink channel, but all the other resources can be used to transmit data of the physical downlink channel, particularly in the following several different implementations without any limitation thereto.

In a mapping scheme A of a first Implementation, the set of sub-frames is divided into a plurality of groups of sub-frames, and the physical downlink channel is mapped to the respective groups of sub-frames, that is, if a group of sub-frames including a preset number of sub-frames to be involved in multi-sub-frame channel estimation, in the set of sub-frames, includes an MBSFN sub-frame and a non-MBSFN sub-frame, then, it is determined that when the physical downlink channel is mapped to the resources, a third number of symbols occupied by a DCI area in each sub-frame in the group of sub-frames is determined according to a first number of symbols occupied by a DCI area in the MBSFN sub-frame and a second number of symbols occupied by a DCI area in the non-MBSFN sub-frame, and a specific start symbol position of each sub-frame in the group of sub-frames is determined according to the third number of symbols; and it is determined that the physical downlink channel is mapped to the resources by starting at the start symbol position, determined according to the third number of symbols, in the first slot of the current sub-frame.

In a mapping scheme B of the first Implementation, the physical downlink channel is mapped directly to the set of sub-frames, that is, if the set of sub-frames includes an MBSFN sub-frame and a non-MBSFN sub-frame, then, it is determined that when the physical downlink channel is mapped to the resources, a third number of symbols occupied by a DCI area in each sub-frame in the set of sub-frames is determined according to a first number of symbols occupied by a DCI area in the MBSFN sub-frame and a second number of symbols occupied by a DCI area in the non-MBSFN sub-frame, and a specific start symbol position of each sub-frame in the set of sub-frames is determined according to the third number of symbols; and it is determined that the physical downlink channel is mapped to the resources by starting at the start symbol position, determined according to the third number of symbols, in the first slot of the current sub-frame.

Particularly in the mapping scheme A and the mapping scheme B of the first implementation, the first number of symbols is the system-configured number of symbols in the control area of the MBSFN sub-frame (i.e., a size of a non-MBSFN area), the second number of symbols is the system-configured number of symbols in the control area of the non-MBSFN sub-frame, and the third number of symbols is the smaller or larger one of the first number of symbols and the second number of symbols.

In an implementation, if the third number of symbols is the smaller one of the first number of symbols and the second number of symbols, it is determined that if the real number of symbols in the control area of the sub-frame is more than the third number of symbols, it is determined that when the physical downlink channel is mapped to the resources, data information corresponding to RE positions of a number A of symbols in the control area is punctured, that is, it is determined that when channel encoding and rate matching is performed on TBs carried over the physical downlink channel, suppose the number of REs available to data is determined according to the size of the control area corresponding to the third number of symbols, and the data is received on these REs, and a target number of rate-matched bits is calculated, even if the real sizes of control areas for different sub-frames are different, the numbers of available REs are calculated according to the unified size of the control area to obtain the same target number of rate-matched bits; and when the physical downlink channel is really mapped to the resources, if the number of symbols in the real control area of the sub-frame is more than the third number of symbols, if the rate-matched data is assumed to be mapped to the resources according to the size of the control area corresponding to the third number of symbols, the real data information is mapped onto the number A of symbols in the control area, but DCI is transmitted on the number A of symbols, so in order to prevent the DCI from being affected, the data in the number A of symbols needs to be punctured, particularly as follows: it is determined that the physical downlink channel is mapped to the resources in the sub-frame in which the real number of symbols in the DCI area is more than the third number of symbols, by discarding, or setting to zero, or overwriting with the DCI transmitted in the A symbols, the information, carried over the physical downlink channel, mapped onto first A symbols in the first slot of the current sub-frame, starting at the start symbol position determined according to the third number of symbols because the number A of symbols are originally resource positions on which the DCI is transmitted, and in order to prevent transmission of the original DCI from being affected, the data information mapped onto the number A of symbols is overwritten with the DCI information transmitted on the number A of symbols, that is, the data information on the number A of symbols is punctured, where the number A of symbols is the difference between the real number of symbols in the DCI area in the current sub-frame and the third number of symbols.

In an implementation, if the third number of symbols is the larger one of the first number of symbols and the second number of symbols, it is determined that if the real number of symbols in the control area of the sub-frame is less than the third number of symbols, the physical downlink channel is mapped to the resources by starting at a symbol numbered #P in the current sub-frame, and furthermore mapping a part of the result of rate matching repeatedly onto a symbol numbered #P−1 in the sub-frame, where suppose symbols in a sub-frame are numbered starting at 0, P is the third number of symbols, that is, it is determined that when channel encoding and rate matching is performed on the TBs carried over the physical downlink channel, the number of REs available to data is supposed to be determined according to the size of the control area corresponding to the third number of symbols, data are received on these available REs, and a target number of rate-matched bits is calculated, and even if the real sizes of control areas for different sub-frames are different, the numbers of available REs are calculated according to the unified size of the control area to obtain the same target number of rate-matched bits; when physical downlink channel is really mapped to the resources, where if the number of symbols in the real control area of the sub-frame is less than the third number of symbols, the physical downlink channel is mapped starting at the position corresponding to the third number of symbols, so that actually there are a number B of symbols spared instead of being used for data transmission, and the number B of symbols do not belong to the real control area of the sub-frame; and in order to improve the utilization ratio of the resources, a part of the rate-matched data can be mapped repeatedly onto the number B of symbols to achieve a diversity gain, particularly as follows: it is determined that the physical downlink channel is mapped to resources in the sub-frame in which the real number of symbols in the DCI area is less than the third number of symbols by starting at the start symbol position, determined according to the third number of symbols, in the first slot of the current sub-frame, and it is determined that the physical downlink channel is mapped to the resources by mapping a part of the information carried over the physical downlink channel repeatedly onto a number B of symbols before the start symbol position, determined according to the third number of symbols, in the first slot of the current sub-frame, where the number B of symbols is the difference between the third number of symbols and the real number of symbols in the DCI area in the current sub-frame.

In a second implementation, if the group of sub-frames including the preset number of sub-frames to be involved in multi-sub-frame channel estimation, in the set of sub-frames, includes an MBSFN sub-frame and a non-MBSFN sub-frame, or the set of sub-frames includes an MBSFN sub-frame and a non-MBSFN sub-frame, it is determined that the reference signal for demodulation is a DMRS in each sub-frame in the set of sub-frames or in the group of sub-frames, that is, it is determined that the physical downlink channel is mapped to the resources by the transmitter by reserving only RE resources corresponding to the control area and corresponding to each antenna port via which a DMRS is transmitted, and all the other resources are supposed to be used to transmit data of the physical downlink channel, that is, it is determined that the physical downlink channel is mapped to the resources by starting at the specific start symbol position in the first slot of the current sub-frame and mapping onto all the resources other than the resources corresponding to the DMRS; and it is determined that suppose channel encoding and rate matching is performed by the transmitter on the transport blocks carried over the physical downlink channel without any CRS RE, and it is determined that the physical downlink channel is mapped onto the resources in the sub-frame by the transmitter by puncturing the data information corresponding to the CRS RE positions, that is, when it is determined that channel encoding and rate matching is performed by the transmitter on the TBs carried over the physical downlink channel. Suppose only resources corresponding to the control area and DMRS are reserved to determine the number of REs available to data, that is, all the resources other than the control area and the DMRS resources can be used to transmit the physical downlink channel, the number of available REs for transmitting the physical downlink channel is obtained, data are received over these available REs, and a target number of rate-matched bits is calculated, and even if there is no CRS beyond the control area in an MBSFN sub-frame, and there is a CRS beyond the control area in a non-MBSFN sub-frame, but suppose there is no CRS in the non-MBSFN sub-frame, that is, the number of available REs for transmitting the physical downlink channel is calculated while also taking into account the CRS resources in the non-MBSFN sub-frame, thus resulting in the same target number of rate-matched bits for the MBSFN sub-frame and the non-MBSFN sub-frame; when the physical downlink channel is really mapped to the resources, a CRS is transmitted over a part of the resources for data transmission in the non-MBSFN sub-frame, so in order to prevent transmission of a CRS from being affected, the data mapped onto the CRS REs needs to be punctured.

Particularly there are the following two mapping schemes.

In a mapping scheme A, the set of sub-frames is divided into a plurality of groups of sub-frames, and the physical downlink channel is mapped to the respective groups of sub-frames, that is, if the group of sub-frames including the preset number of sub-frames to be involved in multi-sub-frame channel estimation, in the set of sub-frames, includes an MBSFN sub-frame and a non-MBSFN sub-frame, it is determined that the physical downlink channel is mapped to the resources in each sub-frame in each group of sub-frames by starting at the specific start symbol position in the first slot of the current sub-frame and mapping to all the resources other than the resources corresponding to a DMRS, where the current sub-frame may be an MBSFN sub-frame or a non-MBSFN sub-frame.

When it is determined that when the physical downlink channel is mapped to the resources in the non-MBSFN sub-frame in the group of sub-frames, suppose there is no CRS resource, the physical downlink channel is mapped to all the resources other than the resources corresponding to a DMRS by starting at the specific start symbol position in the first slot of the current sub-frame, and it is determined that when the physical downlink channel is mapped to the resources, the information, carried over the physical downlink channel, mapped onto CRS resources, is discarded instead of being mapped, or set to zero, or overwritten with a CRS transmitted over the CRS resources.

In a mapping scheme B, the physical downlink channel is mapped directly to the set of sub-frames, that is, if the set of sub-frames includes an MBSFN sub-frame and a non-MBSFN sub-frame, it is determined that the physical downlink channel is mapped to the resources in each sub-frame in the set of sub-frames by starting at the specific start symbol position in the first slot of the current sub-frame and mapping to all the resources other than the resources corresponding to a DMRS.

When it is determined that when the physical downlink channel is mapped to the resources in the non-MBSFN sub-frame in the set of sub-frames, suppose there is no CRS resource, the physical downlink channel is mapped to all the resources other than the resources corresponding to a DMRS by starting at the specific start symbol position in the first slot of the current sub-frame, and it is determined that when the physical downlink channel is mapped to the resources, the information, carried over the physical downlink channel, mapped onto CRS resources is discarded instead of being mapped, or set to zero, or overwritten with a CRS transmitted over the CRS resources.

In a third implementation, if the group of sub-frames including the preset number of sub-frames to be involved in multi-sub-frame channel estimation, in the set of sub-frames, or the set of sub-frames includes only non-MBSFN sub-frames, the number of symbols in a control area in each sub-frame in the group of sub-frames, or the set of sub-frames is the number of symbols in a control area configured for a non-MBSFN sub-frame, that is, it is determined that channel encoding and rate matching is performed by the transmitter on transport blocks carried over the physical downlink channel by reserving REs corresponding to the control area configured for the non-MBSFN sub-frame. A reference signal for demodulation in each sub-frame is a CRS, or if a DMRS-based transmission scheme is applied to the physical downlink channel, reference signals for demodulation in each sub-frame include both a CRS and a DMRS, that is, it is determined that channel encoding and rate matching is performed by the transmitter on the transport blocks carried over the physical downlink channel by reserving REs corresponding to each antenna port via which a CRS is transmitted; and if there is a DMRS (e.g., in the transmission mode 9 and the transmission mode 10), it is determined that channel encoding and rate matching is performed by the transmitter on the transport blocks carried over the physical downlink channel by further reserving REs corresponding to each antenna port via which a DMRS is transmitted. At this time, since all the sub-frames are non-MBSFN sub-frames, there is a CRS transmitted in each sub-frame, and the size of the control area of each sub-frame is the size of the control area configured for a non-MBSFN sub-frame, so the number of available REs, for transmitting the physical downlink channel, obtained according to the resource mapping mode assumed above is the same in each sub-frame; and since the physical downlink channel is mapped to the resources by reserving CRS resources, and the reserved size of the control area is the real size of the control area of the sub-frame, the data carried over the physical downlink channel does not need to be punctured.

Particularly there are the following two mapping schemes.

In a mapping scheme A, the set of sub-frames is divided into a plurality of groups of sub-frames, and the physical downlink channel is mapped to the respective groups of sub-frames, that is, if the group of sub-frames including the preset number of sub-frames to be involved in multi-sub-frame channel estimation, in the set of sub-frames, includes only non-MBSFN sub-frames, it is determined that the physical downlink channel is mapped to the resources in each sub-frame in each group of sub-frames by starting at the start symbol position in the first slot of the current sub-frame, determined according to a size of a DCI area in a non-MBSFN sub-frame and mapping onto all the resources other than the resources corresponding to a CRS, or corresponding to a CRS and a dedicated DMRS.

In a mapping scheme B, the physical downlink channel is mapped directly to the set of sub-frames, that is, if the set of sub-frames includes only non-MBSFN sub-frames, it is determined that the physical downlink channel is mapped to the resources in each sub-frame in the set of sub-frames by starting at the start symbol position in the first slot of the current sub-frame, determined according to a size of a DCI area in a non-MBSFN sub-frame and mapping onto all the resources other than the resources corresponding to a CRS, or corresponding to a CRS and a dedicated DMRS.

In a fourth implementation, if the group of sub-frames including the preset number of sub-frames to be involved in multi-sub-frame channel estimation, in the set of sub-frames, or the set of sub-frames includes only MBSFN sub-frames, the number of symbols in a control area in each sub-frame in the group of sub-frames, or the set of sub-frames is the number of symbols in a control area configured for an MBSFN sub-frame, that is, it is determined that channel encoding and rate matching is performed by the transmitter on transport blocks carried over the physical downlink channel by reserving REs corresponding to the control area configured for the MBSFN sub-frame. A reference signal for demodulation in each sub-frame is a DMRS, and it is determined that channel encoding and rate matching is performed by the transmitter on the transport blocks carried over the physical downlink channel by further reserving REs corresponding to each antenna port via which a DMRS is transmitted. At this time, since all the sub-frames are MBSFN sub-frames, there is no CRS transmitted in each sub-frame, the size of the control area of each sub-frame is the size of the control area configured for an MBSFN sub-frame, and the demodulation is based on DMRS, so the number of available REs, for transmitting the physical downlink channel, obtained according to the resource mapping mode assumed above is the same in each sub-frame, and since the physical downlink channel is mapped to the resources by reserving DMRS resources, and the reserved size of the control area is the real size of the control area of the sub-frame, the data carried over the physical downlink channel does not need to be punctured.

Particularly there are the following two mapping schemes.

In a mapping scheme A, the set of sub-frames is divided into a plurality of groups of sub-frames, and the physical downlink channel is mapped to the respective groups of sub-frames, that is, if the group of sub-frames including the preset number of sub-frames to be involved in multi-sub-frame channel estimation, in the set of sub-frames, includes only MBSFN sub-frames, it is determined that the physical downlink channel is mapped to the resources in each sub-frame in each group of sub-frames by starting at the start symbol position in the first slot of the current sub-frame, determined according to a size of a DCI area in the MBSFN sub-frame and mapping onto all the resources other than the resources corresponding to a dedicated DMRS.

In a mapping scheme B, the physical downlink channel is mapped directly to the set of sub-frames, that is, if the set of sub-frames includes only MBSFN sub-frames, it is determined that the physical downlink channel is mapped to the resources in each sub-frame in the set of sub-frames by starting at the start symbol position in the first slot of the current sub-frame, determined according to a size of a DCI area in the MBSFN sub-frame and mapping onto all the resources other than the resources corresponding to a dedicated DMRS.

The first to fourth implementations above can be applied in combination, for example, the first and second implementations can be applied together.

In any one or a combination of the first to fourth implementations, for a sub-frame configured with CSI-RS resources, it is determined that when channel encoding and rate matching is performed by the transmitter on the transport blocks carried over the physical downlink channel, suppose there is no CSI-RS RE, and when the physical downlink channel is mapped to the resources in the sub-frame, the data information corresponding to CSI-RS RE positions is punctured, that is, it is determined that when channel encoding and rate matching is performed by the transmitter on the TBs carried over the physical downlink channel, suppose the physical downlink channel is mapped to the resources by reserving only the resources corresponding to the control area and a reference signal for demodulation (either or both of a CRS and a DMRS) to determine the number of REs available to data, that is, the physical downlink channel can be transmitted in all the resources other than the resources of the control area and a reference signal for demodulation, that is, the number of available REs for transmitting the physical downlink channel is calculated by also taking into account the CSI-RS resources to obtain the number of available REs for transmitting the physical downlink channel, data are received over these available REs, and a target number of rate-matched bits is calculated, thus resulting in the same target number of rate-matched bits for a sub-frame including a CSI-RS and a sub-frame including no CSI-RS; and when the physical downlink channel is really mapped to the resources, a CSI-RS is transmitted over a part of the resources for data transmission in the sub-frame including a CSI-RS, and in order to prevent transmission of a CSI-RS from being affected, the data mapped onto the REs corresponding to the CSI-RS needs to be punctured, particularly as follows: in a sub-frame configured with CSI-RS resources, where the CSI-RSes include ZP CSI-RSes and/or NZP CSI-RSes, it is determined that when channel encoding and rate matching is performed by the transmitter on the transport blocks carried over the physical downlink channel, suppose there is no CSI-RS RE, and it is determined that when the physical downlink channel is mapped by the transmitter to the resources in the sub-frame, the data information corresponding to the CSI-RS RE positions is punctured, particularly as follows: it is determined that when the physical downlink channel is mapped to the resources, the information, carried over the physical downlink channel, mapped onto a NZP CSI-RS resource is discarded instead of being mapped, or set to zero, or overwritten with a CSI-RS transmitted over the NZP CSI-RS resource, and the information, carried over the physical downlink channel, mapped onto a ZP CSI-RS resource is discarded instead of being mapped, or set to zero.

The operation 203 is to receive the physical downlink channel according to the resource mapping mode.

In a first implementation, the set of sub-frames is divided into a plurality of groups of sub-frames, and the physical downlink channel is received in the respective groups of sub-frames, that is, if the group of sub-frames including the preset number of sub-frames to be involved in multi-sub-frame channel estimation, in the set of sub-frames, includes an MBSFN sub-frame and a non-MBSFN sub-frame, the physical downlink channel is received in the MBSFN sub-frames and the non-MBSFN sub-frames belonging to a same group of sub-frames using a same transmission scheme, where the transmission scheme at least includes one or any combining of reference signals for demodulation, transmission ports and the number of ports, and a pre-coding scheme.

In a second implementation, the physical downlink channel is received directly in the set of sub-frames, that is, if the set of sub-frames includes an MBSFN sub-frame and a non-MBSFN sub-frame, the physical downlink channel is received in the MBSFN sub-frames and the non-MBSFN sub-frames in the set of sub-frames, where the transmission scheme at least includes one or any combining of reference signals for demodulation, transmission ports and the number of ports, and a pre-coding scheme.

In the first and second implementations, the physical downlink channel is received using a transmission scheme corresponding to a specific sub-frame in the set of sub-frames or in the group of sub-frames, or using a preset transmission scheme.

Particularly the physical downlink channel can be received using a transmission scheme corresponding to a specific sub-frame in the set of sub-frames or in the group of sub-frames in the following two approaches without any limitation thereto.

In a first approach, the physical downlink channel is received using a transmission scheme corresponding to a first sub-frame in the set of sub-frames or in the group of sub-frame.

In a second approach, the physical downlink channel is received using a transmission scheme corresponding to the MBSFN sub-frame in the set of sub-frames or in the group of sub-frames.

In the embodiment of the disclosure, when the physical downlink channel is received according to the resource mapping mode, information, discarded instead of being mapped or set to 0 or overwritten with other signals during resource mapping of the physical downlink channel, is set to 0 or a specific value when receiving, i.e., a resource over which the information is set to 0 or the specific value is a punctured resource. This is because this information, when the physical downlink channel is mapped by the transmitter, is discarded or set to zero, or other signals such as a CRS, control information, or a CSI-RS, are transmitted at the positions of this information, the information obtained on these positions is not data information, but in order to perform de-rate-matching and channel decoding properly, it is required to obtain received information of a target number of encoded bits corresponding to a number of REs available to data, obtained according to the resource mapping mode assumed above, so the data information on these punctured positions needs to be set to zero or a specific value to be kept on the corresponding positions in a received sequence as placeholders.

Particularly the information received in each sub-frame in the group of sub-frames consisting of the preset number of sub-frames to be involved in multi-sub-frame channel estimation, in the set of sub-frames is combined by determining that the data information on the punctured resource positions is precluded from combination, that is, the information on the resource positions set to 0 or a specific value is precluded from combination; or the information received in each sub-frame in the set of sub-frames is combined by determining that the data information on the punctured resource positions is precluded from combination, that is, the information on the resource positions set to 0 or a specific value is precluded from combination.

The process of repeated transmission of downlink data according to the embodiment of the disclosure is described below in details in connection with a particular embodiment thereof.

Figure 3:
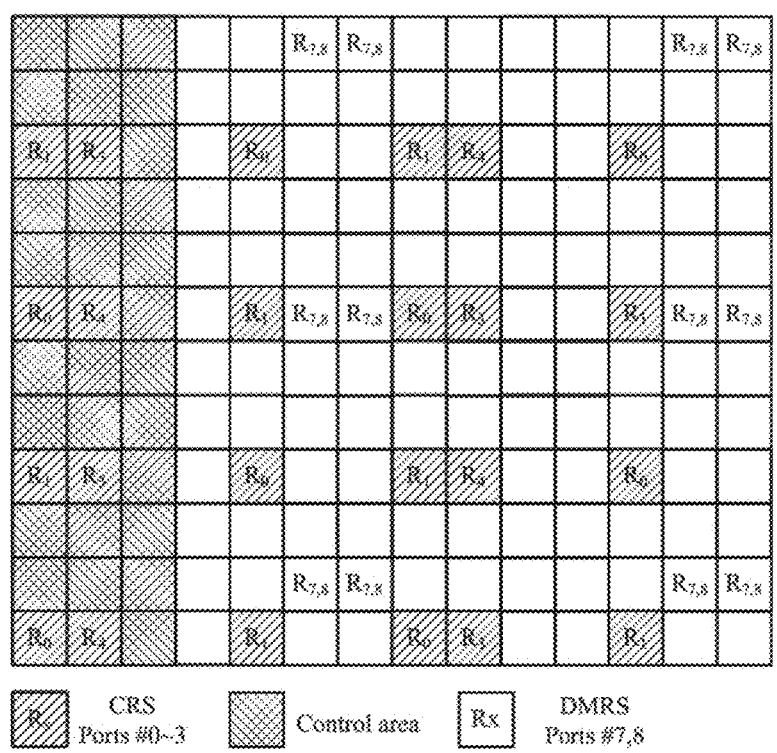
FIG. 3 is a schematic diagram of an RE occupancy condition in a non-MBSFN sub-frame without any CSI-RS according to an embodiment of the disclosure.
Figure 4:
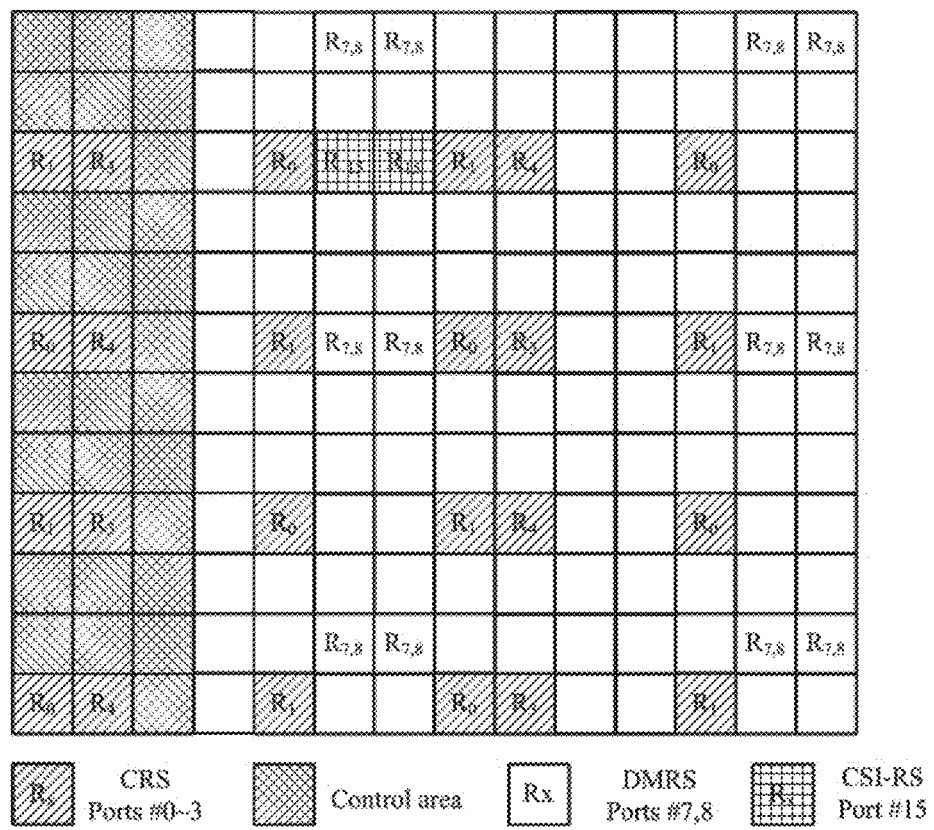
FIG. 4 is a schematic diagram of an RE occupancy condition in a non-MBSFN sub-frame including a CSI-RS according to an embodiment of the disclosure.
Figure 5:
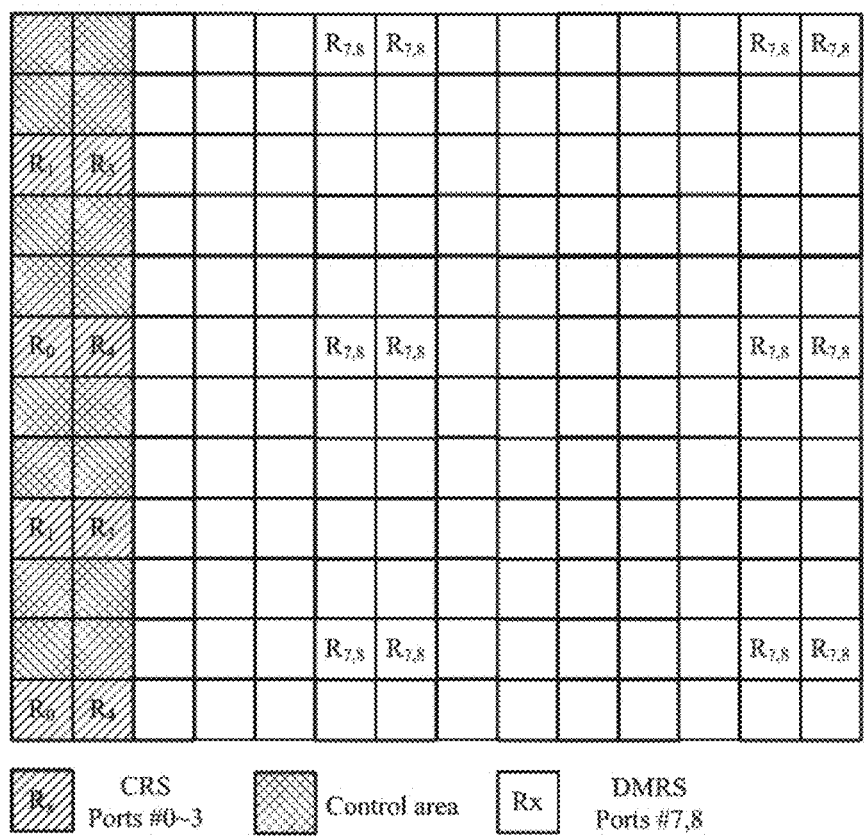
FIG. 5 is a schematic diagram of an RE occupancy condition in an MBSFN sub-frame without any CSI-RS according to an embodiment of the disclosure.
Figure 6:
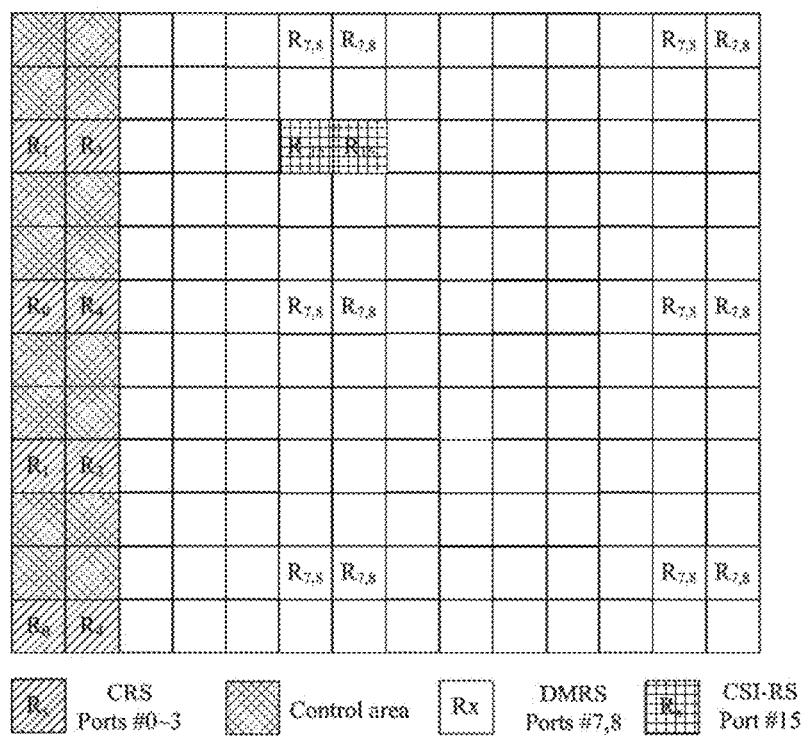
FIG. 6 is a schematic diagram of an RE occupancy condition in an MBSFN sub-frame including a CSI-RS according to an embodiment of the disclosure.

In the particular embodiment, a PDSCH carrying transport blocks is described as an example. Suppose the PDSCH is transmitted repeatedly in N=100 sub-frames, where the PDSCH is transmitted in six Physical Resource Blocks (PRBs) in each sub-frame; there are two OFDM symbols in a control area of an MBSFN sub-frame as illustrated in FIG. 5 and FIG. 6, and there are three OFDM symbols in a control area of a non-MBSFN sub-frame as illustrated in FIG. 3 and FIG. 6; there are 4 ports of CRSes on RE positions as illustrated in FIG. 3 to FIG. 6; both an MBSFN sub-frame and a non-MBSFN sub-frame are predefined to be transmitted based upon a DMRS of the single antenna port 7 or 8, or predefined to be transmitted using RBF based upon a DMRS of the port 7 or 8, and the DMRS REs are illustrated in FIG. 3 to FIG. 6; a CSI-RS is configured with one port and configured as 0 (that is, a CSI-RS in Table 1 is configured as 0, and the transmission port is the CSI-RS port 15), and a sub-frame configuration period and a sub-frame offset of a CSI pilot are $T_{CSI-RS}$=10 ms and $\Delta_{CSI-RS}$=4 (i.e., the CSI-RS sub-frame configuration $I_{CSI-RS}$=9 in Table 3), that is, there are CSI-RS REs in the sub-frames #4 and #9 in each radio frame as illustrated in FIG. 4 and FIG. 6, and no CSI-RS REs in the other sub-frames.

Figure 7:
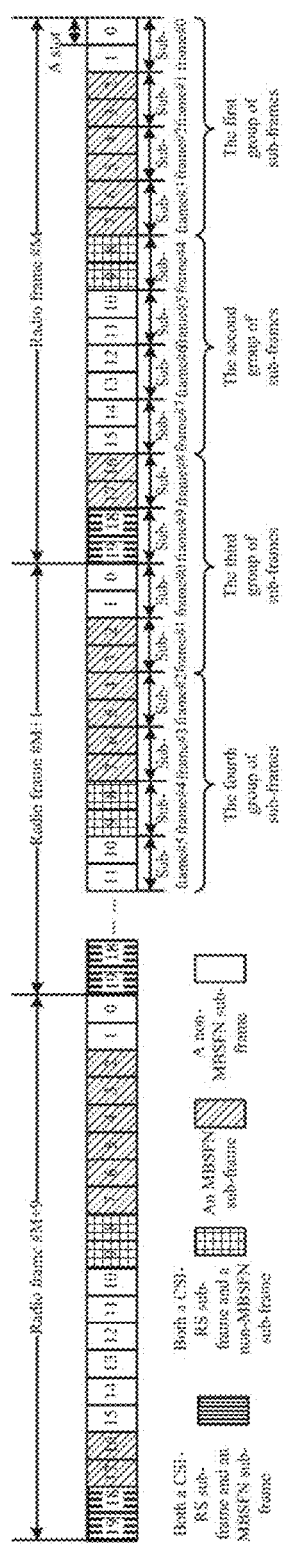
FIG. 7 is a schematic diagram of PDSCH resources allocation according to an embodiment of the disclosure.

Taking Frequency Division Duplex (FDD) as an example, suppose a same TB is transmitted repeatedly over resources of 100 consecutive sub-frames starting at the slot #0 (i.e., the sub-frame #0) in the radio frame #M, the sub-frames #1, #2, #3, #8, and #9 in each radio frame are MBSFN sub-frames, and the other sub-frames are non-MBSFN sub-frames as illustrated in FIG. 7; and suppose multi-sub-frame channel estimation and coherent combination of data is performed per group of X=4 sub-frames.

In a first approach, the PDSCH is mapped to the respective groups of sub-frames.

In a first scheme, the first group of sub-frames includes sub-frames #0 to #3 in the radio frame #M, and includes MBSFN sub-frames and a non-MBSFN sub-frame, where there is no CSI-RS in each of the sub-frames #0 to #3, so CSI-RS resources do not need to be taken into account, but the difference between an MBSFN sub-frame and a non-MBSFN sub-frame needs to be taken into account.

Here the sub-frame #0 is a non-MBSFN sub-frame with an RE occupancy condition as illustrated in FIG. 3, and the sub-frames #1 to #3 are MBSFN sub-frames with an RE occupancy condition as illustrated in FIG. 5. Particularly there are the following two implementations.

In a first implementation of the first scheme, when channel encoding and rate matching is performed on TBs carried over the PDSCH, suppose a size of a control area in each sub-frame in the group of sub-frames is the larger one of the number of symbols in a control area of an MBSFN sub-frame and the number of symbols in a control area of a non-MBSFN sub-frame, i.e., 3 in this embodiment.

Figure 8:
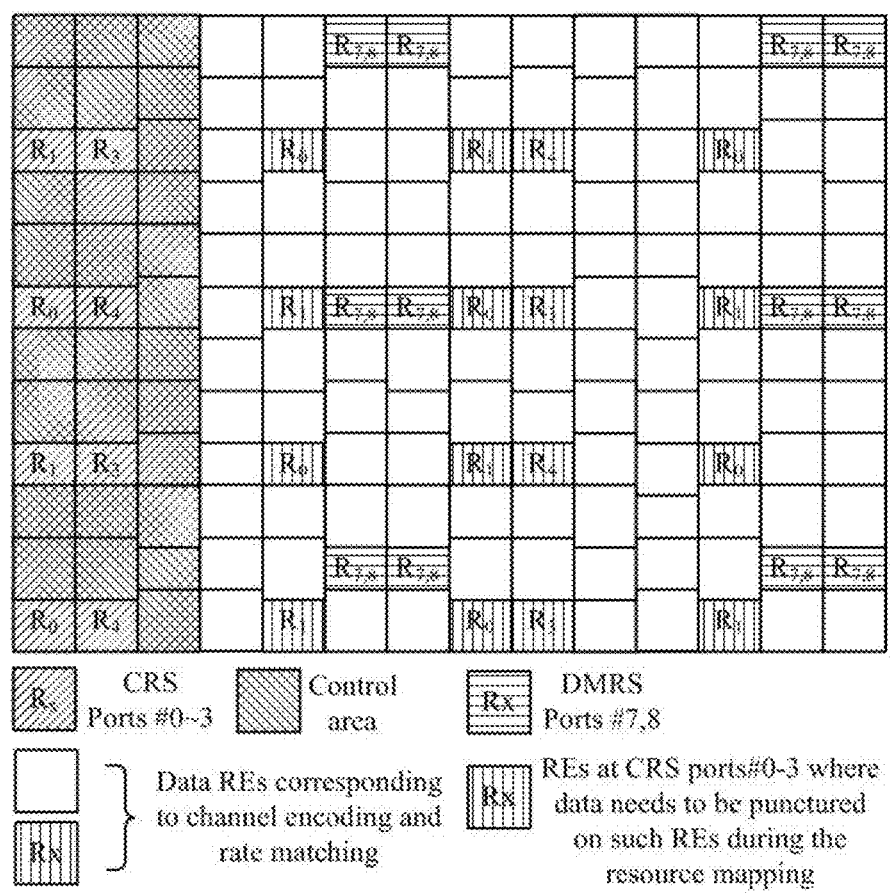
FIG. 8 is a schematic diagram of a data RE condition 1 in a non-MBSFN sub-frame without any CSI-RS according to an embodiment of the disclosure.

At the transmitter, in the sub-frame #0, when channel encoding and rate matching is performed on the TBs carried over the PDSCH, suppose there is no CRS RE, only resources of a DMRS and the control area of three symbols are reserved, that is, when the number of REs corresponding to a target number of bits after channel encoding and rate matching is performed on the TBs is calculated, suppose data can be transmitted in all the REs (including CRS REs in a data area) other than REs corresponding to the DMRS and to the control area of three symbols as illustrated in FIG. 8 (which illustrates a condition in a PRB), and the number of data REs in six PRBs is 6*120=720; the target number of bits after channel encoding and rate matching is performed on the TBs is calculated as K=720*2=1440 according to a modulation scheme (e.g., Quadrature Phase Shift Keying (QPSK)), channel encoding and rate matching is performed on the TBs to obtain an encoded sequence of K bits, the sequence is modulated and processed otherwise into Q=1440/2=720 modulation symbols, and when the Q modulation symbols are further mapped onto the corresponding REs in a predetermined mode to be transmitted, the REs corresponding to the DMRS and the control area of three OFDM symbols are spared, and since there is a CRS transmitted in the CRS REs, in order to prevent transmission of the CRS from being affected, the data is not mapped on the CRS REs, that is, the corresponding data information transmitted on the REs is discarded (that is, the data information is punctured, and the same will apply hereafter) as illustrated in FIG. 8.

Figure 9:
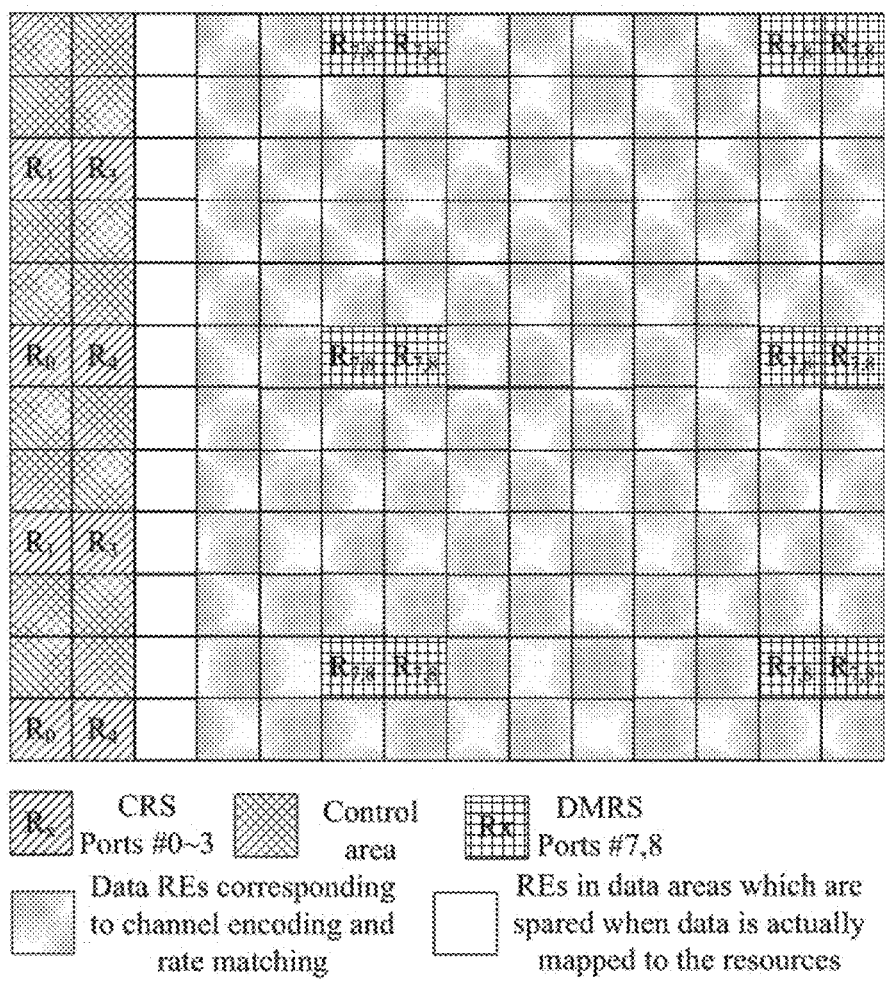
FIG. 9 is a schematic diagram of a data RE condition 1 in an MBSFN sub-frame without any CSI-RS according to an embodiment of the disclosure.

In the sub-frames #1 to #3, when channel encoding and rate matching is performed on the TBs carried over the PDSCH, only resources of a DMRS and the control area of three symbols are reserved (there is no CRS indeed and thus no need to suppose that there is no CRS), that is, when the number of REs corresponding to a target number of bits after channel encoding and rate matching is performed on the TBs is calculated, suppose data can be transmitted in all the REs other than the REs corresponding to the DMRS and the control area of three symbols as illustrated in FIG. 9 (which illustrates a condition in a PRB), and the number of data REs in six PRBs is also 6*120=720; the target number of bits after channel encoding and rate matching is performed on the TBs is calculated as K=720*2=1440 according to a modulation scheme (e.g., QPSK), channel encoding and rate matching is performed on the TBs to obtain an encoded sequence of K bits, the sequence is modulated and processed otherwise into Q=1440/2=720 modulation symbols, and when the Q modulation symbols are further mapped onto the corresponding REs in a predetermined mode to be transmitted, since there is no CRS transmitted in a data area in the sub-frames #1 to #3, no data needs to be punctured during data mapping, but in order to make the size of control areas in the MBSFN sub-frames #1 to #3 the same as the size of the control area in the non-MBSFN sub-frame #0, an OFDM symbol not belonging to the control area configured for each MBSFN sub-frame needs to be spared so that no data is mapped to it (that is, suppose there are three OFDM symbols in the control area), and the DMRS REs also need to be spared, so the actual REs used for data resource mapping in a PRB are the same as data REs corresponding to channel encoding and rate matching in FIG. 9; and furthermore in order to further utilize the spared OFDM symbol, a part of the encoded sequence or the modulation symbols obtained as described above can be further mapped repeatedly onto the spared OFDM symbol to be transmitted for a diversity gain.

At the receiver, the target number K of bits, and the number Q of modulation symbols after channel encoding and rate matching is performed on the TBs are determined in the same ways as at the transmitter. When the data are received, in the sub-frame #0, the data symbols extracted from the CRS REs can be assumed to be zero or a predetermined value, that is, it is considered that there is actually no data transmitted on the positions, but placeholders are required among the data information, thus resulting in the Q received modulation symbols so that the number of data modulation symbols and the number of encoded bits are the same in each sub-frame. In the sub-frames #1 to #3, the data are received starting at the fourth OFDM symbol, that is, suppose there is no data transmitted in the first three symbols; and the Q modulation symbols received in each of these four sub-frames are combined across the sub-frames, for example, the data in the four sub-frames is added together, and divided by 4, where the modulation symbols corresponding to the CRS REs in the sub-frame #0 are precluded from combination, that is, only the data on the positions in the sub-frames #1 to #3 is combined, that is, the data on the positions in the three sub-frames is added together, and divided by 3, and subsequently the combined data is further processed (e.g., channel-compensated, demodulated, de-rate-matching, etc., and the same will apply hereinafter). Furthermore in the sub-frames #1 to #3, if the transmitter maps a part of the encoded sequence or the modulation symbols repeatedly onto the spared OFDM symbol, i.e., the third OFDM symbol, to be transmitted, before the data is combined across the sub-frames #1 to #3, the receiver needs to further receive data on the third OFDM symbol of each sub-frame #1 to #3, and combine the corresponding repeated information in each of the sub-frames #1 to #3 to obtain the Q modulation symbols.

In a second implementation of the first scheme, when channel encoding and rate matching is performed on TBs carried over the PDSCH, suppose the size of the control area in each sub-frame in the group of sub-frames is the smaller one of the number of symbols in a control area of an MBSFN sub-frame and the number of symbols in a control area of a non-MBSFN sub-frame, i.e., 2 in this embodiment.

Figure 10:
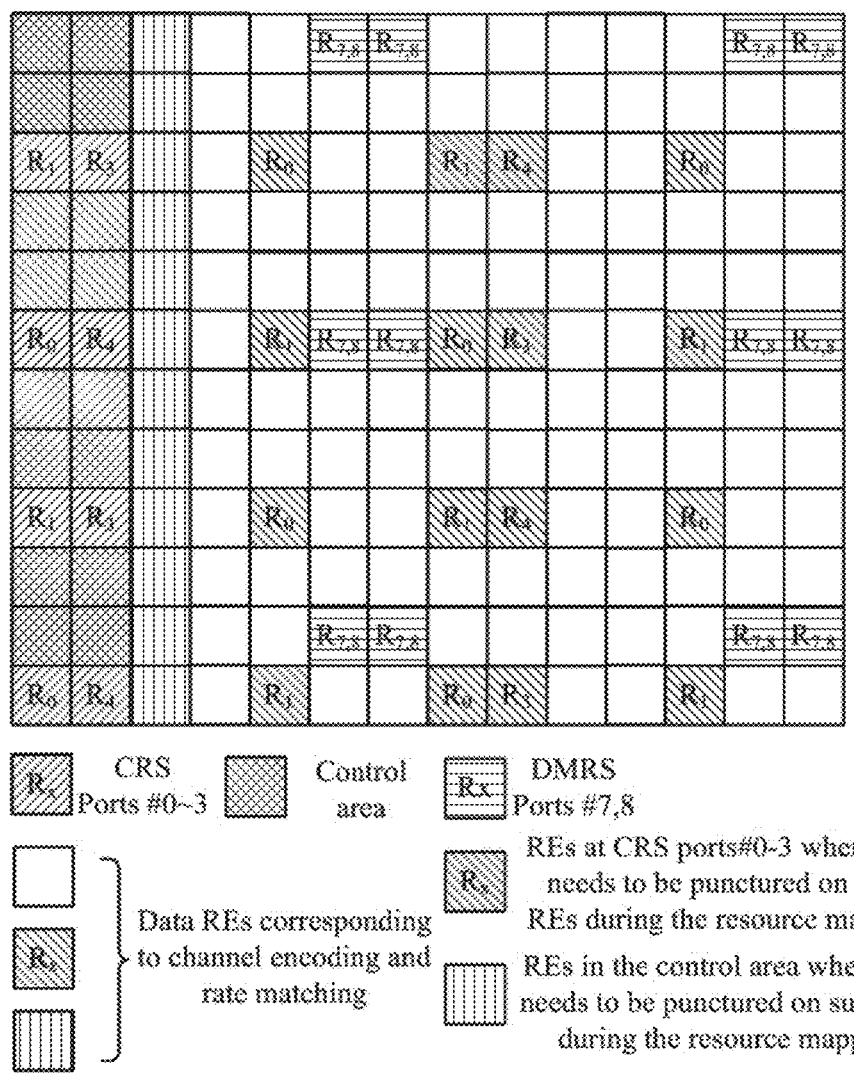
FIG. 10 is a schematic diagram of a data RE condition 2 in a non-MBSFN sub-frame without any CSI-RS according to an embodiment of the disclosure.

At the transmitter, in the sub-frame #0, when channel encoding and rate matching is performed on the TBs carried over the PDSCH, suppose there is no CRS RE, and only resources of the DMRS, and the control area of two symbols are reserved, that is, when the number of REs corresponding to a target number of bits after channel encoding and rate matching is performed on the TBs is calculated, suppose data can be transmitted in all the REs (including CRS REs in a data area and REs on the last OFDM symbol (i.e., the third OFDM symbol in the sub-frame, and the same will apply hereinafter) in the control area of the sub-frame) other than the REs corresponding to the DMRS and the control area of two symbols as illustrated in FIG. 10 (which illustrates a condition in a PRB), and the number of data REs in six PRBs is 6*132=792; the target number of bits after channel encoding and rate matching is performed on the TBs is calculated as K=792*2=1584 according to a modulation scheme (e.g., QPSK, and the same will apply hereinafter), channel encoding and rate matching is performed on the TBs to obtain an encoded sequence of K bits, the sequence is modulated and processed otherwise into Q=1584/2=792 modulation symbols, and when the Q modulation symbols are further mapped onto the corresponding REs according to a predetermined mode to be transmitted, the REs corresponding to the DMRS and the control area of two OFDM symbols are spared. Since there is a CRS transmitted in the CRS REs, in order to prevent transmission of the CRS from being affected, data is not mapped onto the CRS REs, that is, the corresponding data information to be transmitted on the CRS RE positions is discarded (i.e., punctured); and since there is control information transmitted in the last OFDM symbol in the control area, in order to prevent transmission of the control information from being affected, data is not mapped onto the RE positions, that is, the corresponding data information to be transmitted on the RE positions is discarded, as illustrated in FIG. 10.

In the sub-frames #1 to #3, when channel encoding and rate matching is performed on the TBs carried over the PDSCH, only resources of the DMRS and the control area of two symbols are reserved (there is no CRS in deed and thus no need to suppose that there's no CRS), that is, when the number of REs corresponding to a target number of bits after channel encoding and rate matching is performed on the TBs is calculated, suppose data can be transmitted in all the REs other than the REs corresponding to the DMRS and the control area of two symbols, and since the size of the control area in an MBSFN sub-frame is two symbols, and there is no CRS in a data area, data REs corresponding to channel encoding and rate matching are REs on blank positions as illustrated in FIG. 5 (which illustrates a condition in a PRB), and the number of data REs in six PRBs is also 6*132=792, the target number of bits after channel encoding and rate matching is performed on the TBs is calculated as K=792*2=1584 according to a modulation scheme, channel encoding and rate matching is performed on the TBs to obtain an encoded sequence of K bits, the sequence is modulated and processed otherwise into Q=1584/2=792 modulation symbols, and the Q modulation symbols are further mapped onto the corresponding REs according to a predetermined mode to be transmitted. Since the number of REs is calculated when channel encoding and rate matching is performed without taking into account REs occupied by other information, no data needs to be punctured during data mapping, but only the REs corresponding to the DMRS and the control area of two OFDM symbols need to be spared, so REs actually used for mapping the data to the resources are the same as the REs on the blank positions in FIG. 5.

At the receiver, the target number K of bits and the number Q of modulation symbols after channel encoding and rate matching is performed on the TBs are determined using a same way as at the transmitter. When data are received, in the sub-frame #0, data symbols extracted from the REs corresponding to the CRS and the last OFDM symbol in the control area can be assumed to be zero or a predetermined value, that is, it is considered that there is actually no data transmitted on the positions, but placeholders are required among the data information, thus resulting in the Q received modulation symbols so that the number of data modulation symbols and the number of encoded bits are the same in each sub-frame. In the sub-frames #1 to #3, the data is normally received in the data area. The Q modulation symbols received in each of these four sub-frames are combined across the sub-frames, for example, the data in the four sub-frames is added together, and divided by 4, where the modulation symbols corresponding to the CRS REs and the last symbol in the control area in the sub-frame #0 are precluded from combination, that is, only the data on the positions in the sub-frames #1 to #3 are combined, that is, the data on the positions in the three sub-frames is added together, and divided by 3, and subsequently the combined data is further processed.

In a second scheme, the second group of sub-frames includes sub-frames #4 to #7 in the radio frame #M, and includes only non-MBSFN sub-frames. There are CSI-RSes in the sub-frame #4, so the difference between an MBSFN sub-frame and a non-MBSFN sub-frame does not need to be taken into account. There are CRSes in each sub-frame, and the size of the control area is three symbols, that is, the CRSes and the control area are the same in each sub-frame in the group of sub-frames, but the CSI-RS resources need to be considered, where FIG. 4 illustrates an RE occupancy condition in the sub-frame #4, and FIG. 3 illustrates an RE occupancy condition in the sub-frames #5 to #7.

Figure 11:
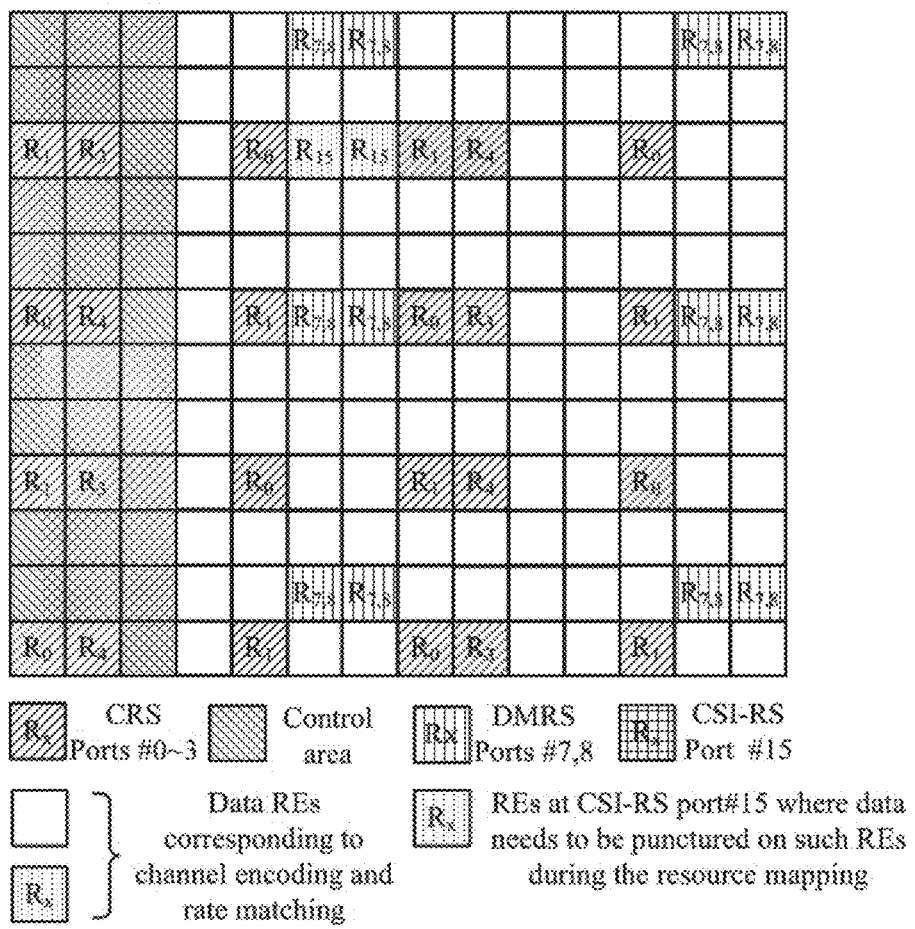
FIG. 11 is a schematic diagram of a data RE condition 1 in a non-MBSFN sub-frame including a CSI-RS according to an embodiment of the disclosure.

At the transmitter, in the sub-frame #4, when channel encoding and rate matching is performed on the TBs carried over the PDSCH, suppose there is no CSI-RS RE, and only resources of the CRS, the DMRS and the control area of three symbols are reserved, that is, when the number of REs corresponding to a target number of bits after channel encoding and rate matching is performed on the TBs is calculated, suppose data can be transmitted in all the REs (including CSI-RS REs in a data area) other than the REs corresponding to the CRS, the DMRS and the control area of three symbols as illustrated in FIG. 11 (which illustrates a condition in a PRB), so the number of data REs in six PRBs is 6*104=624, the target number of bits after channel encoding and rate matching is performed on the TBs is calculated as K=624*2=1248 according to a modulation scheme, channel encoding and rate matching is performed on the TBs to obtain an encoded sequence of K bits, the sequence is modulated and processed otherwise into Q=1248/2=624 modulation symbols. When the Q modulation symbols are further mapped onto the corresponding REs according to a predetermined mode to be transmitted, the REs corresponding to the CRS, the DMRS, and the control area of three OFDM symbols are spared. Since there is a CSI-RS transmitted, in order to prevent transmission of the CSI-RS from being affected, the data is not mapped onto the RE position of the CSI-RS, that is, the corresponding data information to be transmitted on the RE position of the CSI-RS is discarded (i.e., punctured, and the same will apply hereafter) as illustrated in FIG. 11.

In the sub-frames #5 to #7, when channel encoding and rate matching is performed on the TBs carried over the PDSCH, resources of the CRS, the DMRS, and the control area of three symbols are reserved, that is, when the number of REs corresponding to a target number of bits after channel encoding and rate matching is performed on the TBs is calculated, suppose data can be transmitted in all the REs other than the REs corresponding to the CRS, the DMRS, and the control area of three symbols, i.e., blank RE positions as illustrated in FIG. 3 (which illustrates a condition in a PRB), and the number of data REs in six PRBs is also 6*104=624, the target number of bits after channel encoding and rate matching is performed on the TBs is calculated as K=624*2=1248 according to a modulation scheme, channel encoding and rate matching is performed on the TBs to obtain an encoded sequence of K bits, the sequence is modulated and processed otherwise into Q=1248/2=624 modulation symbols, and the Q modulation symbols are further mapped onto REs in the data area according to a predetermined mode to be transmitted. Since channel encoding and rate matching is performed on the data in the sub-frames #5 to #7 without occupying any other signal resources, the data to be mapped does not need to be punctured, but only the REs corresponding to the CRS, the DMRS, and the control area of three symbols need to be normally spared, so the REs in a PRB actually used for mapping the data to the resources are the same as the blank RE positions in FIG. 3.

At the receiver, the target number K of bits, and the number Q of modulation symbols after channel encoding and rate matching is performed on the TBs are determined in the same way as at the transmitter. When data is received, in the sub-frame #4, data symbols extracted from the RE corresponding to the CSI-RS can be assumed to be zero or a predetermined value, that is, it is considered that there is actually no data transmitted on the position, but a placeholder is required among the data information, thus resulting in the Q received modulation symbols so that the number of data modulation symbols and the number of encoded bits are the same in each sub-frame. In the sub-frames #5 to #7, the data can be normally received. The Q modulation symbols received in each of these four sub-frames are combined across the sub-frames, for example, the data in the four sub-frames is added together, and divided by 4, where the modulation symbols corresponding to the CSI-RS REs in the sub-frame #4 are precluded from combination, that is, only the data on the RE positions of the CSI-RS in the sub-frames #5 to #7 are combined, that is, the data on the positions in the three sub-frames is added together, and divided by 3, and subsequently the combined data is further processed.

In a third scheme, the third group of sub-frames includes sub-frames #8 and #9 in the radio frame #M, and sub-frames #0 and #1 in radio frame #M+1, and includes both MBSFN sub-frames and a non-MBSFN sub-frame. There are CSI-RSes in the sub-frame #9, so the difference between an MBSFN sub-frame and a non-MBSFN sub-frame and the CSI-RS resource assumption need to be taken into account, where the sub-frames #8 and #1 are MBSFN sub-frames with an RE occupancy condition as illustrated in FIG. 5, the sub-frame #9 is an MBSFN sub-frame including CSI-RSes with an RE occupancy condition as illustrated in FIG. 6, and the sub-frame #0 is a non-MBSFN sub-frame with an RE occupancy condition as illustrated in FIG. 3.

In a first implementation of the third scheme, when channel encoding and rate matching is performed on TBs carried over the PDSCH, suppose the size of the control area in each sub-frame in the group of sub-frames is the larger one of the number of symbols in a control area of an MBSFN sub-frame and the number of symbols in a control area of a non-MBSFN sub-frame, i.e., 3 in this embodiment.

At the transmitter, in the sub-frame #0 in the radio frame #M+1, the PDSCH is mapped in the same way as the sub-frame #0 in the first group of sub-frames in the first implementation of the first scheme, so a repeated description thereof is omitted here. In the sub-frame #8 in the radio frame #M and the sub-frame #1 in the radio frame #M+1, the PDSCH is mapped in the same way as in the sub-frames #1 to #3 in the first group of sub-frames in the first implementation of the first scheme, so a repeated description thereof is omitted here.

Figure 12:
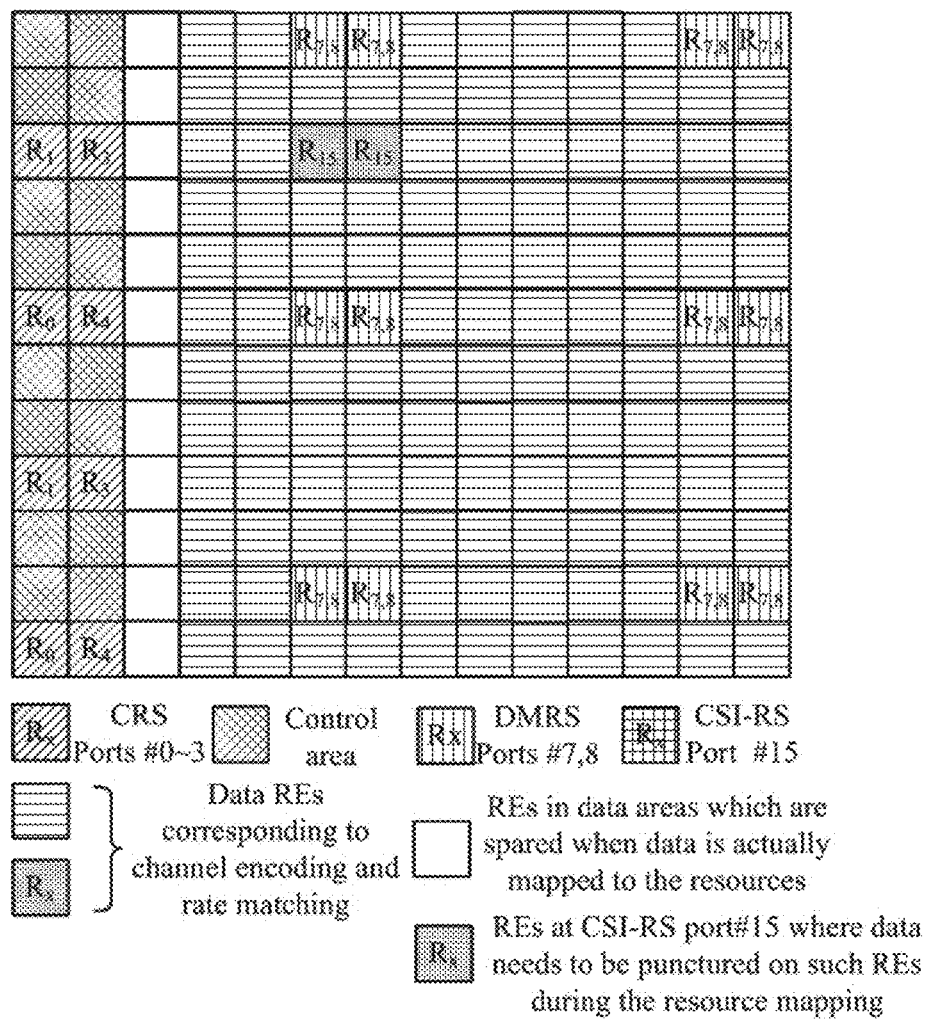
FIG. 12 is a schematic diagram of a data RE condition 1 in an MBSFN sub-frame including a CSI-RS according to an embodiment of the disclosure.

In the sub-frame #9 in the radio frame #M, when channel encoding and rate matching is performed on the TBs carried over the PDSCH, suppose there is no CSI-RS RE, only resources of the DMRS and the control area of three symbols are reserved, that is, when the number of REs corresponding to a target number of bits after channel encoding and rate matching is performed on the TBs is calculated, suppose data can be transmitted in all the REs (including CSI-RS REs in a data area) other than REs corresponding to the DMRS and the control area of three symbols as illustrated in FIG. 12 (which illustrates a condition in a PRB), and the number of data REs in six PRBs is also 6*120=720, the target number of bits after channel encoding and rate matching is performed on the TBs is calculated as K=720*2=1440 according to a modulation scheme, channel encoding and rate matching is performed on the TBs to obtain an encoded sequence of K bits, the sequence is modulated and processed otherwise into Q=1440/2=720 modulation symbols. When the Q modulation symbols are further mapped onto the corresponding REs in a predetermined mode to be transmitted, the DMRS REs are spared, and in order to make the size of the control area in the MBSFN sub-frame #9 the same as the size of the control area in the non-MBSFN sub-frame #0, an OFDM symbol not belonging to the control area configured for the MBSFN sub-frame needs to be spared so that no data is mapped to it (that is, suppose there are three OFDM symbols in the control area). Since there are CSI-RSes transmitted in the CSI-RS REs, in order to prevent transmission of the CSI-RSes from being affected, the data is not mapped onto the RE positions of the CSI-RS, that is, corresponding data information transmitted on the RE positions of the CSI-RS is discarded (i.e., punctured) as illustrated in FIG. 12. And furthermore in order to further utilize the spared OFDM symbol, a part of the encoded sequence or the modulation symbols obtained as described above can be further mapped repeatedly onto the spared OFDM symbol to be transmitted for a diversity gain.

At the receiver, the target number K of bits and the number Q of modulation symbols after channel encoding and rate matching is performed on the TBs are determined in the same way as at the transmitter. When the data are received, the data are received in the sub-frame #0 in the radio frame #M+1 in the same way as in the sub-frame #0 in the first group of sub-frames in the first implementation of the first scheme; the data are received in sub-frame #8 in the radio frame #M and the sub-frame #1 in the radio frame #M+1 in the same way as in the sub-frames #1 to #3 in the first group of sub-frames in the first implementation of the first scheme. In the sub-frame #9 in the radio frame #M, the data symbols extracted from the REs corresponding to the CSI-RSes can be assumed to be zero or a predetermined value, that is, it is considered that there is actually no data transmitted on the positions, but placeholders thereof are required among the data information, thus resulting in the Q received modulation symbols so that the number of data modulation symbols and the number of encoded bits are the same in each sub-frame; and the Q modulation symbols received in each of these four sub-frames are combined across the sub-frames, for example, the data in the four sub-frames is added together, and divided by 4, where the modulation symbols corresponding to the CRS REs in the sub-frame #0 are precluded from combination, that is, only the data in the sub-frames #8, #9, and #1 are combined on the positions corresponding to the CRS REs, that is, the data in the three sub-frames is added together, and divided by 3 on the positions corresponding to the CRS REs, and the modulation symbols corresponding to the CSI-RS REs in the sub-frame #9 are precluded from combination, that is, only the data in the sub-frames #8, #0, and #1 are combined on the positions corresponding to the CSI-RS REs, that is, the data in the three sub-frames is added together, and divided by 3 on the positions corresponding to the CSI-RS REs; and subsequently the combined data is further processed. Furthermore in the sub-frames #8, #9, and #1, if the transmitter maps a part of the encoded sequence or the modulation symbols repeatedly onto the spared OFDM symbol (i.e., the third OFDM symbol) to be transmitted, before the data is combined across the sub-frames #8, #9, and #1, the receiver receives data on the third OFDM symbol, and combines the corresponding repeated information in the sub-frames to obtain the Q modulation symbols.

In a second implementation of the third scheme, when channel encoding and rate matching is performed on TBs carried over the PDSCH, suppose the size of the control area in each sub-frame in the group of sub-frames is the smaller one of the number of symbols in a control area of an MBSFN sub-frame and the number of symbols in a control area of a non-MBSFN sub-frame, i.e., 2 in this embodiment.

At the transmitter, in the sub-frame #0 in the radio frame #M+1, the PDSCH is mapped in the same way as in the sub-frame #0 in the first group of sub-frames in the second implementation of the first scheme, so a repeated description thereof is omitted here; and in the sub-frame #8 in the radio frame #M and the sub-frame #1 in the radio frame #M+1, the PDSCH is mapped in the same way as in the sub-frames #1 to #3 in the first group of sub-frames in the second implementation of the first scheme, so a repeated description thereof is omitted here.

Figure 13:
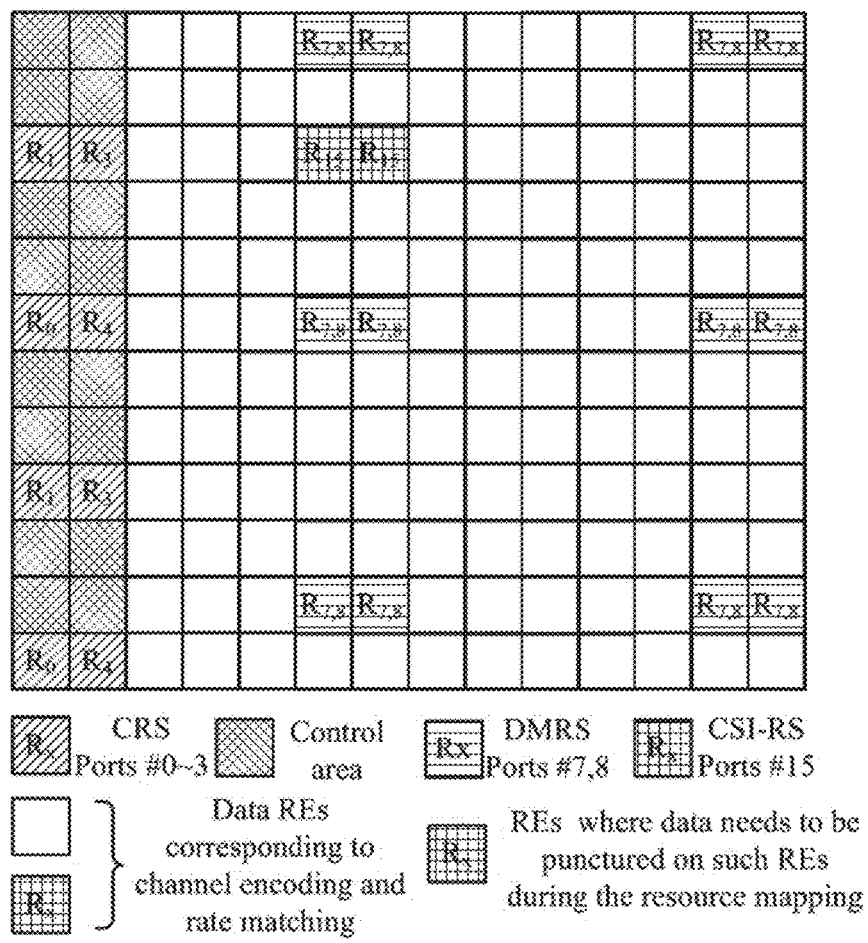
FIG. 13 is a schematic diagram of a data RE condition 2 in an MBSFN sub-frame including a CSI-RS according to an embodiment of the disclosure.

In the sub-frame #9 in the radio frame #M, when channel encoding and rate matching is performed on the TBs carried over the PDSCH, suppose there is no CSI-RS RE, and only resources of the DMRS and the control area of two symbols are reserved, that is, when the number of REs corresponding to a target number of bits after channel encoding and rate matching is performed on the TBs is calculated, suppose data can be transmitted in all the REs (including CSI-RS REs in a data area) other than the REs corresponding to the DMRS and the control area of two symbols as illustrated in FIG. 13 (which illustrates a condition in a PRB), so the number of data REs in six PRBs is also 6*132=792; and the target number of bits after channel encoding and rate matching is performed on the TBs is calculated as K=792*2=1584 according to a modulation scheme, channel encoding and rate matching is performed on the TBs to obtain an encoded sequence of K bits, the sequence is modulated and processed otherwise into Q=1584/2=792 modulation symbols. When the Q modulation symbols are further mapped onto the corresponding REs in a predetermined mode to be transmitted, the REs corresponding to the DMRS and the control area of two symbols are spared, and since there are CSI-RSes transmitted in the CSI-RS REs, in order to prevent transmission of the CSI-RSes from being affected, the data is not mapped onto the RE positions of the CSI-RS, that is, the corresponding data information transmitted on the RE positions of the CSI-RS is discarded (i.e., punctured) as illustrated in FIG. 13.

At the receiver, the target number K of bits, and the number Q of modulation symbols after channel encoding and rate matching is performed on the TBs are determined in the same way as at the transmitter. The data are received in the sub-frame #0 in the radio frame #M+1 in the same way as in the sub-frame #0 in the first group of sub-frames in the second implementation of the first scheme; the data are received in sub-frame #8 in the radio frame #M and the sub-frame #1 in the radio frame #M+1 in the same way as in the sub-frames #1 to #3 in the first group of sub-frames in the second implementation of the first scheme. In the sub-frame #9 in the radio frame #M, the data symbols extracted from the REs corresponding to the CSI-RSes can be assumed to be zero or a predetermined value, that is, it is considered that there is actually no data transmitted on the positions, but placeholders thereof are required among the data information, thus resulting in the Q received modulation symbols so that the number of data modulation symbols and the number of encoded bits are the same in each sub-frame; and the Q modulation symbols received in each of these four sub-frames are combined across the sub-frames, for example, the data in the four sub-frames is added together, and divided by 4, where the modulation symbols corresponding to the CRS REs in the sub-frame #0 are precluded from combination, that is, only the data in the sub-frames #8, #9, and #1 are combined on the positions corresponding to the CRS REs, that is, the data in the three sub-frames is added together, and divided by 3 on the positions corresponding to the CRS REs, and the modulation symbols corresponding to the CSI-RS REs in the sub-frame #9 are precluded from combination, that is, only the data in the sub-frames #8, #0, and #1 are combined on the positions corresponding to the CSI-RS REs, that is, the data in the three sub-frames is added together, and divided by 3 on the positions corresponding to the CSI-RS REs; and subsequently the combined data is further processed.

In a fourth scheme, the fourth group of sub-frames includes the sub-frames #2 to #5 in the radio frame #M+1, and includes both MBSFN sub-frames and non-MBSFN sub-frames, and there are CSI-RSes in the sub-frame #4, so the difference between an MBSFN sub-frame and a non-MBSFN sub-frame and the CSI-RS resource assumption need to be taken into account, where the sub-frames #2 and #3 are MBSFN sub-frames with an RE occupancy condition as illustrated in FIG. 5, the sub-frame #4 is a non-MBSFN sub-frame including CSI-RSes with an RE occupancy condition as illustrated in FIG. 4, and the sub-frame #5 is a non-MBSFN sub-frame with an RE occupancy condition as illustrated in FIG. 3.

In a first implementation of the fourth scheme, when channel encoding and rate matching is performed on TBs carried over the PDSCH, suppose a size of a control area in each sub-frame in the group of sub-frames is the larger one of the number of symbols in a control area of an MBSFN sub-frame and the number of symbols in a control area of a non-MBSFN sub-frame, i.e., 3 in this embodiment.

At the transmitter, in the sub-frames #2 and #3 in the radio frame #M+1, the PDSCH is mapped in the same way as in the sub-frames #1 to #3 in the first group of sub-frames in the first implementation of the first scheme, so a repeated description thereof is omitted here.

Figure 14:
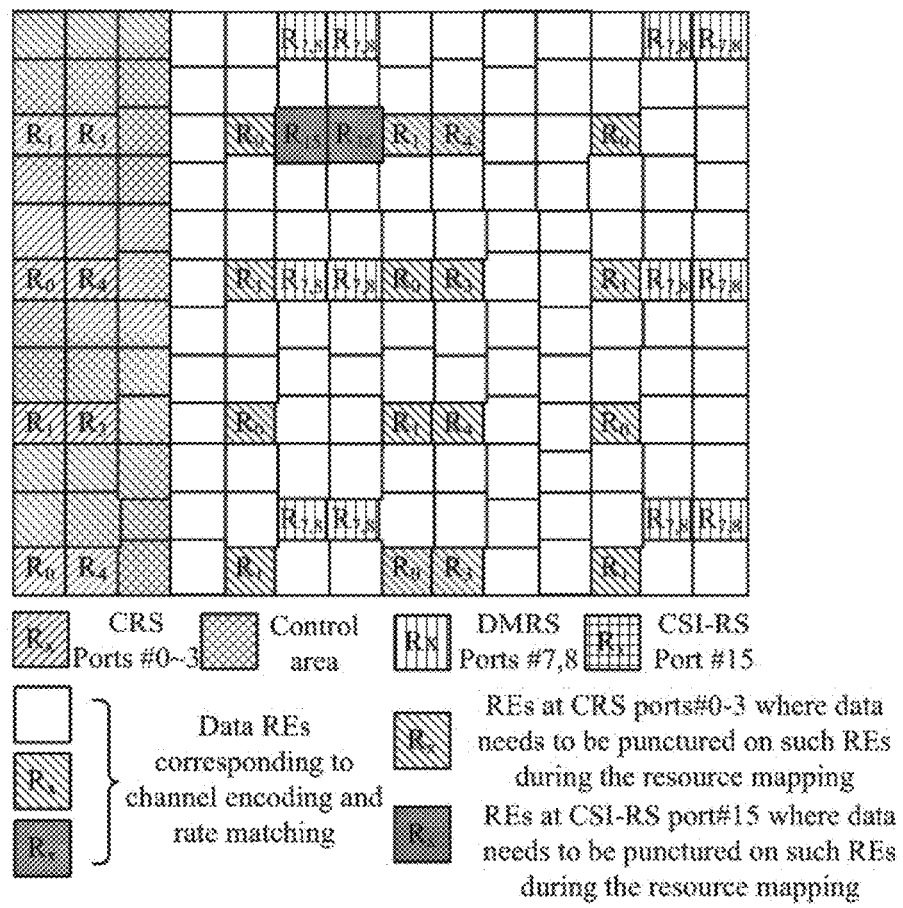
FIG. 14 is a schematic diagram of a data RE condition 2 in a non-MBSFN sub-frame including a CSI-RS according to an embodiment of the disclosure.

In the sub-frame #4 in the radio frame #M+1, when channel encoding and rate matching is performed on the TBs carried over the PDSCH, suppose there is neither CRS RE nor CSI-RS RE, only resources of DMRS and the control area of three symbols are reserved, that is, when the number of REs corresponding to a target number of bits after channel encoding and rate matching is performed on the TBs is calculated, suppose data can be transmitted in all the REs (including CRS and CSI-RS REs in a data area) other than the REs corresponding to the DMRS and the control area of three symbols as illustrated in FIG. 14 (which illustrates a condition in a PRB), and the number of data REs in six PRBs is 6*120=720; the target number of bits after channel encoding and rate matching is performed on the TBs is calculated as K=720*2=1440 according to a modulation scheme, channel encoding and rate matching is performed on the TBs to obtain an encoded sequence of K bits, the sequence is modulated and processed otherwise into Q=1440/2=720 modulation symbols. When the Q modulation symbols are further mapped onto the corresponding REs in a predetermined mode to be transmitted, REs corresponding to a DMRS and the control area of three OFDM symbols are spared; Since there are CRSes transmitted in the CRS REs, in order to prevent transmission of the CRSes from being affected, the data is not mapped onto the RE positions, that is, the corresponding data information transmitted on the RE positions is discarded (i.e., punctured), and since there are CSI-RSes transmitted in the REs corresponding to the CSI-RS, in order to prevent transmission of the CSI-RS from being affected, the data is not mapped on the RE positions, that is, the corresponding data information transmitted on the RE positions is discarded (i.e., punctured), as illustrated in FIG. 14.

In the sub-frame #5 in the radio frame #M+1, the PDSCH is mapped in the same way as in the sub-frame #0 in the first group of sub-frames in the first implementation of the first scheme, so a repeated description thereof is omitted here.

At the receiver, the target number K of bits, and the number Q of modulation symbols after channel encoding and rate matching is performed on the TBs are determined in the same way as at the transmitter. The data are received in the sub-frames #2 and #3 in the radio frame #M+1 in the same way as in the sub-frames #1 to #3 in the first group of sub-frames in the first implementation of the first scheme; the data are received in sub-frame #5 in the radio frame #M+1 in the same way as in the sub-frame #0 in the first group of sub-frames in the first implementation of the first scheme; and in the sub-frame #4 in the radio frame #M+1, the data symbols extracted from the REs corresponding to the CRS and the CSI-RS can be assumed to be zero or a predetermined value, that is, it is considered that there is actually no data transmitted on the RE positions of the CRS and the CSI-RS, but placeholders thereof are required among the data information, thus resulting in the Q received modulation symbols so that the number of data modulation symbols and the number of encoded bits are the same in each sub-frame; and the Q modulation symbols received in each of these four sub-frames are combined across the sub-frames, for example, the data in the four sub-frames is added together and divided by 4, where the modulation symbols corresponding to the CRS REs in the sub-frames #4 and #5 are precluded from combination, that is, only the data in the sub-frames #2 and #3 is combined on the CRS RE positions, that is, the data in the two sub-frames is added together and divided by 2 on the CRS RE positions, and the modulation symbols corresponding to the CSI-RS REs in the sub-frame #4 are precluded from combination, that is, only the data in the sub-frames #2, #3, and #5 is combined on the CSI-RS RE positions, that is, the data in the three sub-frames is added together and divided by 3 on the CSI-RS RE positions; and subsequently the combined data is further processed. Furthermore in the sub-frames #2 and #3, if the transmitter maps a part of the encoded sequence or the modulation symbols repeatedly onto the spared OFDM symbol (i.e., the third OFDM symbol) to be transmitted, before the data are combined across the sub-frames #2 and #3, the receiver receives the data on the third OFDM symbol, and combines the corresponding repeated information in the sub-frames #2 and #3 to obtain the Q modulation symbols.

In a second implementation of the fourth scheme, when channel encoding and rate matching is performed on TBs carried over the PDSCH, suppose a size of a control area in each sub-frame in the group of sub-frames is the smaller one of the number of symbols in a control area of an MBSFN sub-frame and the number of symbols in a control area of a non-MBSFN sub-frame, i.e., 2 in this embodiment.

At the transmitter, in the sub-frames #2 and #3 in the radio frame #M+1, the PDSCH is mapped in the same way as in the sub-frames #1 to #3 in the first group of sub-frames in the second implementation of the first scheme, so a repeated description thereof is omitted here.

Figure 15:
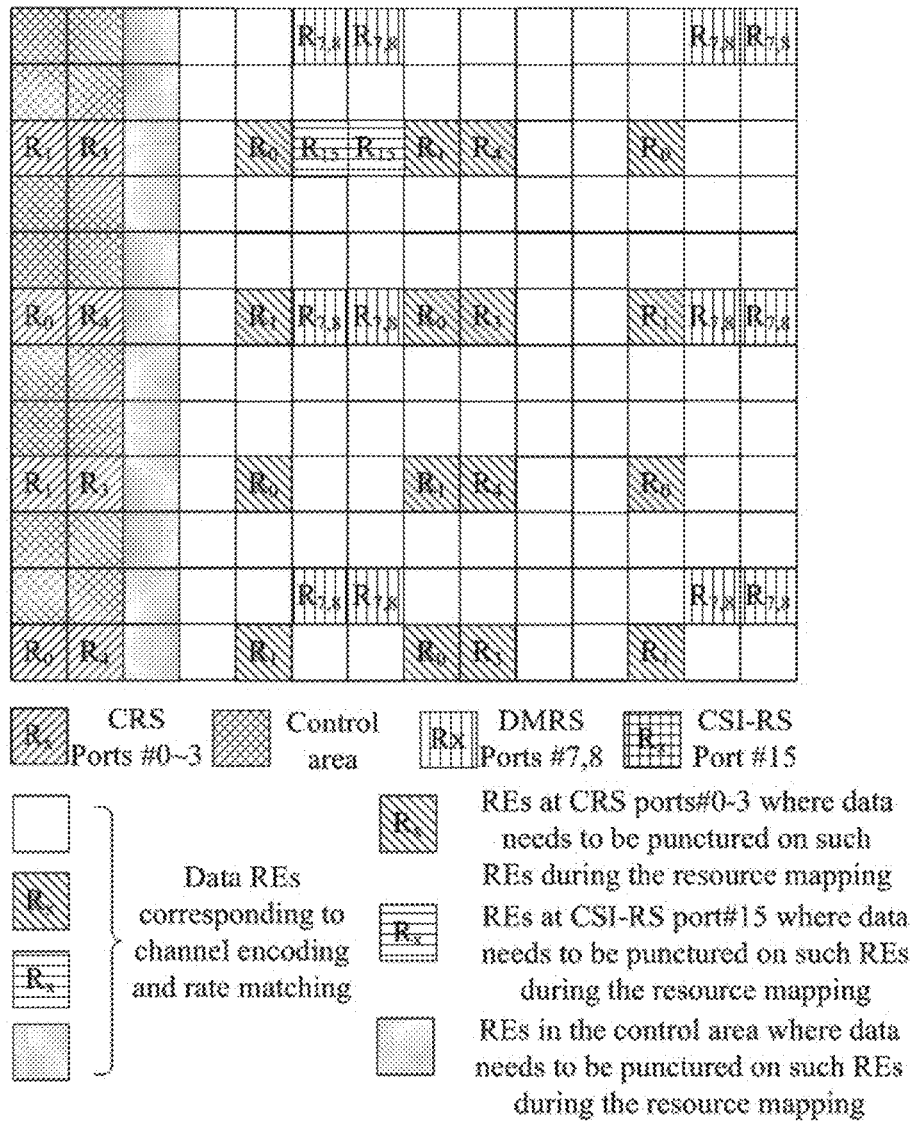
FIG. 15 is a schematic diagram of a data RE condition 3 in a non-MBSFN sub-frame including a CSI-RS according to an embodiment of the disclosure.

In the sub-frame #4 in the radio frame #M+1, when channel encoding and rate matching is performed on the TBs carried over the PDSCH, suppose there is neither CRS RE nor CSI-RS RE, only resources of the DMRS and the control area of two symbols needs to be reserved, that is, when the number of REs corresponding to a target number of bits after channel encoding and rate matching is performed on the TBs is calculated, suppose data can be transmitted in all the REs (including the REs occupied by CRS and CSI-RS in a data area, and the last OFDM symbol in the control area) other than the REs corresponding to the DMRS and the control area of two symbols as illustrated in FIG. 15 (which illustrates a condition in a PRB), and the number of data REs in six PRBs is also 6*132=792. The target number of bits after channel encoding and rate matching is performed on the TBs is calculated as K=792*2=1584 according to a modulation scheme, channel encoding and rate matching is performed on the TBs to obtain an encoded sequence of K bits, the sequence is modulated and processed otherwise into Q=1584/2=792 modulation symbols, and when the Q modulation symbols are further mapped onto the corresponding REs in a predetermined mode to be transmitted, the REs corresponding to a DMRS and the control area of two symbols are spared. Since there are CRSes transmitted in the CRS REs, in order to prevent transmission of the CRS from being affected, the data is not mapped onto the RE positions of the CRS, that is, the corresponding data information transmitted on the RE positions of the CRS is discarded (i.e., punctured); since there are CSI-RSes transmitted in the REs corresponding to the CSI-RSes, in order to prevent transmission of the CSI-RS from being affected, the data is not mapped onto the RE positions of the CSI-RS, that is, the corresponding data information transmitted on the RE positions of the CSI-RS is discarded (i.e., punctured), and since there is control information transmitted in the REs corresponding to the last OFDM symbol in the control area, in order to prevent transmission of the control information from being affected, the data is not mapped onto the RE positions, that is, the corresponding data information transmitted on the RE positions corresponding to the last OFDM symbol in the control area is discarded (i.e., punctured), as illustrated in FIG. 15.

In the sub-frame #5 in the radio frame #M+1, the PDSCH is mapped in the same way as in the sub-frame #0 in the first group of sub-frames in the second implementation of the first scheme, so a repeated description thereof is omitted here.

At the receiver, the target number K of bits, and the number Q of modulation symbols after channel encoding and rate matching is performed on the TBs are determined in the same way as at the transmitter; and the data are received in the sub-frames #2 and #3 in the radio frame #M+1 in the same way as in the sub-frames #1 to #3 in the first group of sub-frames in the second implementation of the first scheme; the data are received in sub-frame #5 in the radio frame #M+1 in the same way as in the sub-frame #0 in the first group of sub-frames in the second implementation of the first scheme. In the sub-frame #4 in the radio frame #M+1, the data symbols extracted from the REs corresponding to the CRS, the CSI-RS and the last OFDM symbol in the control area can be assumed to be zero or a predetermined value, that is, it is considered that there is actually no data transmitted on the positions, but placeholders thereof are required among the data information, thus resulting in the Q received modulation symbols so that the number of data modulation symbols and the number of encoded bits are the same in each sub-frame; and the Q modulation symbols received in each of these four sub-frames are combined across the sub-frames, for example, the data in the four sub-frames is added together and divided by 4, where the modulation symbols corresponding to the REs of the CRS in the sub-frames #4 and #5, and the last OFDM symbols in the control areas are precluded from combination, that is, only the data in the sub-frames #2 and #3 are combined on the RE positions of the CRS in the sub-frames #4 and #5 and the last OFDM symbols in the control areas, that is, the data in the two sub-frames is added together and divided by 2 on the positions, and the modulation symbols corresponding to the CSI-RS REs in the sub-frame #4 are precluded from combination, that is, only the data in the sub-frames #2, #3, and #5 are combined on the CSI-RS RE positions, that is, the data in the three sub-frames is added together and divided by 3 on the CSI-RS RE positions; and subsequently the combined data is further processed.

The PDSCH can be mapped, and the data can be received, in the respective subsequent groups of sub-frames as in the processes described in the first scheme to the fourth scheme in the particular embodiment above, dependent upon whether there are CSI-RS REs, and whether the respective groups of sub-frames include both an MBSFN sub-frame and a non-MBSFN sub-frame.

In a second approach: the PDSCH is mapped to the set of sub-frames.

Since the set of 100 sub-frames include both MBSFN sub-frames and non-MBSFN sub-frames, there are the following two schemes.

In a first scheme, when channel encoding and rate matching is performed on TBs carried over the PDSCH, suppose a size of a control area in each sub-frame in a group of sub-frames is the larger one of the number of symbols in a control area of an MBSFN sub-frame and the number of symbols in a control area of a non-MBSFN sub-frame, i.e., 3 in this embodiment.

At the transmitter, in all the non-MBSFN sub-frames including no CSI-RS among the 100 sub-frames, e.g., the sub-frames #0, #5, #6, and #7 in a radio frame according to this embodiment, the PDSCH is mapped particularly in the same way as in the sub-frame #0 in the first scheme of the first approach, so a repeated description thereof is omitted here.

In all the non-MBSFN sub-frames including CSI-RSes among the 100 sub-frames, e.g., the sub-frame #4 in a radio frame according to this embodiment, the PDSCH is mapped particularly in the same way as in the sub-frame #4 in the fourth group of sub-frames (i.e., the sub-frame #4 in the radio frame #M+1) in the first scheme of the first approach, so a repeated description thereof is omitted here.

In all the MBSFN sub-frames including no CSI-RS among the 100 sub-frames, e.g., the sub-frames #1, #2, #3, and #8 in a radio frame according to this embodiment, the PDSCH is mapped particularly in the same way as in the sub-frames #1 to #3 in the first scheme of the first approach, so a repeated description thereof is omitted here.

In all the MBSFN sub-frames including CSI-RSes among the 100 sub-frames. e.g., the sub-frame #9 in a radio frame according to this embodiment, the PDSCH is mapped particularly in the same way as in the sub-frame #9 in the first scheme of the first approach, so a repeated description thereof is omitted here.

At the receiver, the data are received in the sub-frames above correspondingly to how they are transmitted in the sub-frames. When the data is combined across sub-frames, data extracted from the CRS positions in the non-MBSFN sub-frames is set to zero or a predetermined value, and data extracted from the CSI-RS positions in the MBSFN sub-frames and the non-MBSFN sub-frames including CSI-RSes is set to zero or a predetermined value, that is, it is considered that there is actually no data transmitted on the positions, but placeholders thereof are required among the data information, thus resulting in the Q received modulation symbols so that the number of data modulation symbols and the number of encoded bits are the same in each sub-frame, and the data are received starting at the fourth symbols in the MBSFN sub-frames; and every four sub-frames are put into a group, and the Q modulation symbols received in each sub-frame in the group are combined across the sub-frames (for example, the data in the four sub-frames is added together, and divided by 4), where the modulation symbols corresponding to the CRS REs in the non-MBSFN sub-frames are precluded from combination, that is, only the corresponding data in the remaining sub-frames is combined on the positions of the CRS REs, that is, the data on the positions corresponding to the CRS RE positions in the remaining sub-frames is averaged; the modulation symbols corresponding to the CSI-RS REs in the MBSFN sub-frames and the non-MBSFN sub-frames are precluded from combination, that is, only the corresponding data in the remaining sub-frames is combined on the positions of the CSI-RS REs, that is, the data on the positions corresponding to the CSI-RS RE positions in the remaining sub-frames is averaged on the positions of the CSI-RS REs; and subsequently the combined data is further processed. Particularly when the transmitter maps a part of the result of encoding and rate matching repeatedly onto the spared OFDM symbol, i.e., the third OFDM symbol, in the MBSFN sub-frame, before the data is combined across the sub-frames, the receiver further combines the data mapped repeatedly onto the spared OFDM symbol of the sub-frame.

In a second scheme, when channel encoding and rate matching is performed on TBs carried over the PDSCH, suppose a size of a control area in each sub-frame in a group of sub-frames is the smaller one of the number of symbols in a control area of an MBSFN sub-frame and the number of symbols in a control area of a non-MBSFN sub-frame, i.e., 2 in this embodiment.

At the transmitter, in all the non-MBSFN sub-frames including no CSI-RS among the 100 sub-frames, e.g., the sub-frames #0, #5, #6, and #7 in a radio frame according to this embodiment, the PDSCH is mapped particularly in the same way as in the sub-frame #0 in the second scheme of the first approach, so a repeated description thereof is omitted here.

In all the non-MBSFN sub-frames including CSI-RSes among the 100 sub-frames, e.g., the sub-frame #4 in a radio frame according to this embodiment, the PDSCH is mapped particularly in the same way as in the sub-frame #4 in the fourth group of sub-frames (i.e., the sub-frame #4 in the radio frame #M+1) in the second scheme of the first approach, so a repeated description thereof is omitted here.

In all the MBSFN sub-frames including no CSI-RS among the 100 sub-frames, e.g., the sub-frames #1, #2, #3, and #8 in a radio frame according to this embodiment, the PDSCH is mapped particularly in the same way as in the sub-frames #1 to #3 in the second scheme of the first approach, so a repeated description thereof is omitted here.

In all the MBSFN sub-frames including CSI-RSes among the 100 sub-frames, e.g., the sub-frame #9 in a radio frame according to this embodiment, the PDSCH is mapped particularly in the same way as in the sub-frame #9 in the second scheme of the first approach, so a repeated description thereof is omitted here.

At the receiver, the data is received in the sub-frames above correspondingly to how they are transmitted in the sub-frames. When the data is combined across the sub-frames, data extracted from the CRS positions and the last symbols in the control areas in the non-MBSFN sub-frames is set to zero or a predetermined value, and data extracted from the CSI-RS positions in the MBSFN sub-frames and the non-MBSFN sub-frames including CSI-RSes is set to zero or a predetermined value, that is, it is considered that there is actually no data transmitted on the positions, but placeholders thereof are required among the data information, thus resulting in the Q received modulation symbols so that the number of data modulation symbols and the number of encoded bits are the same in each sub-frame, and the data is normally received in the MBSFN sub-frames including no CSI-RS; and every four sub-frames are put into a group, and the Q modulation symbols received in each sub-frame in the group are combined across the sub-frames (for example, the data in the four sub-frames is added together, and divided by 4), where the modulation symbols corresponding to the CRS REs and the last symbols in the control areas in the non-MBSFN sub-frames are precluded from combination, that is, only the corresponding data in the remaining sub-frames are combined on the positions of the CRS REs (that is, the data on the corresponding positions in the remaining sub-frames is averaged on the positions of CRS REs); the modulation symbols corresponding to the CSI-RS REs in the MBSFN sub-frames and the non-MBSFN sub-frames are precluded from combination, that is, only the corresponding data in the remaining sub-frames are combined on the positions of the CSI-RS REs (that is, the data on the corresponding positions in the remaining sub-frames is averaged on the positions of the CSI-RS REs); and subsequently the combined data is further processed.

It shall be noted that the particular embodiment has been described only taking as an example 4 ports of CRSes, 1 port of DMRS, and control areas of two and three symbols; and furthermore the corresponding number of CRS REs varies with the varying real number of CRS ports, for example, if the number of CRS ports is 1, the CRS REs may only correspond to REs corresponding to the port 0 as illustrated, and if the number of CRS ports is 2, the CRS RE may only correspond to REs corresponding to the ports 0 and 1 as illustrated; furthermore the corresponding number of DMRS REs varies with the varying real number of DMRS ports, for example, if the number of DMRS ports is 3 or 4, REs corresponding to the DMRS ports 9 and 10 may be also added thereto, i.e., REs below the REs corresponding to the DMRS port 7 or 8 as illustrated, and if the number of DMRS ports ranges from 4 to 8, the positions of their RE resource positions may be the same as the ports 7 to 10; and furthermore the size of the control area can range from 0 to 4 symbols. This method can support channel estimation across a group of sub-frames including any number of sub-frames, and combination of data in any number of sub-frames.

Furthermore in the particular embodiment, the data in all the sub-frames is supposed to be demodulated based upon a DMRS, and in fact, data in a group of sub-frames including only non-MBSFN sub-frames in the first approach, e.g., the second group of sub-frames, can be demodulated based upon a CRS as prescribed, and at this time, there are no DMRS REs, which means actually the DMRS REs as illustrated are REs available to data, so channel encoding and rate matching needs to be performed on the TBs while calculating the DMRS REs, and the PDSCH needs to be mapped to the resources by also mapping the data onto the DMRS REs.

Based upon the same inventive idea, an embodiment of the disclosure further provides a transmitting device, and for a particular implementation of the transmitting device, reference can be made to the description about repeated transmission of downlink data by the transmitter according to the embodiment above, so a repeated description thereof is omitted here.

Figure 16:
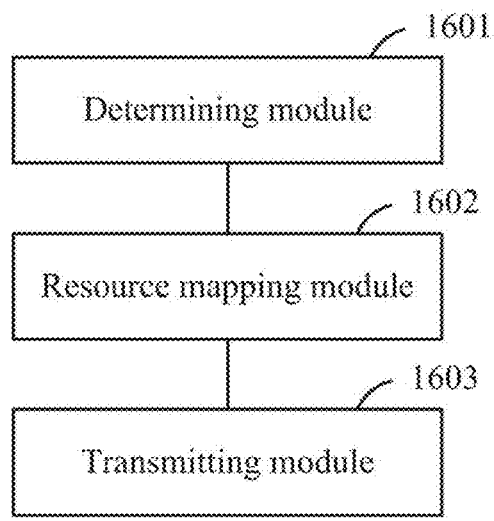
FIG. 16 is a schematic structural diagram of a transmitting device according to an embodiment of the disclosure.

As illustrated in FIG. 16, the transmitting device generally includes: a determining module 1601 configured to determine a set of sub-frames for repeated transmission of a physical downlink channel, a resource mapping module 1602 configured to map the physical downlink channel to resources in each sub-frame in the determined set of sub-frames by starting at a specific start symbol position in a first slot of a current sub-frame and mapping onto all resources other than resources corresponding to a reference signal for demodulation; and a transmitting module 1603 configured to transmit the physical downlink channel according to the resource mapping mode.

Particularly the specific start symbol position is preconfigured via higher-layer signaling; or the specific start symbol position is obtained according to a size of a DCI area, and the size of the DCI area is obtained according to a CFI.

In the embodiment of the disclosure, the resource mapping module 1602 is configured to map the physical downlink channel onto all the resources other than resources corresponding to the reference signal for demodulation by starting at the specific start symbol position in the first slot of the current sub-frame, that is, only the resources corresponding to the reference signal for demodulation and to the control area are reserved, and the reserved resources are not used to transmit data of the physical downlink channel, particularly in the following several different implementations without any limitation thereto.

In a first Implementation, the resource mapping module is configured to: if a group of sub-frames consisting of a preset number of sub-frames to be involved in multi-sub-frame channel estimation, in the set of sub-frames, includes an MBSFN sub-frame and a non-MBSFN sub-frame, determine a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame; determine a specific start symbol position of each sub-frame in each group of sub-frames according to the third number of symbols; and map the physical downlink channel to the resources by starting at the start symbol position, determined according to the third number of symbols, in the first slot of the current sub-frame. Or the resource mapping module is configured to: if the set of sub-frames includes an MBSFN sub-frame and a non-MBSFN sub-frame, determine a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determine a specific start symbol position of each sub-frame in the set of sub-frames according to the third number of symbols; and map the physical downlink channel to the resources by starting at the start symbol position, determined according to the third number of symbols, in the first slot of the current sub-frame.

Particularly the resource mapping module is configured to: determine the third number of symbols as the smaller or larger one of the first number of symbols and the second number of symbols.

The resource mapping module is configured to: if the third number of symbols is the smaller one of the first number of symbols and the second number of symbols, map the physical downlink channel to resources in a sub-frame in which the real number of symbols in a DCI area is more than the third number of symbols, by discarding, or setting to zero, information, carried over the physical downlink channel, mapped onto first A symbols in the first slot of the current sub-frame, starting at the start symbol position determined according to the third number of symbols, or overwriting the information with DCI transmitted in the A symbols, where the number A of symbols is the difference between the real number of symbols in the DCI area in the current sub-frame and the third number of symbols. Or, The resource mapping module is configured to: if the third number of symbols is the larger one of the first number of symbols and the second number of symbols, map the physical downlink channel to resources in a sub-frame in which the real number of symbols in a DCI area is less than the third number of symbols by starting at the start symbol position, determined according to the third number of symbols, in the first slot of the current sub-frame, and mapping a part of information carried over the physical downlink channel repeatedly onto a number B of symbols before the start symbol position, determined according to the third number of symbols, in the first slot of the current sub-frame, where the number B of symbols is the difference between the third number of symbols and the real number of symbols in the DCI area in the current sub-frame.

In a second implementation, the resource mapping module is configured to: if a group of sub-frames consisting of a preset number of sub-frames to be involved in multi-sub-frame channel estimation, in the set of sub-frames, includes an MBSFN sub-frame and a non-MBSFN sub-frame, map the physical downlink channel to resources in each sub-frame in each group of sub-frames by starting at the specific start symbol position in the first slot of the current sub-frame and mapping all the resources other than resources corresponding to a dedicated DMRS; and map the physical downlink channel to the resources in the non-MBSFN sub-frame in each group of sub-frames by discarding, or setting to zero, information, carried over the physical downlink channel, mapped onto CRS resources, or overwriting the information with a CRS transmitted over the CRS resources. Or the resource mapping module is configured to: if the set of sub-frames includes an MBSFN sub-frame and a non-MBSFN sub-frame, map the physical downlink channel to resources in each sub-frame in the set of sub-frames by starting at the specific start symbol position in the first slot of the current sub-frame and mapping onto all the resources other than resources corresponding to a dedicated DMRS; and map the physical downlink channel to the resources in the non-MBSFN sub-frame in the set of sub-frames by discarding, or setting to zero, information, carried over the physical downlink channel, mapped onto CRS resources, or overwriting the information with a CRS transmitted over the CRS resources.

In a third implementation, the resource mapping module is configured to: if a group of sub-frames consisting of a preset number of sub-frames to be involved in multi-sub-frame channel estimation, in the set of sub-frames, includes only non-MBSFN sub-frames, map the physical downlink channel to resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS. Or, the resource mapping module is configured to: if the set of sub-frames includes only non-MBSFN sub-frames, map the physical downlink channel to resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

In a fourth implementation, the resource mapping module is configured to: if a group of sub-frames consisting of a preset number of sub-frames to be involved in multi-sub-frame channel estimation, in the set of sub-frames, includes only MBSFN sub-frames, map the physical downlink channel to resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS. Or the resource mapping module is configured to: if the set of sub-frames includes only MBSFN sub-frames, map the physical downlink channel to resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

In any one of the first to fourth implementations, the resource mapping module is further configured to: map the physical downlink channel to resources in a sub-frame configured with CSI-RS resources in the set of sub-frames by discarding, or setting to zero, information, carried over the physical downlink channel, mapped onto NZP CSI-RS resources, or overwriting the information with a CSI-RS transmitted over the NZP CSI-RS resources, and discarding, or setting to zero, information, carried over the physical downlink channel, mapped onto ZP CSI-RS resources.

In an implementation, the transmitting module is configured to: if a group of sub-frames consisting of a preset number of sub-frames to be involved in multi-sub-frame channel estimation, in the set of sub-frames, includes an MBSFN sub-frame and a non-MBSFN sub-frame, transmit the physical downlink channel in the MBSFN sub-frame and the non-MBSFN sub-frame belonging to the same group of sub-frame, where the transmission scheme at least includes one or any combining of reference signals for demodulation, transmission ports and the number of ports, and a pre-coding scheme. Or the transmitting module is configured to: if the set of sub-frames includes an MBSFN sub-frame and a non-MBSFN sub-frame, transmit the physical downlink channel in the MBSFN sub-frame and the non-MBSFN sub-frame in the set of sub-frames using a same transmission scheme, where the transmission scheme at least includes one or any combining of reference signals for demodulation, transmission ports and the number of ports, and a pre-coding scheme.

The transmitting module is further configured to: transmit the physical downlink channel using a transmission scheme corresponding to a specific sub-frame in the set of sub-frames or in the group of sub-frames; or transmit the physical downlink channel using a preset transmission scheme.

Particularly the transmitting module is configured to: transmit the physical downlink channel using a transmission scheme corresponding to a first sub-frame in the set of sub-frames or in the group of sub-frames; or transmit the physical downlink channel using a transmission scheme corresponding to the MBSFN sub-frame in the set of sub-frames or in the group of sub-frames.

Figure 17:
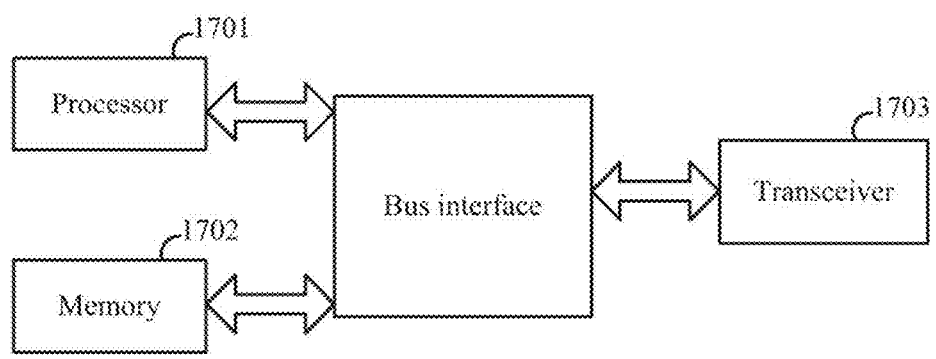
FIG. 17 is a schematic structural diagram of another transmitting device according to an embodiment of the disclosure.

Based upon the same inventive idea, an embodiment of the disclosure further provides a transmitting device, and for a particular implementation of the transmitting device, reference can be made to the description about repeated transmission of downlink data by the transmitter according to the embodiment above, so a repeated description thereof is omitted here. As illustrated in FIG. 17, the transmitting device generally includes: a processor 1701, a memory 1702, and a transceiver 1703, where a preset program is stored in the memory 1702, and the processor 1701 is configured to read the preset program in the memory 1702, and to execute the program to: determine a set of sub-frames for repeated transmission of a physical downlink channel; map the physical downlink channel to resources in each sub-frame in the determined set of sub-frames by starting at a specific start symbol position in a first slot of a current sub-frame and mapping onto all resources other than resources corresponding to a reference signal for demodulation; and transmit the physical downlink channel according to the resource mapping mode through the transceiver.

Particularly the specific start symbol position is preconfigured via higher-layer signaling; or the specific start symbol position is obtained according to a size of a DCI area, and the size of the DCI area is obtained according to a CFI.

In the embodiment of the disclosure, the processor 1701 is configured to map the physical downlink channel onto all the resources other than the resources corresponding to the reference signal for demodulation by starting at the specific start symbol position in the first slot of the current sub-frame, that is, only the resources corresponding to the reference signal for demodulation and the control area are reserved, and the reserved resources cannot be used to transmit data of the physical downlink channel, particularly in the following several different implementations without any limitation thereto.

In a first Implementation, the processor 1701 is configured to: if a group of sub-frames consisting of a preset number of sub-frames to be involved in multi-sub-frame channel estimation, in the set of sub-frames, includes an MBSFN sub-frame and a non-MBSFN sub-frame, determine a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame; determine a specific start symbol position of each sub-frame in each group of sub-frames according to the third number of symbols; and map the physical downlink channel to the resources by starting at the start symbol position, determined according to the third number of symbols, in the first slot of the current sub-frame.

Or the processor 1701 is configured to: if the set of sub-frames includes an MBSFN sub-frame and a non-MBSFN sub-frame, determine a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determine a specific start symbol position of each sub-frame in the set of sub-frames according to the third number of symbols; and map the physical downlink channel to the resources by starting at the start symbol position, determined according to the third number of symbols, in the first slot of the current sub-frame.

Particularly the processor 1701 is configured to determine the third number of symbols as the smaller or larger one of the first number of symbols and the second number of symbols.

The processor 1701 is configured to: if the third number of symbols is the smaller one of the first number of symbols and the second number of symbols, map the physical downlink channel to resources in a sub-frame in which the real number of symbols in a DCI area is more than the third number of symbols, by discarding, or setting to zero, information, carried over the physical downlink channel, mapped onto first A symbols by starting at the start symbol position, determined according to the third number of symbols, in the first slot of the current sub-frame, or overwriting the information with DCI transmitted in the A symbols, where the number A of symbols is the difference between the real number of symbols in the DCI area in the current sub-frame and the third number of symbols.

Or the processor 1701 is configured to: if the third number of symbols is the larger one of the first number of symbols and the second number of symbols, map the physical downlink channel to resources in a sub-frame in which the real number of symbols in a DCI area is less than the third number of symbols by starting at the start symbol position, determined according to the third number of symbols, in the first slot of the current sub-frame, and mapping a part of information carried over the physical downlink channel repeatedly onto a number B of symbols before the start symbol position, determined according to the third number of symbols, in the first slot of the current sub-frame, where the number B of symbols is the difference between the third number of symbols and the real number of symbols in the DCI area in the current sub-frame.

In a second implementation, the processor 1701 is configured to: if a group of sub-frames consisting of a preset number of sub-frames to be involved in multi-sub-frame channel estimation, in the set of sub-frames, includes an MBSFN sub-frame and a non-MBSFN sub-frame, map the physical downlink channel to resources in each sub-frame in each group of sub-frames by starting at the specific start symbol position in the first slot of the current sub-frame and mapping onto all the resources other than resources corresponding to a dedicated DMRS; and map the physical downlink channel to the resources in the non-MBSFN sub-frame in each group of sub-frames by discarding, or setting to zero, information, carried over the physical downlink channel, mapped onto CRS resources, or overwriting the information with a CRS transmitted over the CRS resources.

Or the processor 1701 is configured to: if the set of sub-frames includes an MBSFN sub-frame and a non-MBSFN sub-frame, map the physical downlink channel to resources by mapping the physical downlink channel onto all the resources other than resources corresponding to a dedicated DMRS; and map the physical downlink channel to the resources in the non-MBSFN sub-frame in the set of sub-frames by discarding, or setting to zero, information, carried over the physical downlink channel, mapped onto CRS resources, or overwriting the information with a CRS transmitted over the CRS resources.

In a third implementation, the processor 1701 is configured to: if a group of sub-frames consisting of a preset number of sub-frames to be involved in multi-sub-frame channel estimation, in the set of sub-frames, includes only non-MBSFN sub-frames, map the physical downlink channel to resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

Or the processor 1701 is configured to: if the set of sub-frames includes only non-MBSFN sub-frames, map the physical downlink channel to resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

In a fourth implementation, the processor 1701 is configured to: if a group of sub-frames consisting of a preset number of sub-frames to be involved in multi-sub-frame channel estimation, in the set of sub-frames, includes only MBSFN sub-frames, map the physical downlink channel to resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS.

Or the processor 1701 is configured to: if the set of sub-frames includes only MBSFN sub-frames, map the physical downlink channel to resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

In any one of the first to fourth implementations, the processor 1701 is further configured to: map the physical downlink channel to resources in a sub-frame configured with CSI-RS resources in the set of sub-frames by discarding, or setting to zero, information, carried over the physical downlink channel, mapped onto NZP CSI-RS resources, or overwriting the information with a CSI-RS transmitted over the NZP CSI-RS resources, and discarding, or setting to zero, information, carried over the physical downlink channel, mapped onto ZP CSI-RS resources.

In an implementation, the processor 1701 is configured to: if a group of sub-frames consisting of a preset number of sub-frames to be involved in multi-sub-frame channel estimation, in the set of sub-frames, includes an MBSFN sub-frame and a non-MBSFN sub-frame, instruct the transceiver to transmit the physical downlink channel in the MBSFN sub-frame and the non-MBSFN sub-frame belonging to the same group of sub-frames using a same transmission scheme, where the transmission scheme at least includes one or any combining of reference signals for demodulation, transmission ports and the number of ports, and a pre-coding scheme.

Or the processor 1701 is configured to: if the set of sub-frames includes an MBSFN sub-frame and a non-MBSFN sub-frame, instruct the transceiver to transmit the physical downlink channel in the MBSFN sub-frame and the non-MBSFN sub-frame in the set of sub-frames using a same transmission scheme, where the transmission scheme at least includes one or any combining of reference signals for demodulation, transmission ports and the number of ports, and a pre-coding scheme.

The processor 1701 is further configured to instruct the transceiver 1703 to transmit the physical downlink channel using a transmission scheme corresponding to a specific sub-frame in the set of sub-frames or in the group of sub-frame, or to transmit the physical downlink channel using a preset transmission scheme.

Particularly the processor 1701 is further configured to instruct the transceiver 1703 to transmit the physical downlink channel using a transmission scheme corresponding to a first sub-frame in the set of sub-frames or in the group of sub-frames; or to transmit the physical downlink channel using a transmission scheme corresponding to the MBSFN sub-frame in the set of sub-frames or in the group of sub-frames.

Based upon the same inventive idea, an embodiment of the disclosure further provides a receiving device, and for a particular implementation of the receiving device, reference can be made to the description about repeated transmission of downlink data by the receiver according to the embodiment above, so a repeated description thereof is omitted here.

Figure 18:
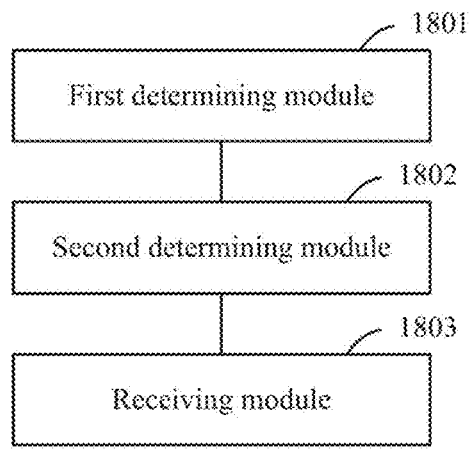
FIG. 18 is a schematic structural diagram of a receiving device according to an embodiment of the disclosure.

As illustrated in FIG. 18, the receiving device generally includes: a first determining module 1801 configured to determine a set of sub-frames for repeated transmission of a physical downlink channel; a second determining module 1802 configured to determine that the physical downlink channel is mapped to resources in each sub-frame in the determined set of sub-frames by starting at a specific start symbol position in a first slot of a current sub-frame and mapping onto all resources other than resources corresponding to a reference signal for demodulation; and a receiving module 1803 configured to receive the physical downlink channel according to the resource mapping mode.

Particularly the specific start symbol position is preconfigured via higher-layer signaling; or the specific start symbol position is obtained according to a size of a DCI area, and the size of the DCI area is obtained according to a CFI.

In the embodiment of the disclosure, the second determining module is configured to determine that the physical downlink channel is mapped to the resources by starting at the specific start symbol position in the first slot of the current sub-frame, that is, only the resources corresponding to the reference signal for demodulation and the control area are reserved, and the reserved resources cannot be used to transmit data of the physical downlink channel, particularly in the following several different implementations without any limitation thereto.

In a first Implementation, the second determining module is configured to: if a group of sub-frames consisting of a preset number of sub-frames to be involved in multi-sub-frame channel estimation, in the set of sub-frames, includes an MBSFN sub-frame and a non-MBSFN sub-frame, determine a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame; determine a specific start symbol position of each sub-frame in each group of sub-frames according to the third number of symbols; and determine that the physical downlink channel is mapped to the resources by starting at the start symbol position, determined according to the third number of symbols, in the first slot of the current sub-frame.

Or the second determining module is configured to: if the set of sub-frames includes an MBSFN sub-frame and a non-MBSFN sub-frame, determine a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determine a specific start symbol position of each sub-frame in the set of sub-frames according to the third number of symbols; and determine that the physical downlink channel is mapped to the resources by starting at the start symbol position, determined according to the third number of symbols, in the first slot of the current sub-frame.

The second determining module is configured to determine the third number of symbols as the smaller or larger one of the first number of symbols and the second number of symbols.

In an implementation, the second determining module is configured to: if the third number of symbols is the smaller one of the first number of symbols and the second number of symbols, determine that the physical downlink channel is mapped to resources in a sub-frame in which the real number of symbols in a DCI area is more than the third number of symbols, by discarding, or setting to zero, information, carried over the physical downlink channel, mapped onto first A symbols by starting at the start symbol position, determined according to the third number of symbols, in the first slot of the current sub-frame, or overwriting the information with DCI transmitted in the A symbols, where the number A of symbols is the difference between the real number of symbols in the DCI area in the current sub-frame and the third number of symbols.

Or the second determining module is configured to: if the third number of symbols is the larger one of the first number of symbols and the second number of symbols, determine that the physical downlink channel is mapped to resources in a sub-frame in which the real number of symbols in a DCI area is less than the third number of symbols by starting at the start symbol position, determined according to the third number of symbols, in the first slot of the current sub-frame, and determine that the physical downlink channel is mapped to the resources by mapping a part of information carried over the physical downlink channel repeatedly onto a number B of symbols before the start symbol position, determined according to the third number of symbols, in the first slot of the current sub-frame, where the number B of symbols is the difference between the third number of symbols and the real number of symbols in the DCI area in the current sub-frame.

In a second implementation, the second determining module is configured to: if a group of sub-frames consisting of a preset number of sub-frames to be involved in multi-sub-frame channel estimation, in the set of sub-frames, includes an MBSFN sub-frame and a non-MBSFN sub-frame, determine that the physical downlink channel is mapped to the resources in each sub-frame in each group of sub-frames by starting at the specific start symbol position in the first slot of the current sub-frame and mapping onto all the resources other than resources corresponding to a dedicated DMRS; and determine that the physical downlink channel is mapped to the resources in the non-MBSFN sub-frame in each group of sub-frames by discarding, or setting to zero, information, carried over the physical downlink channel, mapped onto CRS resources, or overwriting the information with a CRS transmitted over the CRS resources.

Or the second determining module is configured to: if the set of sub-frames includes an MBSFN sub-frame and a non-MBSFN sub-frame, determine that the physical downlink channel is mapped to the resources in each sub-frame in the set of sub-frames by starting at the specific start symbol position in the first slot of the current sub-frame and mapping onto all the resources other than resources corresponding to a dedicated DMRS; and determine that the physical downlink channel is mapped to the resources in the non-MBSFN sub-frame in the set of sub-frames by discarding, or setting to zero, information, carried over the physical downlink channel, mapped onto CRS resources, or overwriting the information with a CRS transmitted over the CRS resources.

In a third implementation, the second determining module is configured to: if a group of sub-frames consisting of a preset number of sub-frames to be involved in multi-sub-frame channel estimation, in the set of sub-frames, includes only non-MBSFN sub-frames, determine that the physical downlink channel is mapped to the resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

Or the second determining module is configured to: if the set of sub-frames includes only non-MBSFN sub-frames, determine that the physical downlink channel is mapped to the resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

In a fourth implementation, the second determining module is configured to: if a group of sub-frames consisting of a preset number of sub-frames to be involved in multi-sub-frame channel estimation, in the set of sub-frames, includes only MBSFN sub-frames, determine that the physical downlink channel is mapped to the resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS.

Or the second determining module is configured to: if the set of sub-frames includes only MBSFN sub-frames, determine that the physical downlink channel is mapped to the resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

In any one of the first to fourth implementations, the second determining module is further configured to: determine that the physical downlink channel is mapped to resources in a sub-frame configured with CSI-RS resources in the set of sub-frames by discarding, or setting to zero, information, carried over the physical downlink channel, mapped onto NZP CSI-RS resources, or overwriting the information with a CSI-RS transmitted over the NZP CSI-RS resources, and discarding, or setting to zero, information, carried over the physical downlink channel, mapped onto ZP CSI-RS resources.

Particularly the receiving module is configured to: if a group of sub-frames consisting of a preset number of sub-frames to be involved in multi-sub-frame channel estimation, in the set of sub-frames, includes an MBSFN sub-frame and a non-MBSFN sub-frame, receive the physical downlink channel in the MBSFN sub-frame and the non-MBSFN sub-frame belonging to the same group of sub-frames using a same transmission scheme, where the transmission scheme at least includes one or any combining of reference signals for demodulation, transmission ports and the number of ports, and a pre-coding scheme.

Or the receiving module is configured to: if the set of sub-frames includes an MBSFN sub-frame and a non-MBSFN sub-frame, receive the physical downlink channel in the MBSFN sub-frame and the non-MBSFN sub-frame in the set of sub-frames using a same transmission scheme, where the transmission scheme at least includes one or any combining of reference signals for demodulation, transmission ports and the number of ports, and a pre-coding scheme.

The receiving module is configured to: receive the physical downlink channel using a transmission scheme corresponding to a specific sub-frame in the set of sub-frames or in the group of sub-frame; or receive the physical downlink channel using a preset transmission scheme.

Particularly the receiving module is configured to: receive the physical downlink channel using a transmission scheme corresponding to a first sub-frame in the set of sub-frames or in the group of sub-frames; or receive the physical downlink channel using a transmission scheme corresponding to the MBSFN sub-frame in the set of sub-frames or in the group of sub-frames.

In an implementation, the receiving module is configured to: when receive the physical downlink channel according to the resource mapping mode, receive information, carried over resources to which the physical downlink channel is mapped by discarding, or setting to zero, or overwriting with other signals the information carried over the resources, in such a way that the information is set to zero or a specific value.

In an implementation, the receiving module is configured to: combine information received in each sub-frame in a group of sub-frames consisting of a preset number of sub-frames to be involved in multi-sub-frame channel estimation, in the set of sub-frames by determining that information on resource positions set to 0 or a specific value is precluded from combination, or combine information received in each sub-frame in the set of sub-frames by determining that information on resource positions set to 0 or a specific value is precluded from combination.

Figure 19:
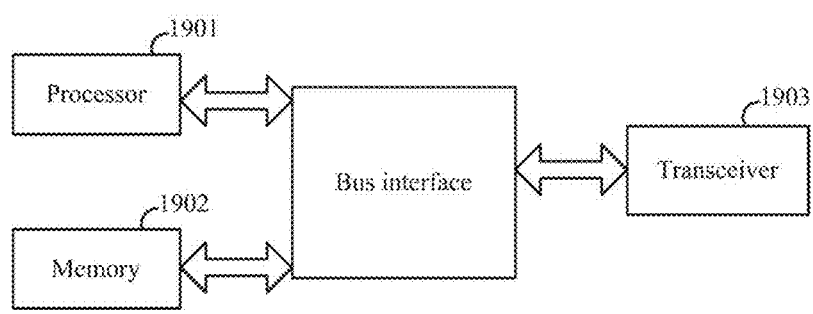
FIG. 19 is a schematic structural diagram of another receiving device according to an embodiment of the disclosure.

Based upon the same inventive idea, an embodiment of the disclosure further provides a receiving device, and for a particular implementation of the receiving device, reference can be made to the description about repeated transmission of downlink data by the receiver according to the embodiment above, so a repeated description thereof is omitted here. As illustrated in FIG. 19, the receiving device generally includes: a processor 1901, a memory 1902, and a transceiver 1903, where a preset program is stored in the memory, and the processor is configured to read the preset program in the memory, and to execute the program to: determine a set of sub-frames for repeated transmission of a physical downlink channel; determine that the physical downlink channel is mapped to resources in each sub-frame in the determined set of sub-frames by starting at a specific start symbol position in a first slot of a current sub-frame and mapping onto all resources other than resources corresponding to a reference signal for demodulation; and instruct the transceiver to receive the physical downlink channel according to the resource mapping mode.

Particularly the specific start symbol position is preconfigured via higher-layer signaling; or the specific start symbol position is obtained according to a size of a DCI area, and the size of the DCI area is obtained according to a CFI.

In the embodiment of the disclosure, the processor is configured to determine that the physical downlink channel is mapped to the resources by starting at the specific start symbol position in the first slot of the current sub-frame, that is, only the resources corresponding to the reference signal for demodulation and to the control area are reserved, and the reserved resources are not used to transmit data of the physical downlink channel, particularly in the following several different implementations without any limitation thereto.

In a first Implementation, the processor is configured to: if a group of sub-frames consisting of a preset number of sub-frames to be involved in multi-sub-frame channel estimation, in the set of sub-frames, includes an MBSFN sub-frame and a non-MBSFN sub-frame, determine a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame, and determine a specific start symbol position of each sub-frame in each group of sub-frames according to the third number of symbols; and determine that the physical downlink channel is mapped to the resources by starting at the start symbol position, determined according to the third number of symbols, in the first slot of the current sub-frame.

Or the processor is configured to: if the set of sub-frames includes an MBSFN sub-frame and a non-MBSFN sub-frame, determine a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame, determine a specific start symbol position of each sub-frame in the set of sub-frames according to the third number of symbols; and determine that the physical downlink channel is mapped to the resources by starting at the start symbol position, determined according to the third number of symbols, in the first slot of the current sub-frame.

The processor is configured to determine the third number of symbols as the smaller or larger one of the first number of symbols and the second number of symbols.

In an implementation, the processor is configured to: if the third number of symbols is the smaller one of the first number of symbols and the second number of symbols, determine that the physical downlink channel is mapped to resources in a sub-frame in which the real number of symbols in a DCI area is more than the third number of symbols, by discarding, or setting to zero, information, carried over the physical downlink channel, mapped onto first A symbols by starting at the start symbol position, determined according to the third number of symbols, in the first slot of the current sub-frame, or overwriting the information with DCI transmitted in the A symbols, where the number A of symbols is the difference between the real number of symbols in the DCI area in the current sub-frame and the third number of symbols.

Or the processor is configured to: if the third number of symbols is the larger one of the first number of symbols and the second number of symbols, determine that the physical downlink channel is mapped to resources in a sub-frame in which the real number of symbols in a DCI area is less than the third number of symbols by starting at the start symbol position, determined according to the third number of symbols, in the first slot of the current sub-frame, and determine that the physical downlink channel is mapped to the resources by mapping a part of information carried over the physical downlink channel repeatedly onto a number B of symbols before the start symbol position, determined according to the third number of symbols, in the first slot of the current sub-frame, where the number B of symbols is the difference between the third number of symbols and the real number of symbols in the DCI area in the current sub-frame.

In a second implementation, the processor is configured to: if a group of sub-frames consisting of a preset number of sub-frames to be involved in multi-sub-frame channel estimation, in the set of sub-frames, includes an MBSFN sub-frame and a non-MBSFN sub-frame, determine that the physical downlink channel is mapped to the resources in each sub-frame in each group of sub-frames by starting at the specific start symbol position in the first slot of the current sub-frame and mapping onto all the resources other than resources corresponding to a dedicated DMRS; and determine that the physical downlink channel is mapped to the resources in the non-MBSFN sub-frame in each group of sub-frames by discarding, or setting to zero, information, carried over the physical downlink channel, mapped onto CRS resources, or overwriting the information with a CRS transmitted over the CRS resources.

Or the processor is configured to: if the set of sub-frames includes an MBSFN sub-frame and a non-MBSFN sub-frame, determine that the physical downlink channel is mapped to the resources in each sub-frame in the set of sub-frames by starting at the specific start symbol position in the first slot of the current sub-frame and mapping onto all the resources other than resources corresponding to a dedicated DMRS; and determine that the physical downlink channel is mapped to the resources in the non-MBSFN sub-frame in the set of sub-frames by discarding, or setting to zero, information, carried over the physical downlink channel, mapped onto CRS resources, or overwriting the information with a CRS transmitted over the CRS resources.

In a third implementation, the processor is configured to: if a group of sub-frames consisting of a preset number of sub-frames to be involved in multi-sub-frame channel estimation, in the set of sub-frames, includes only non-MBSFN sub-frames, determine that the physical downlink channel is mapped to the resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

Or the processor is configured to: if the set of sub-frames includes only non-MBSFN sub-frames, determine that the physical downlink channel is mapped to the resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS.

In a fourth implementation, the processor is configured to: if a group of sub-frames consisting of a preset number of sub-frames to be involved in multi-sub-frame channel estimation, in the set of sub-frames, includes only MBSFN sub-frames, determine that the physical downlink channel is mapped to the resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS.

Or the processor is configured to: if the set of sub-frames includes only MBSFN sub-frames, determine that the physical downlink channel is mapped to the resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

In any one of the first to fourth implementations, the processor is further configured to: determine that the physical downlink channel is mapped to resources in a sub-frame configured with CSI-RS resources in the set of sub-frames by discarding, or setting to zero, information, carried over the physical downlink channel, mapped onto NZP CSI-RS resources, or overwriting the information with a CSI-RS transmitted over the NZP CSI-RS resources, and discarding, or setting to zero, information, carried over the physical downlink channel, mapped onto ZP CSI-RS resources.

Particularly the processor is configured to: if a group of sub-frames consisting of a preset number of sub-frames to be involved in multi-sub-frame channel estimation, in the set of sub-frames, includes an MBSFN sub-frame and a non-MBSFN sub-frame, instruct the transceiver to receive the physical downlink channel in the MBSFN sub-frame and the non-MBSFN sub-frame belonging to the same group of sub-frames using a same transmission scheme, where the transmission scheme at least includes one or any combining of reference signals for demodulation, transmission ports and the number of ports, and a pre-coding scheme.

Or the processor is configured to: if the set of sub-frames includes an MBSFN sub-frame and a non-MBSFN sub-frame, instruct the transceiver to receive the physical downlink channel in the MBSFN sub-frame and the non-MBSFN sub-frame in the set of sub-frames using a same transmission scheme, where the transmission scheme at least includes one or any combining of reference signals for demodulation, transmission ports and the number of ports, and a pre-coding scheme.

The processor is configured to instruct the transceiver to receive the physical downlink channel using a transmission scheme corresponding to a specific sub-frame in the set of sub-frames or in the group of sub-frame, or to receive the physical downlink channel using a preset transmission scheme.

Particularly the processor is configured to: instruct the transceiver to receive the physical downlink channel using a transmission scheme corresponding to a first sub-frame in the set of sub-frames or in the group of sub-frames; or to receive the physical downlink channel using a transmission scheme corresponding to the MBSFN sub-frame in the set of sub-frames or in the group of sub-frames.

In an implementation, the processor is configured to: instruct the transceiver to receive the physical downlink channel according to the resource mapping mode by receiving information, carried over resources to which the physical downlink channel is mapped by discarding, or setting to zero, or overwriting with other signals the information carried over the resources, in such a way that the information is set to zero or a specific value.

In an implementation, the processor is configured to instruct the transceiver to combine information received in each sub-frame in a group of sub-frames consisting of a preset number of sub-frames to be involved in multi-sub-frame channel estimation, in the set of sub-frames by determining that information on resource positions set to 0 or a specific value is precluded from combination; or to combine information received in each sub-frame in the set of sub-frames by determining that information on resource positions set to 0 or a specific value is precluded from combination.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for repeated transmission of downlink data, the method comprising:
   determining a set of sub-frames for repeated transmission of a physical downlink channel;
   mapping the physical downlink channel to resources in each sub-frame in the determined set of sub-frames by starting at a specific start symbol position in a first slot of a current sub-frame and mapping onto all resources other than resources corresponding to a reference signal for demodulation; wherein the physical downlink channel is mapped to resources in different sub-frames by starting at the same specific start symbol position; and
   transmitting the physical downlink channel according to the resource mapping mode.

2. The method according to claim 1, wherein the specific start symbol position is preconfigured via higher-layer signaling; or the specific start symbol position is obtained according to a size of a Downlink Control Information (DCI) area, and the size of the DCI area is obtained according to a Control Format Indicator (CFI).

3. The method according to claim 1, wherein if the set of sub-frames comprises a plurality of groups of sub-frames, the physical downlink channel is mapped to each group of sub-frames, and each group of sub-frames consists of a preset number of sub-frames to be involved in multi-sub-frame channel estimation, and if each group of sub-frames comprises a Multicast-Broadcast Single-Frequency Network (MBSFN) sub-frame and a non-MBSFN sub-frame, mapping the physical downlink channel to the resources by starting at the specific start symbol position in the first slot of the current sub-frame comprises:
  determining a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame; determining a specific start symbol position of each sub-frame in each group of sub-frames according to the third number of symbols; and mapping the physical downlink channel to the resources by starting at the start symbol position, determined according to the third number of symbols, in the first slot of the current sub-frame; or
  if the physical downlink channel is mapped to the set of sub-frames, and the set of sub-frames comprises an MBSFN sub-frame and a non-MBSFN sub-frame, mapping the physical downlink channel to the resources by starting at the specific start symbol position in the first slot of the current sub-frame comprises:
  determining a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determining a specific start symbol position of each sub-frame in the set of sub-frames according to the third number of symbols; and mapping the physical downlink channel to the resources by starting at the start symbol position, determined according to the third number of symbols, in the first slot of the current sub-frame;
  and/or,
  if a group of sub-frames consisting of a preset number of sub-frames to be involved in multi-sub-frame channel estimation, in the set of sub-frames, comprises an MBSFN sub-frame and a non-MBSFN sub-frame, mapping the physical downlink channel to the resources by starting at the specific start symbol position in the first slot of the current sub-frame and mapping onto all the resources other than the resources corresponding to the reference signal for demodulation, comprises:
  mapping the physical downlink channel to resources in each sub-frame in each group of sub-frames by starting at the specific start symbol position in the first slot of the current sub-frame and mapping onto all the resources other than resources corresponding to a dedicated Demodulation Reference Signal (DMRS); and mapping the physical downlink channel to resources in the non-MBSFN sub-frame in each group of sub-frames by discarding or setting to zero, information, carried over the physical downlink channel, mapped onto Common Reference Signal (CRS) resources, or overwriting the information with a CRS transmitted over the CRS resources; or
  if the set of sub-frames comprises an MBSFN sub-frame and a non-MBSFN sub-frame, mapping the physical downlink channel to the resources by starting at the specific start symbol position in the first slot of the current sub-frame and mapping onto all the resources other than the resources corresponding to the reference signal for demodulation comprises:
  mapping the physical downlink channel to resources in each sub-frame in the set of sub-frames by starting at the specific start symbol position in the first slot of the current sub-frame and mapping onto all the resources other than resources corresponding to a dedicated DMRS; and mapping the physical downlink channel to the resources in the non-MBSFN sub-frame in the set of sub-frames by discarding or setting to zero, information, carried over the physical downlink channel, mapped onto CRS resources, or overwriting the information with a CRS transmitted over the CRS resources;
  and/or
  if a group of sub-frames consisting of a preset number of sub-frames to be involved in multi-sub-frame channel estimation, in the set of sub-frames, comprises an MBSFN sub-frame and a non-MBSFN sub-frame, the method further comprises:
  transmitting the physical downlink channel in the MBSFN sub-frame and the non-MBSFN sub-frame belonging to the same group of sub-frames using a same transmission scheme, wherein the transmission scheme at least comprises one or any combining of reference signals for demodulation, transmission ports and the number of ports, and a pre-coding scheme; or
  if the set of sub-frames comprises an MBSFN sub-frame and a non-MBSFN sub-frame, the method further comprises:
  transmitting the physical downlink channel in the MBSFN sub-frame and the non-MBSFN sub-frame in the set of sub-frames using a same transmission scheme, wherein the transmission scheme at least comprises one or any combining of reference signals for demodulation, transmission ports and the number of ports, and a pre-coding scheme;
  and/or
  if a group of sub-frames consisting of a preset number of sub-frames to be involved in multi-sub-frame channel estimation, in the set of sub-frames, comprises only non-MBSFN sub-frames, mapping the physical downlink channel to the resources by starting at the specific start symbol position in the first slot of the current sub-frame and mapping onto all the resources other than the resources corresponding to the reference signal for demodulation comprises:
  mapping the physical downlink channel to resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS; or
  if the set of sub-frames comprises only non-MBSFN sub-frames, mapping the physical downlink channel to the resources by starting at the specific start symbol position in the first slot of the current sub-frame and mapping onto all the resources other than the resources corresponding to the reference signal for demodulation comprises:

mapping the physical downlink channel to resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS;

and/or if a group of sub-frames consisting of a preset number of sub-frames to be involved in multi-sub-frame channel estimation, in the set of sub-frames, comprises only MBSFN sub-frames, mapping the physical downlink channel to the resources by starting at the specific start symbol position in the first slot of the current sub-frame and mapping onto all the resources other than the resources corresponding to the reference signal for demodulation comprises:

mapping the physical downlink channel to resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS; or if the set of sub-frames comprises only MBSFN sub-frames, mapping the physical downlink channel to the resources by starting at the specific start symbol position in the first slot of the current sub-frame and mapping onto all the resources other than the resources corresponding to the reference signal for demodulation comprises:

mapping the physical downlink channel to resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

4. The method according to claim 3, wherein the third number of symbols is determined as the smaller or larger one of the first number of symbols and the second number of symbols.

5. The method according to claim 4, wherein mapping the physical downlink channel to the resources by starting at the start symbol position, determined according to the third number of symbols, in the first slot of the current sub-frame comprises:

if the third number of symbols is the smaller one of the first number of symbols and the second number of symbols, mapping the physical downlink channel to resources in a sub-frame in which the real number of symbols in a DCI area is more than the third number of symbols, by discarding, or setting to zero, information, carried over the physical downlink channel, mapped onto first A symbols, starting at the start symbol position, determined according to the third number of symbols, in the first slot of the current sub-frame, or overwriting the information with DCI transmitted in the A symbols, wherein the number A of symbols is the difference between the real number of symbols in the DCI area in the current sub-frame and the third number of symbols; or if the third number of symbols is the larger one of the first number of symbols and the second number of symbols, mapping the physical downlink channel to resources in a sub-frame in which the real number of symbols in a DCI area is less than the third number of symbols, starting at the start symbol position, determined according to the third number of symbols, in the first slot of the current sub-frame, and mapping a part of information carried over the physical downlink channel repeatedly onto a number B of symbols before the start symbol position, determined according to the third number of symbols, in the first slot of the current sub-frame, wherein the number B of symbols is the difference between the third number of symbols and the real number of symbols in the DCI area in the current sub-frame.

6. The method according to claim 3, wherein transmitting using a same transmission scheme comprises:

transmitting the physical downlink channel using a transmission scheme corresponding to a specific sub-frame in the set of sub-frames or in the group of sub-frames; or transmitting the physical downlink channel using a preset transmission scheme.

7. The method according to claim 6, wherein transmitting the physical downlink channel using the transmission scheme corresponding to the specific sub-frame in the set of sub-frames or in the group of sub-frames comprises:

transmitting the physical downlink channel using a transmission scheme corresponding to a first sub-frame in the set of sub-frames or in the group of sub-frames; or transmitting the physical downlink channel using a transmission scheme corresponding to the MBSFN sub-frame in the set of sub-frames or in the group of sub-frames.

8. The method according to claim 1, wherein when mapping the physical downlink channel to resources in a sub-frame configured with Channel State Information-Reference Signal (CSI-RS) resources in the set of sub-frames, the method further comprises:

discarding or setting to zero, information, carried over the physical downlink channel, mapped onto Non-Zero Power (NZP) CSI-RS resources, or overwriting the information with a CSI-RS transmitted over the NZP CSI-RS resources, and discarding or setting to zero, information, carried over the physical downlink channel, mapped onto Zero Power (ZP) CSI-RS resources.

9. A method for repeated transmission of downlink data, the method comprising:

determining a set of sub-frames for repeated transmission of a physical downlink channel;

determining that the physical downlink channel is mapped to resources in each sub-frame in the determined set of sub-frames by starting at a specific start symbol position in a first slot of a current sub-frame and mapping onto all resources other than resources corresponding to a reference signal for demodulation; wherein the physical downlink channel is manned to resources in different sub-frames by starting at the same specific start symbol position; and receiving the physical downlink channel according to the resource mapping mode.

10. The method according to claim 9, wherein the specific start symbol position is preconfigured via higher-layer signaling; or the specific start symbol position is obtained according to a size of a Downlink Control Information (DCI) area, and the size of the DCI area is obtained according to a Control Format Indicator (CFI).

11. The method according to claim 9, wherein if the set of sub-frames comprises a plurality of groups of sub-frames, the physical downlink channel is mapped to each group of sub-frames, and each group of sub-frames consists of a preset number of sub-frames to be involved in multi-sub-frame channel estimation, and if each group of sub-frames comprises a Multicast-Broadcast Single-Frequency Network (MBSFN) sub-frame and a non-MBSFN sub-frame, determining that the physical downlink channel is mapped to the resources by starting at the specific start symbol position in the first slot of the current sub-frame comprises:
  determining a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame; determining a specific start symbol position of each sub-frame in each group of sub-frames according to the third number of symbols; and determining that the physical downlink channel is mapped to the resources by starting at the start symbol position, determined according to the third number of symbols, in the first slot of the current sub-frame; or
  if the physical downlink channel is mapped to the set of sub-frames, and the set of sub-frames comprises an MBSFN sub-frame and a non-MBSFN sub-frame, determining that the physical downlink channel is mapped to the resources by starting at the specific start symbol position in the first slot of the current sub-frame comprises:
  determining a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determining a specific start symbol position of each sub-frame in the set of sub-frames according to the third number of symbols; and determining that the physical downlink channel is mapped to the resources by starting at the start symbol position, determined according to the third number of symbols, in the first slot of the current sub-frame;
and/or
  if a group of sub-frames consisting of a preset number of sub-frames to be involved in multi-sub-frame channel estimation, in the set of sub-frames, comprises an MBSFN sub-frame and a non-MBSFN sub-frame, determining that the physical downlink channel is mapped to the resources by starting at the specific start symbol position in the first slot of the current sub-frame and mapping onto all the resources other than the resources corresponding to the reference signal for demodulation comprises:
  determining that the physical downlink channel is mapped to the resources in each sub-frame in each group of sub-frames by starting at the specific start symbol position in the first slot of the current sub-frame and mapping onto all the resources other than resources corresponding to a dedicated Demodulation Reference Signal (DMRS); and determining that the physical downlink channel is mapped to the resources in the non-MBSFN sub-frame in each group of sub-frames by discarding, or setting to zero, information, carried over the physical downlink channel, mapped onto Common Reference Signal (CRS) resources, or overwriting the information with a CRS transmitted over the CRS resources; or
  if the set of sub-frames comprises an MBSFN sub-frame and a non-MBSFN sub-frame, determining that the physical downlink channel is mapped to the resources by starting at the specific start symbol position in the first slot of the current sub-frame and mapping onto all the resources other than the resources corresponding to the reference signal for demodulation comprises:
  determining that the physical downlink channel is mapped to the resources in each sub-frame in the set of sub-frames by starting at the specific start symbol position in the first slot of the current sub-frame and mapping onto all the resources other than resources corresponding to a dedicated DMRS; and determining that the physical downlink channel is mapped to the resources in the non-MBSFN sub-frame in the set of sub-frames by discarding, or setting to zero, information, carried over the physical downlink channel, mapped onto CRS resources, or overwriting the information with a CRS transmitted over the CRS resources;
and/or
  if a group of sub-frames consisting of a preset number of sub-frames to be involved in multi-sub-frame channel estimation, in the set of sub-frames, comprises an MBSFN sub-frame and a non-MBSFN sub-frame, the method further comprises:
  receiving the physical downlink channel in the MBSFN sub-frame and the non-MBSFN sub-frame belonging to the same group of sub-frames using a same transmission scheme, wherein the transmission scheme at least comprises one or any combination of reference signals for demodulation, transmission ports and the number of ports, and a pre-coding scheme; or
  if the set of sub-frames comprises an MBSFN sub-frame and a non-MBSFN sub-frame, the method further comprises:
  receiving the physical downlink channel in the MBSFN sub-frame and the non-MBSFN sub-frame in the set of sub-frames using a same transmission scheme, wherein the transmission scheme at least comprises one or any combining of reference signals for demodulation, transmission ports and the number of ports, and a pre-coding scheme;
and/or
  if a group of sub-frames consisting of a preset number of sub-frames to be involved in multi-sub-frame channel estimation, in the set of sub-frames, comprises only non-MBSFN sub-frames, determining that the physical downlink channel is mapped to the resources by starting at the specific start symbol position in the first slot of the current sub-frame and mapping all the resources other than the resources corresponding to the reference signal for demodulation comprises:
  determining that the physical downlink channel is mapped to the resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS; or
  if the set of sub-frames comprises only non-MBSFN sub-frames, determining that the physical downlink channel is mapped to the resources by starting at the specific start symbol position in the first slot of the current sub-frame and mapping onto all the resources other than the resources corresponding to the reference signal for demodulation comprises:
determining that the physical downlink channel is mapped to the resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS;

and/or if a group of sub-frames consisting of a preset number of sub-frames to be involved in multi-sub-frame channel estimation, in the set of sub-frames, comprises only MBSFN sub-frames, determining that the physical downlink channel is mapped to the resources by starting at the specific start symbol position in the first slot of the current sub-frame and mapping onto all the resources other than the resources corresponding to the reference signal for demodulation comprises:
determining that the physical downlink channel is mapped to the resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS; or
if the set of sub-frames comprises only MBSFN sub-frames, determining that the physical downlink channel is mapped to the resources by starting at the specific start symbol position in the first slot of the current sub-frame and mapping onto all the resources other than the resources corresponding to the reference signal for demodulation comprises:
determining that the physical downlink channel is mapped to the resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

12. The method according to claim 11, wherein the third number of symbols is determined as the smaller or larger one of the first number of symbols and the second number of symbols.

13. The method according to claim 12, wherein determining that the physical downlink channel is mapped to the resources by starting at the start symbol position, determined according to the third number of symbols, in the first slot of the current sub-frame comprises:
if the third number of symbols is the smaller one of the first number of symbols and the second number of symbols, determining that the physical downlink channel is mapped to resources in a sub-frame in which the real number of symbols in a DCI area is more than the third number of symbols by discarding, or setting to zero, information, carried over the physical downlink channel, mapped onto first A symbols by starting at the start symbol position, determined according to the third number of symbols, in the first slot of the current sub-frame, or overwriting the information with DCI transmitted in the A symbols, wherein the number A of symbols is the difference between the real number of symbols in the DCI area in the current sub-frame and the third number of symbols; or if the third number of symbols is the larger one of the first number of symbols and the second number of symbols, determining that the physical downlink channel is mapped to resources in a sub-frame in which the real number of symbols in a DCI area is less than the third number of symbols by starting at the start symbol position, determined according to the third number of symbols, in the first slot of the current sub-frame, and determining that the physical downlink channel is mapped to the resources by mapping a part of information carried over the physical downlink channel repeatedly onto a number B of symbols before the start symbol position, determined according to the third number of symbols, in the first slot of the current sub-frame, wherein the number B of symbols is the difference between the third number of symbols and the real number of symbols in the DCI area in the current sub-frame.

14. The method according to claim 11, wherein receiving using a same transmission scheme comprises:
receiving the physical downlink channel using a transmission scheme corresponding to a specific sub-frame in the set of sub-frames or in the group of sub-frames; or
receiving the physical downlink channel using a preset transmission scheme.

15. The method according to claim 14, wherein receiving the physical downlink channel using the transmission scheme corresponding to the specific sub-frame in the set of sub-frames or in the group of sub-frames comprises:
receiving the physical downlink channel using a transmission scheme corresponding to a first sub-frame in the set of sub-frames or in the group of sub-frames; or
receiving the physical downlink channel using a transmission scheme corresponding to the MBSFN sub-frame in the set of sub-frames or in the group of sub-frames.

16. The method according to claim 9, wherein in a sub-frame configured with Channel State Information-Reference Signal (CSI-RS) resources in the set of sub-frames, the method further comprises:
determining that the physical downlink channel is mapped to the resources by discarding, or setting to zero, information, carried over the physical downlink channel, mapped onto Non-Zero Power (NZP) CSI-RS resources, or overwriting the information with a CSI-RS transmitted over the NZP CSI-RS resources, and discarding, or setting to zero, information, carried over the physical downlink channel, mapped onto Zero Power (ZP) CSI-RS resources;

and/or receiving the physical downlink channel according to the resource mapping mode comprises:
receiving information, carried over resources to which the physical downlink channel is mapped by discarding, or setting to zero, or overwriting with other signals the information carried over the resources, in such a way that the information is set to zero or a specific value.

17. The method according to claim 16, wherein information received in each sub-frame in a group of sub-frames consisting of a preset number of sub-frames to be involved in multi-sub-frame channel estimation, in the set of sub-frames is combined by determining that information on resource positions set to 0 or a specific value is precluded from combination; or
information received in each sub-frame in the set of sub-frames is combined by determining that information on resource positions set to 0 or a specific value is precluded from combination.

18. A transmitting device, comprising:
a transmitter;
a processor; and
a memory storing at least one instruction, wherein the processor is configured to execute the at least one instruction to:
determine a set of sub-frames for repeated transmission of a physical downlink channel;
map the physical downlink channel to resources in each sub-frame in the determined set of sub-frames by starting at a specific start symbol position in a first slot of a current sub-frame and mapping onto all resources other than resources corresponding to a reference signal for demodulation; wherein the physical downlink channel is mapped to resources in different sub-frames by starting at the same specific start symbol position; and
control the transmitter to transmit the physical downlink channel according to the resource mapping mode.

19. The device according to claim 18, wherein the specific start symbol position is preconfigured via higher-layer signaling; or the specific start symbol position is obtained by the processor according to a size of a Downlink Control Information (DCI) area, and the size of the DCI area is obtained by the processor according to a Control Format Indicator (CFI).

20. The device according to claim 18, wherein the processor is configured to execute the at least one instruction to:
if the set of sub-frames comprises a plurality of groups of sub-frames, the physical downlink channel is mapped to each group of sub-frames, and each group of sub-frames consists of a preset number of sub-frames to be involved in multi-sub-frame channel estimation, and if each group of sub-frames comprises a Multicast-Broadcast Single-Frequency Network (MBSFN) sub-frame and a non-MBSFN sub-frame, determine a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame; determine a specific start symbol position of each sub-frame in each group of sub-frames according to the third number of symbols; and map the physical downlink channel to the resources by starting at the start symbol position, determined according to the third number of symbols, in the first slot of the current sub-frame; or
if the physical downlink channel is mapped to the set of sub-frames, and the set of sub-frames comprises an MBSFN sub-frame and a non-MBSFN sub-frame, determine a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determine a specific start symbol position of each sub-frame in the set of sub-frames according to the third number of symbols; and map the physical downlink channel to the resources by starting at the start symbol position, determined according to the third number of symbols, in the first slot of the current sub-frame;
and/or
the processor is configured to execute the at least one instruction to:
if a group of sub-frames consisting of a preset number of sub-frames to be involved in multi-sub-frame channel estimation, in the set of sub-frames, comprises an MBSFN sub-frame and a non-MBSFN sub-frame, map the physical downlink channel to resources in each sub-frame in each group of sub-frames by starting at the specific start symbol position in the first slot of the current sub-frame and mapping onto all the resources other than resources corresponding to a dedicated Demodulation Reference Signal (DMRS); and map the physical downlink channel to the resources in the non-MBSFN sub-frame in each group of sub-frames by discarding, or setting to zero, information, carried over the physical downlink channel, mapped onto Common Reference Signal (CRS) resources, or overwriting the information with a CRS transmitted over the CRS resources; or
if the set of sub-frames comprises an MBSFN sub-frame and a non-MBSFN sub-frame, map the physical downlink channel to resources in each sub-frame in the set of sub-frames by starting at the specific start symbol position in the first slot of the current sub-frame and mapping onto all the resources other than resources corresponding to a dedicated DMRS; and map the physical downlink channel to the resources in the non-MBSFN sub-frame in the set of sub-frames by discarding, or setting to zero, information, carried over the physical downlink channel, mapped onto CRS resources, or overwriting the information with a CRS transmitted over the CRS resources;
and/or
the processor is configured to execute the at least one instruction to:
if a group of sub-frames consisting of a preset number of sub-frames to be involved in multi-sub-frame channel estimation, in the set of sub-frames, comprises an MBSFN sub-frame and a non-MBSFN sub-frame, control the transmitter to transmit the physical downlink channel in the MBSFN sub-frame and the non-MBSFN sub-frame belonging to the same group of sub-frames using a same transmission scheme, wherein the transmission scheme at least comprises one or any combination of reference signals for demodulation, transmission ports and the number of ports, and a pre-coding scheme; or
if the set of sub-frames comprises an MBSFN sub-frame and a non-MBSFN sub-frame, control the transmitter to transmit the physical downlink channel in the MBSFN sub-frame and the non-MBSFN sub-frame in the set of sub-frames using a same transmission scheme, wherein the transmission scheme at least comprises one or any combination of reference signals for demodulation, transmission ports and the number of ports, and a pre-coding scheme;
and/or
the processor is configured to execute the at least one instruction to:
if a group of sub-frames consisting of a preset number of sub-frames to be involved in multi-sub-frame channel estimation, in the set of sub-frames, comprises only non-MBSFN sub-frames, map the physical downlink channel to resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS; or if the set of sub-frames comprises only non-MBSFN sub-frames, map the physical downlink channel to resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS;

and/or the processor is configured to execute the at least one instruction to:

if a group of sub-frames consisting of a preset number of sub-frames to be involved in multi-sub-frame channel estimation, in the set of sub-frames, comprises only MBSFN sub-frames, map the physical downlink channel to resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS; or if the set of sub-frames comprises only MBSFN sub-frames, map the physical downlink channel to resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

21. The device according to claim 20, wherein the processor is configured to execute the at least one instruction to determine the third number of symbols as the smaller or larger one of the first number of symbols and the second number of symbols.

22. The device according to claim 21, wherein the processor is configured to execute the at least one instruction to:

if the third number of symbols is the smaller one of the first number of symbols and the second number of symbols, map the physical downlink channel to resources in a sub-frame in which the real number of symbols in a DCI area is more than the third number of symbols, by discarding, or setting to zero, information, carried over the physical downlink channel, mapped onto first A symbols by starting at the start symbol position, determined according to the third number of symbols, in the first slot of the current sub-frame, or overwriting the information with DCI transmitted in the A symbols, wherein the number A of symbols is the difference between the real number of symbols in the DCI area in the current sub-frame and the third number of symbols; or if the third number of symbols is the larger one of the first number of symbols and the second number of symbols, map the physical downlink channel to resources in a sub-frame in which the real number of symbols in a DCI area is less than the third number of symbols by starting at the start symbol position, determined according to the third number of symbols, in the first slot of the current sub-frame, and mapping a part of information carried over the physical downlink channel repeatedly onto a number B of symbols before the start symbol position, determined according to the third number of symbols, in the first slot of the current sub-frame, wherein the number B of symbols is the difference between the third number of symbols and the real number of symbols in the DCI area in the current sub-frame.

23. The device according to claim 20, wherein the processor is configured to execute the at least one instruction to:

control the transmitter to transmit the physical downlink channel using a transmission scheme corresponding to a specific sub-frame in the set of sub-frames or in the group of sub-frames; or control the transmitter to transmit the physical downlink channel using a preset transmission scheme.

24. The device according to claim 23, wherein the processor is configured to execute the at least one instruction to:

control the transmitter to transmit the physical downlink channel using a transmission scheme corresponding to a first sub-frame in the set of sub-frames or in the group of sub-frames; or control the transmitter to transmit the physical downlink channel using a transmission scheme corresponding to the MBSFN sub-frame in the set of sub-frames or in the group of sub-frames.

25. The device according to claim 18, wherein the processor is configured to execute the at least one instruction to:

map the physical downlink channel to resources in a sub-frame configured with Channel State Information-Reference Signal (CSI-RS) resources in the set of sub-frames by discarding, or setting to zero, information, carried over the physical downlink channel, mapped onto Non-Zero Power (NZP) CSI-RS resources, or overwriting the information with a CSI-RS transmitted over the NZP CSI-RS resources, and discarding, or setting to zero, information, carried over the physical downlink channel, mapped onto Zero Power (ZP) CSI-RS resources.

26. A receiving device, comprising:

a receiver;

a processor; and a memory storing at least one instruction, wherein the processor is configured to execute the at least one instruction to:

determine a set of sub-frames for repeated transmission of a physical downlink channel;

determine that the physical downlink channel is mapped to resources in each sub-frame in the determined set of sub-frames by starting at a specific start symbol position in a first slot of a current sub-frame and mapping onto all resources other than resources corresponding to a reference signal for demodulation; wherein the physical downlink channel is mapped to resources in different sub-frames by starting at the same specific start symbol position; and control the receiver to receive the physical downlink channel according to the resource mapping mode.

27. The device according to claim 26, wherein the specific start symbol position is preconfigured via higher-layer signaling; or the specific start symbol position is obtained by the processor according to a size of a Downlink Control Information (DCI) area, and the size of the DCI area is obtained by the processor according to a Control Format Indicator (CFI).

28. The device according to claim 26, wherein the processor is configured to execute the at least one instruction to:

if the set of sub-frames comprises a plurality of groups of sub-frames, the physical downlink channel is mapped to each group of sub-frames, and each group of sub-frames consists of a preset number of sub-frames to be involved in multi-sub-frame channel estimation, and if each group of sub-frames comprises a Multicast-Broadcast Single-Frequency Network (MBSFN) sub-frame and a non-MBSFN sub-frame, determine a third number of symbols occupied by a DCI area in each sub-frame in each group of sub-frames according to a first number of symbols occupied by a DCI area in the MBSFN sub-frame, and a second number of symbols occupied by a DCI area in the non-MBSFN sub-frame; determine a specific start symbol position of each sub-frame in each group of sub-frames according to the third number of symbols; and determine that the physical downlink channel is mapped to the resources by starting at the start symbol position, determined according to the third number of symbols, in the first slot of the current sub-frame; or if the physical downlink channel is mapped to the set of sub-frames, and the set of sub-frames comprises an MBSFN sub-frame and a non-MBSFN sub-frame, determine a third number of symbols occupied by a DCI area in each sub-frame in the set of sub-frames according to a first number of symbols occupied by a DCI area in the MBSFN sub-frame, and a second number of symbols occupied by a DCI area in the non-MBSFN sub-frame; determine a specific start symbol position of each sub-frame in the set of sub-frames according to the third number of symbols; and determine that the physical downlink channel is mapped to the resources by starting at the start symbol position, determined according to the third number of symbols, in the first slot of the current sub-frame;

and/or the processor is configured to execute the at least one instruction to:

if a group of sub-frames consisting of a preset number of sub-frames to be involved in multi-sub-frame channel estimation, in the set of sub-frames, comprises an MBSFN sub-frame and a non-MBSFN sub-frame, determine that the physical downlink channel is mapped to the resources in each sub-frame in each group of sub-frames by starting at the specific start symbol position in the first slot of the current sub-frame and mapping onto all the resources other than resources corresponding to a dedicated Demodulation Reference Signal (DMRS); and determine that the physical downlink channel is mapped to the resources in the non-MBSFN sub-frame in each group of sub-frames by discarding, or setting to zero, information, carried over the physical downlink channel, mapped onto Common Reference Signal (CRS) resources, or overwriting the information with a CRS transmitted over the CRS resources; or if the set of sub-frames comprises an MBSFN sub-frame and a non-MBSFN sub-frame, determine that the physical downlink channel is mapped to the resources in each sub-frame in the set of sub-frames by starting at the specific start symbol position in the first slot of the current sub-frame and mapping onto all the resources other than resources corresponding to a dedicated DMRS; and determine that the physical downlink channel is mapped to the resources in the non-MBSFN sub-frame in the set of sub-frames by discarding, or setting to zero, information, carried over the physical downlink channel, mapped onto CRS resources, or overwriting the information with a CRS transmitted over the CRS resources;

and/or the processor is configured to execute the at least one instruction to:

if a group of sub-frames consisting of a preset number of sub-frames to be involved in multi-sub-frame channel estimation, in the set of sub-frames, comprises an MBSFN sub-frame and a non-MBSFN sub-frame, control the receiver to receive the physical downlink channel in the MBSFN sub-frame and the non-MBSFN sub-frame belonging to the same group of sub-frames using a same transmission scheme, wherein the transmission scheme at least comprises one or any combination of reference signals for demodulation, transmission ports and the number of ports, and a pre-coding scheme; or if the set of sub-frames comprises an MBSFN sub-frame and a non-MBSFN sub-frame, control the receiver to receive the physical downlink channel in the MBSFN sub-frame and the non-MBSFN sub-frame in the set of sub-frames using a same transmission scheme, wherein the transmission scheme at least comprises one or any combination of reference signals for demodulation, transmission ports and the number of ports, and a pre-coding scheme;

and/or the processor is configured to execute the at least one instruction to:

if a group of sub-frames consisting of a preset number of sub-frames to be involved in multi-sub-frame channel estimation, in the set of sub-frames, comprises only non-MBSFN sub-frames, determine that the physical downlink channel is mapped to the resources in each sub-frame in each group of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS; or if the set of sub-frames comprises only non-MBSFN sub-frames, determine that the physical downlink channel is mapped to the resources in each sub-frame in the set of sub-frames by starting at the start symbol position, determined according to a size of a DCI area in a non-MBSFN sub-frame, in the first slot of the current sub-frame and mapping onto all the resources other than resources corresponding to a CRS, or corresponding to a CRS and a dedicated DMRS;

and/or the processor is configured to execute the at least one instruction to:

if a group of sub-frames consisting of a preset number of sub-frames to be involved in multi-sub-frame channel estimation, in the set of sub-frames, comprises only MBSFN sub-frames, determine that the physical downlink channel is mapped to the resources in each sub-frame in each group of sub-frames by starting at the start symbol position, determined according to a size of a DCI area in an MBSFN sub-frame, in the first slot of the current sub-frame and mapping onto all the resources other than resources corresponding to a dedicated DMRS; or if the set of sub-frames comprises only MBSFN sub-frames, determine that the physical downlink channel is mapped to the resources in each sub-frame in the set of sub-frames by starting at the start symbol position, determined according to a size of a DCI area in an MBSFN sub-frame, in the first slot of the current sub-frame and mapping onto all the resources other than resources corresponding to a dedicated DMRS.

29. The device according to claim 28, wherein the processor is configured to execute the at least one instruction to: determine the third number of symbols as the smaller or larger one of the first number of symbols and the second number of symbols.

30. The device according to claim 29, wherein the processor is configured to execute the at least one instruction to:
if the third number of symbols is the smaller one of the first number of symbols and the second number of symbols, determine that the physical downlink channel is mapped to resources in a sub-frame in which the real number of symbols in a DCI area is more than the third number of symbols by discarding, or setting to zero, information, carried over the physical downlink channel, mapped onto first A symbols by starting at the start symbol position, determined according to the third number of symbols, in the first slot of the current sub-frame, or overwriting the information with DCI transmitted in the A symbols, wherein the number A of symbols is the difference between the real number of symbols in the DCI area in the current sub-frame and the third number of symbols; or
if the third number of symbols is the larger one of the first number of symbols and the second number of symbols, determine that the physical downlink channel is mapped to resources in a sub-frame in which the real number of symbols in a DCI area is less than the third number of symbols by starting at the start symbol position, determined according to the third number of symbols, in the first slot of the current sub-frame, and determine that the physical downlink channel is mapped to the resources by mapping a part of information carried over the physical downlink channel repeatedly onto a number B of symbols before the start symbol position, determined according to the third number of symbols, in the first slot of the current sub-frame, wherein the number B of symbols is the difference between the third number of symbols and the real number of symbols in the DCI area in the current sub-frame.

31. The device according to claim 28, wherein the processor is configured to execute the at least one instruction to: control the receiver to receive the physical downlink channel using a transmission scheme corresponding to a specific sub-frame in the set of sub-frames or in the group of sub-frames; or
control the receiver to receive the physical downlink channel using a preset transmission scheme.

32. The device according to claim 31, wherein the processor is configured to execute the at least one instruction to:
control the receiver to receive the physical downlink channel using a transmission scheme corresponding to a first sub-frame in the set of sub-frames or in the group of sub-frames; or
control the receiver to receive the physical downlink channel using a transmission scheme corresponding to the MBSFN sub-frame in the set of sub-frames or in the group of sub-frames.

33. The device according to claim 26, wherein the processor is configured to execute the at least one instruction to:
determine that the physical downlink channel is mapped to resources in a sub-frame configured with Channel State Information-Reference Signal (CSI-RS) resources in the set of sub-frames by discarding, or setting to zero, information, carried over the physical downlink channel, mapped onto Non-Zero Power (NZP) CSI-RS resources, or overwriting the information with a CSI-RS transmitted over the NZP CSI-RS resources, and discarding, or setting to zero, information, carried over the physical downlink channel, mapped onto Zero Power (ZP) CSI-RS resources;
and/or
the processor is configured to execute the at least one instruction to:
when receiving the physical downlink channel according to the resource mapping mode through the receiver, receive information, carried over resources to which the physical downlink channel is mapped by discarding, or setting to zero, or overwriting with other signals the information carried over the resources, in such a way that the information is set to zero or a specific value.

34. The device according to claim 33, wherein the processor is configured to execute the at least one instruction to:
combine information received in each sub-frame in a group of sub-frames consisting of a preset number of sub-frames to be involved in multi-sub-frame channel estimation, in the set of sub-frames by determining that information on resource positions set to 0 or a specific value is precluded from combination; or
combine information received in each sub-frame in the set of sub-frames by determining that information on resource positions set to 0 or a specific value is precluded from combination.

* * * * *